(12) United States Patent
Zhou et al.

(10) Patent No.: US 12,058,649 B2
(45) Date of Patent: Aug. 6, 2024

(54) METHOD, RECEPTION DEVICE AND TRANSMISSION DEVICE FOR SIDELINK COMMUNICATION

(71) Applicant: Samsung Electronics Co., Ltd., Suwon-si (KR)

(72) Inventors: Miao Zhou, Beijing (CN); Feifei Sun, Beijing (CN); Min Wu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 287 days.

(21) Appl. No.: 17/607,349

(22) PCT Filed: Apr. 29, 2020

(86) PCT No.: PCT/KR2020/005771
§ 371 (c)(1),
(2) Date: Oct. 28, 2021

(87) PCT Pub. No.: WO2020/222568
PCT Pub. Date: Nov. 5, 2020

(65) Prior Publication Data
US 2022/0210768 A1    Jun. 30, 2022

(30) Foreign Application Priority Data

Apr. 30, 2019   (CN) .......................... 201910365519.2
Aug. 16, 2019   (CN) .......................... 201910759378.2
(Continued)

(51) Int. Cl.
*H04W 72/02*    (2009.01)
*H04L 1/1812*   (2023.01)
(Continued)

(52) U.S. Cl.
CPC .......... *H04W 72/02* (2013.01); *H04L 1/1812* (2013.01); *H04L 5/0053* (2013.01); *H04W 72/0446* (2013.01); *H04W 72/20* (2023.01)

(58) Field of Classification Search
CPC . H04W 72/02; H04W 72/0446; H04W 72/20; H04W 4/44; H04W 4/46;
(Continued)

(56) References Cited

U.S. PATENT DOCUMENTS 10,791,584 B2    9/2020  Kim et al.
2019/0174530 A1  6/2019  Kim et al.
(Continued)

FOREIGN PATENT DOCUMENTS

| EP | 3920452 A1 | 12/2021 |
| WO | 2017017871 A1 | 2/2017 |
| WO | 2018004322 A1 | 1/2018 |

OTHER PUBLICATIONS

Foreign Priority Document for U.S. Appl. No. 17/607,349, CN201910365519.2, Apr. 30, 2019 (Year: 2019).*
(Continued)

*Primary Examiner* — Michael K Phillips

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). The present application discloses a method, a reception device, and a transmission device for sidelink communication, capable of determining a physical structure of a sidelink feedback channel and determining resources for transmitting the sidelink feedback channel. The method for sidelink communication includes: receiving a physical sidelink channel, to obtain sidelink data corresponding to the physical sidelink channel; obtaining physical sidelink feedback channel (PSFCH) configuration, wherein a PSFCH is used to
(Continued)

carry feedback information for the sidelink data; determining at least one PSFCH resource for transmitting the PSFCH based on the PSFCH configuration; and transmitting the PSFCH on the determined PSFCH resources.

10 Claims, 13 Drawing Sheets

(30) Foreign Application Priority Data

Sep. 30, 2019 (CN) .......................... 201910939916.6
Nov. 7, 2019 (CN) .......................... 201911082918.4

(51) Int. Cl.
*H04L 5/00* (2006.01)
*H04W 72/0446* (2023.01)
*H04W 72/20* (2023.01)

(58) Field of Classification Search
CPC ......... H04W 4/70; H04W 4/40; H04W 72/53;
H04L 1/1812; H04L 5/0053; H04L
1/1896; H04L 5/0094; H04L 1/1854;
H04L 1/1861; H04L 5/0055; H04L
1/1607; H04L 1/1893; H04L 5/0044
See application file for complete search history.

(56) References Cited

U.S. PATENT DOCUMENTS

| | | | | |
|---|---|---|---|---|
| 2020/0322099 | A1* | 10/2020 | Park | H04L 1/1861 |
| 2021/0288778 | A1* | 9/2021 | Park | H04L 1/1858 |
| 2021/0344460 | A1* | 11/2021 | Park | H04W 72/20 |
| 2022/0052792 | A1* | 2/2022 | Lee | H04W 4/40 |
| 2022/0085921 | A1* | 3/2022 | Zhang | H04L 1/1854 |
| 2022/0116996 | A1* | 4/2022 | Lee | H04W 4/40 |
| 2022/0159622 | A1* | 5/2022 | Yoshioka | H04W 72/02 |
| 2022/0174647 | A1* | 6/2022 | Lee | H04W 4/40 |
| 2022/0201654 | A1* | 6/2022 | Lee | H04L 1/1864 |
| 2023/0101824 | A1* | 3/2023 | Baek | H04W 4/40 |
| | | | | 455/522 |

OTHER PUBLICATIONS

Foreign Priority Document for U.S. Appl. No. 17/607,349, CN201910759378.2, Aug. 16, 2019 (Year: 2019).*
Foreign Priority Document for U.S. Appl. No. 17/607,349, CN201910939916.6, Sep. 30, 2019 (Year: 2019).*
Foreign Priority Document for U.S. Appl. No. 17/607,349, CN201911082918.4, Nov. 7, 2019 (Year: 2019).*
International Search Report and Written Opinion of the International Searching Authority dated Aug. 14, 2020 in connection with International Application No. PCT/KR2020/005771, 7 pages.
Asustek, "Discussion on PSFCH in NR V2X," R1-1902911, 3GPP TSG RAN WG1 #96, Athens, Greece, Feb. 25-Mar. 1, 2019, 4 pages.
ITL, "Physical layer procedure for NR V2X," R1-1905101, 3GPP TSG RAN WG1 Meeting #96 bis, Xi'an, China , Apr. 8-12, 2019, 4 pages.
LG Electronics, "Discussion on physical layer procedures for NR sidelink, " R1-1905443, 3GPP TSG RAN WG1 Meeting #96 bis, Xi'an, China , Apr. 8-12, 2019, 12 pages.
Panasonic, "Discussion on PSFCH channel design in NR V2X," R1-1902202, 3GPP TSG RAN WG1 #96, Athens, Greece, Feb. 25-Mar. 1, 2019, 4 pages.
Samsung, "On Physical Layer Procedures for NR V2X," R1-1904426, 3GPP TSG RAN WG1 #96bis, Xi'an, China , Apr. 8-12, 2019, 14pages.
Samsung, "On Physical Layer Procedures for NR V2X," R1-1906941, 3GPP TSG RAN WG1 #97, Reno, USA, May 13-17, 2019, 16 pages.
Samsung, "On Sidelink HARQ Procedure," R1-1906948, 3GPP TSG RAN WG1 #97, Reno, USA, May 13-17, 2019, 11 pages.
Samsung, "On Physical Layer Procedures for NR V2X," R1-1908481, 3GPP TSG RAN WG1 #98, Prague, CZ, Aug. 26-30, 2019, 20 pages.
Samsung, "On Physical Layer Procedures for NR V2X," R1-1910475, 3GPP TSG RAN WG1 #98bis, Chongqing, China, Oct. 14-20, 2019, 22 pages.
Samsung, "On Physical Layer Procedures for NR V2X," R1-1912464, 3GPP TSG RAN WG1 #99, Reno, USA, Nov. 18-22, 2019, 15 pages.
Samsung, "Introduction of V2X in NR," R1-1913680, 3GPP TSG-RAN WG1 Meeting #99, Reno, USA, Nov. 18-22, 2019, 17 pages.
Samsung, "Introduction of V2X in NR," RP-193124, 3GPP TSG RAN Meeting #86, Sitges, Spain, Dec. 9-12, 2019, 17 pages.
Supplementary European Search Report dated Apr. 26, 2022, in connection with European Application No. 20798520.1, 14 pages.
Huawei, et al., "PSFCH formats for NR V2X," R1-1905899, 3GPP TSG RAN WG1 Meeting #96bis, Xi'an, China, Apr. 8-12, 2019, 5 pages.
Intel Corporation, "Sidelink Physical Structure for NR V2X Communication," R1-1904294, 3GPP TSG RAN WG1 RAN1#96bis, Xi'an, China, Apr. 8-12, 2019, 16 pages.
Intel Corporation, "Design of physical layer procedures for NR V2X sidelink," R1-1904299, 3GPP TSG RAN WG1 RAN1#96bis, Xi'an, China, Apr. 8-12, 2019, 11 pages.
Mediatek Inc, "On sidelink resource allocation mechanism," R1-1904494, 3GPP TSG RAN WG1 Meeting #96bis, Xi'an, China, Apr. 8-12, 2019, 9 pages.
Notice of registration dated May 11, 2024, in connection with Chinese Application No. 201911082918.4, 6 pages.
Office Action dated Mar. 5, 2024, in connection with Chinese Application No. 201911082918.4, 8 pages.

* cited by examiner

[Fig. 1]
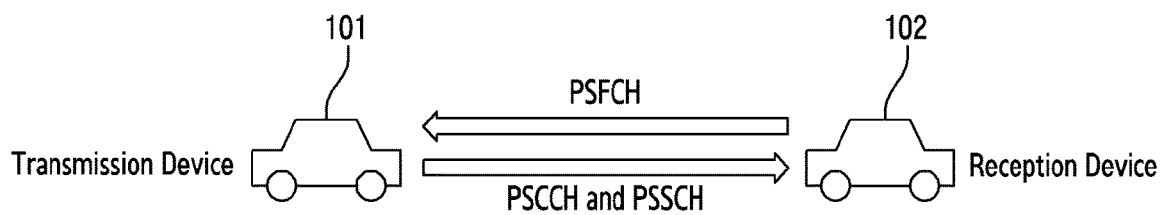
[Fig. 2]
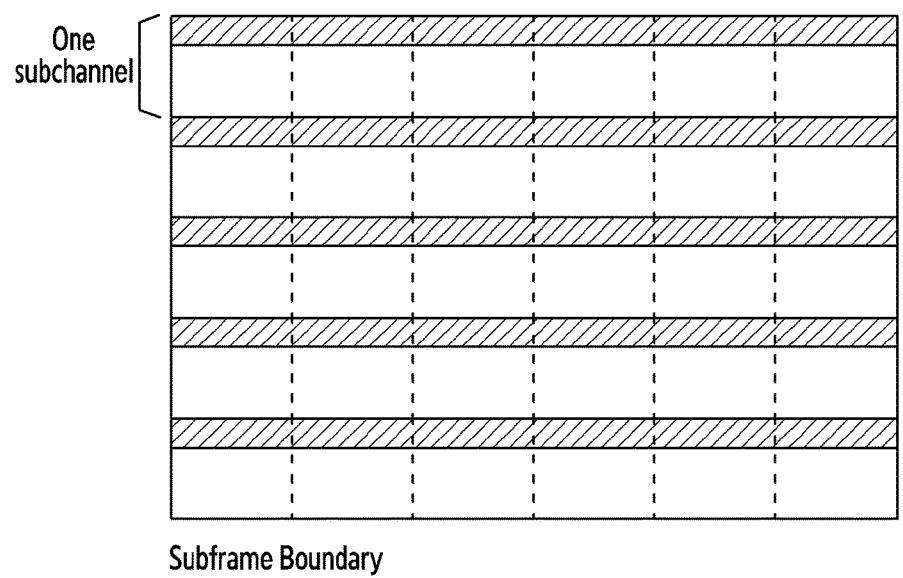
Subframe Boundary

[Fig. 3]
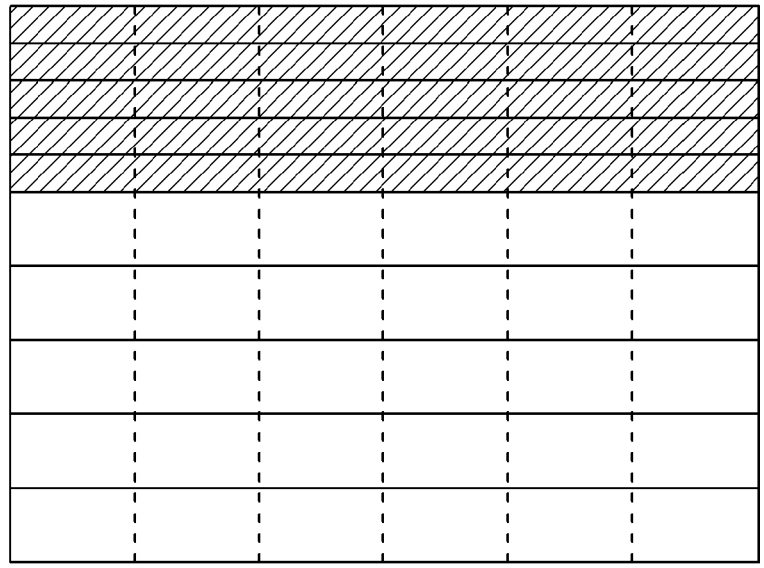
Subframe Boundary
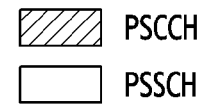 PSCCH
PSSCH
[Fig. 4A]
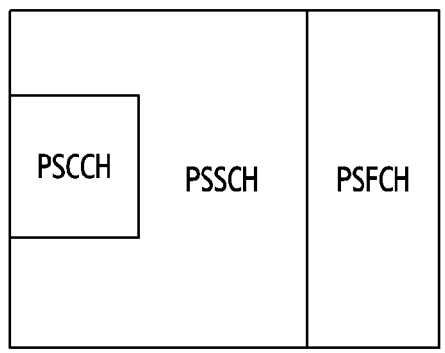
[Fig. 4B]
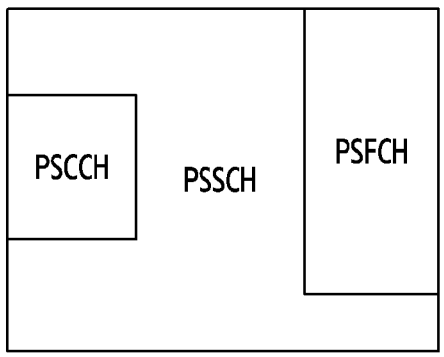

[Fig. 5]
500
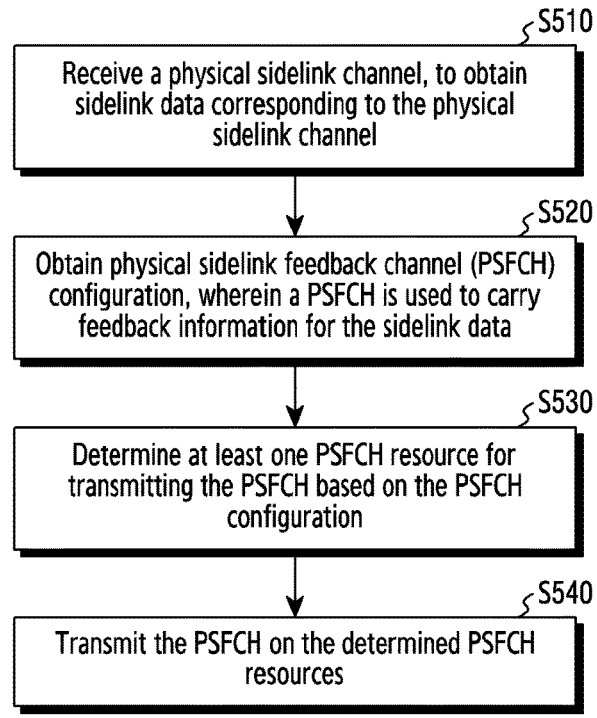
[Fig. 6]
600
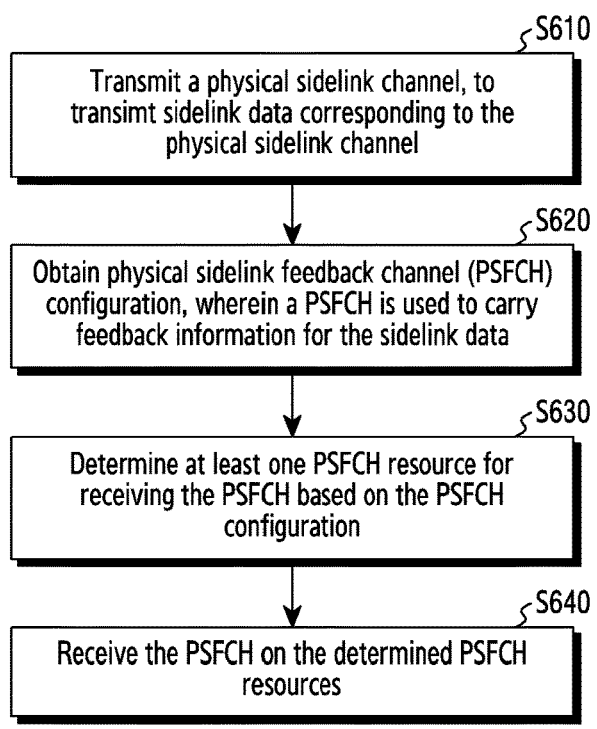

[Fig. 7]
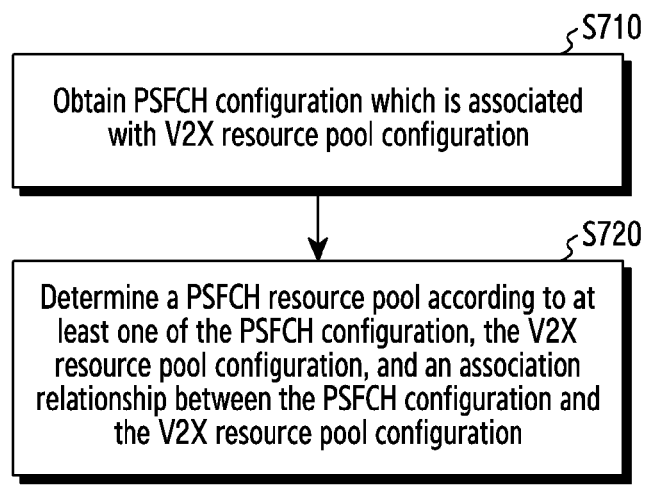
[Fig. 8]
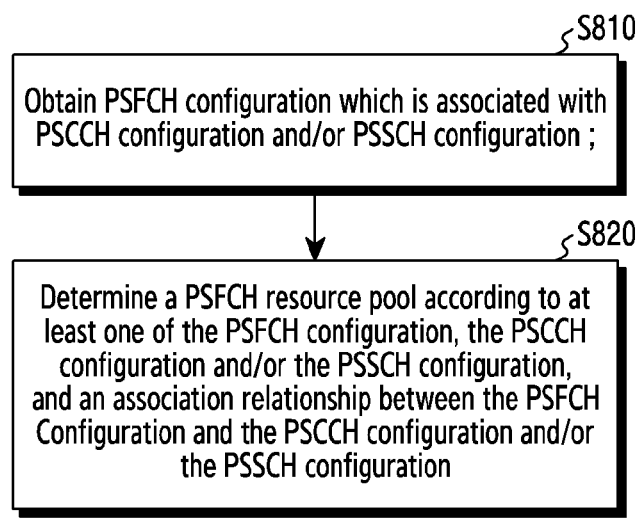

[Fig. 9]
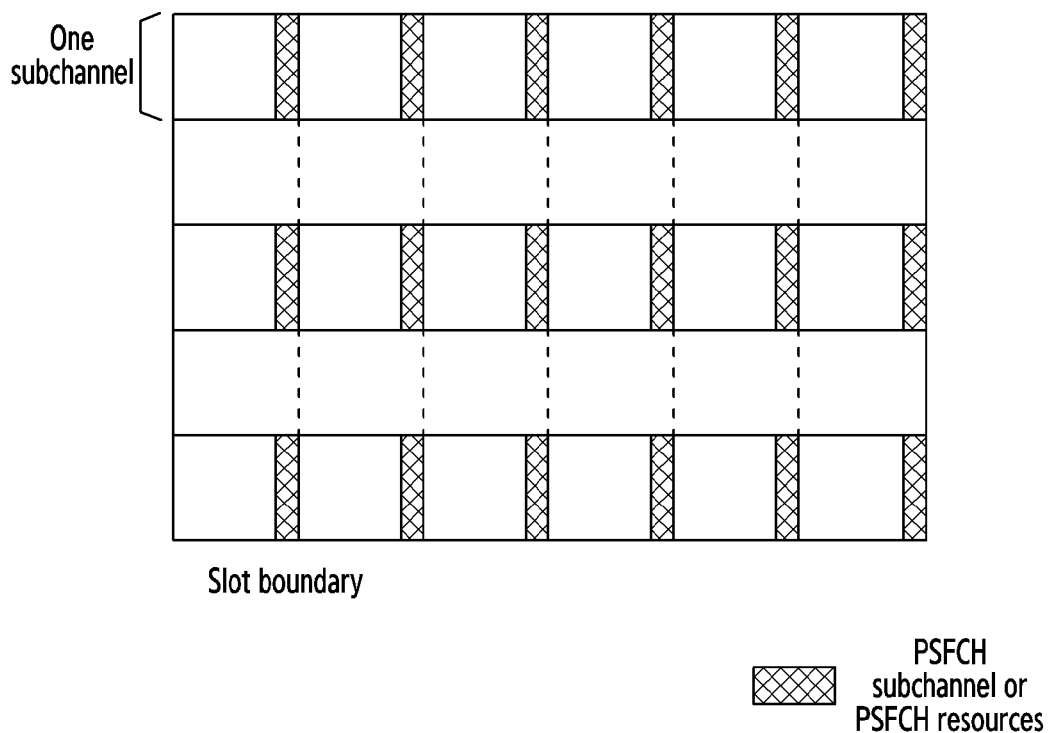
[Fig. 10]
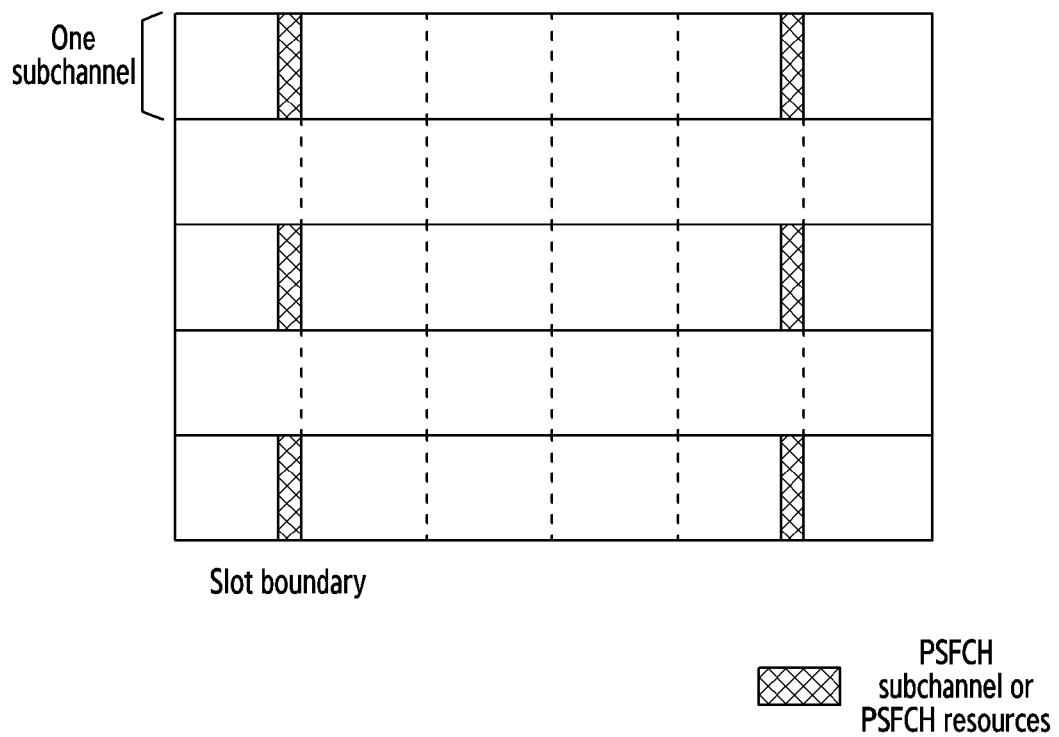

[Fig. 11A]
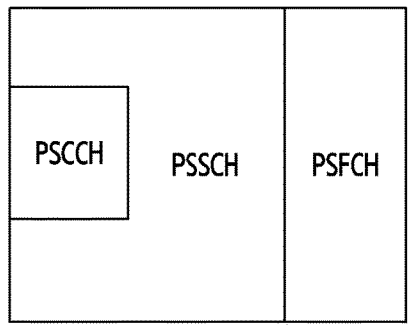
[Fig. 11B]
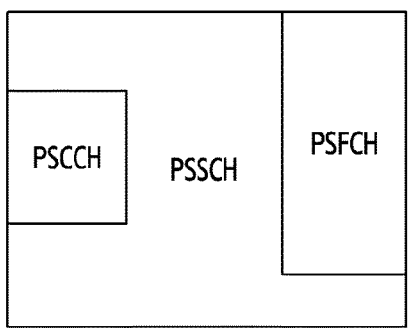
[Fig. 11C]
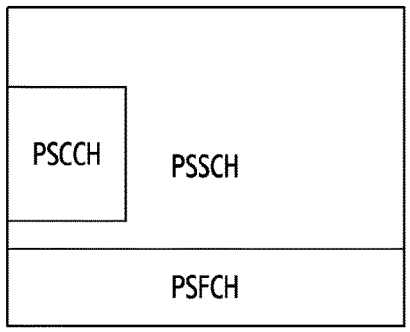
[Fig. 11D]
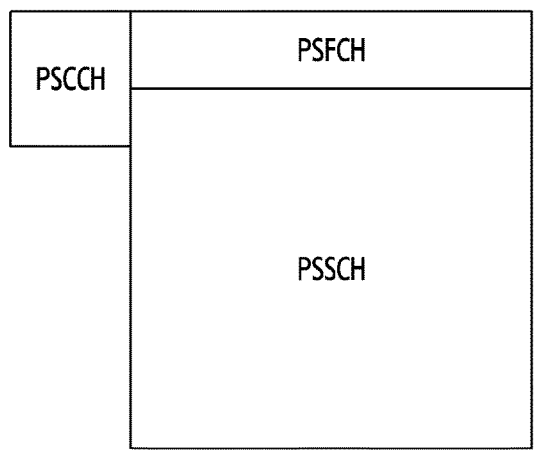

[Fig. 12]
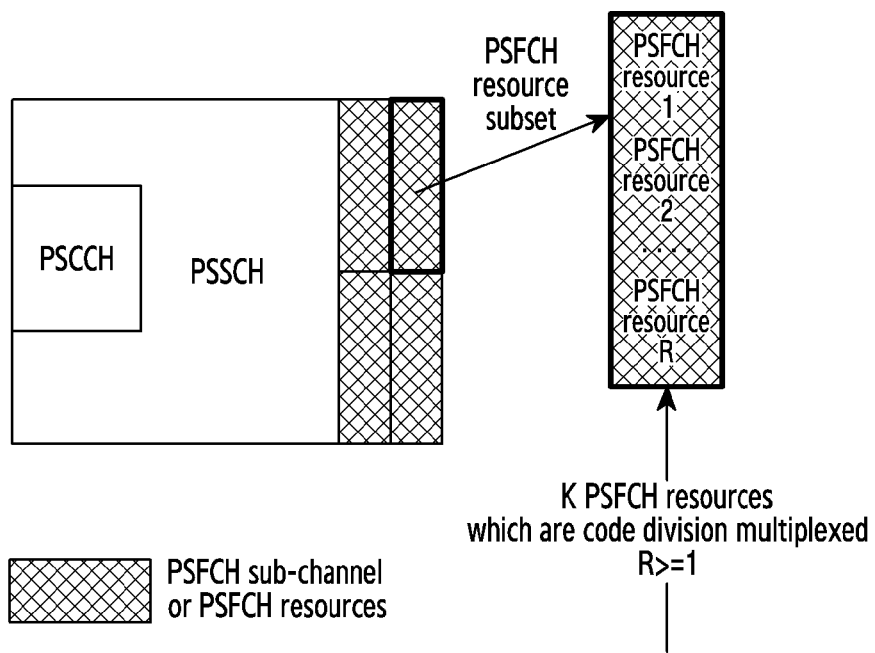
[Fig. 13]
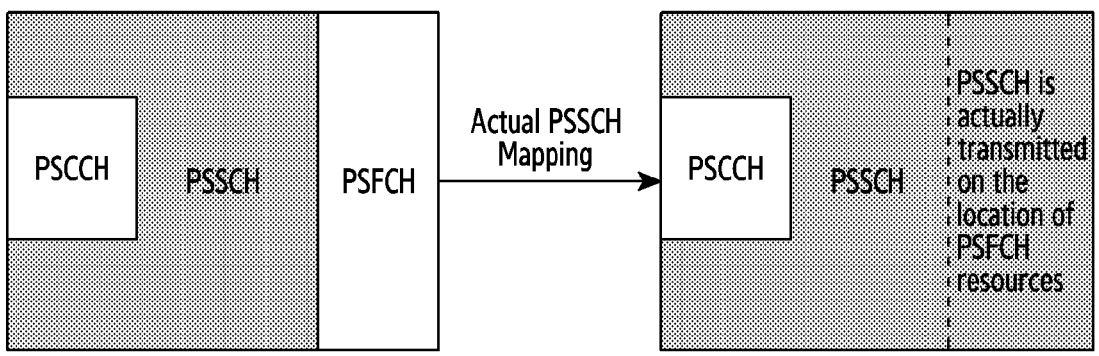

[Fig. 14A]
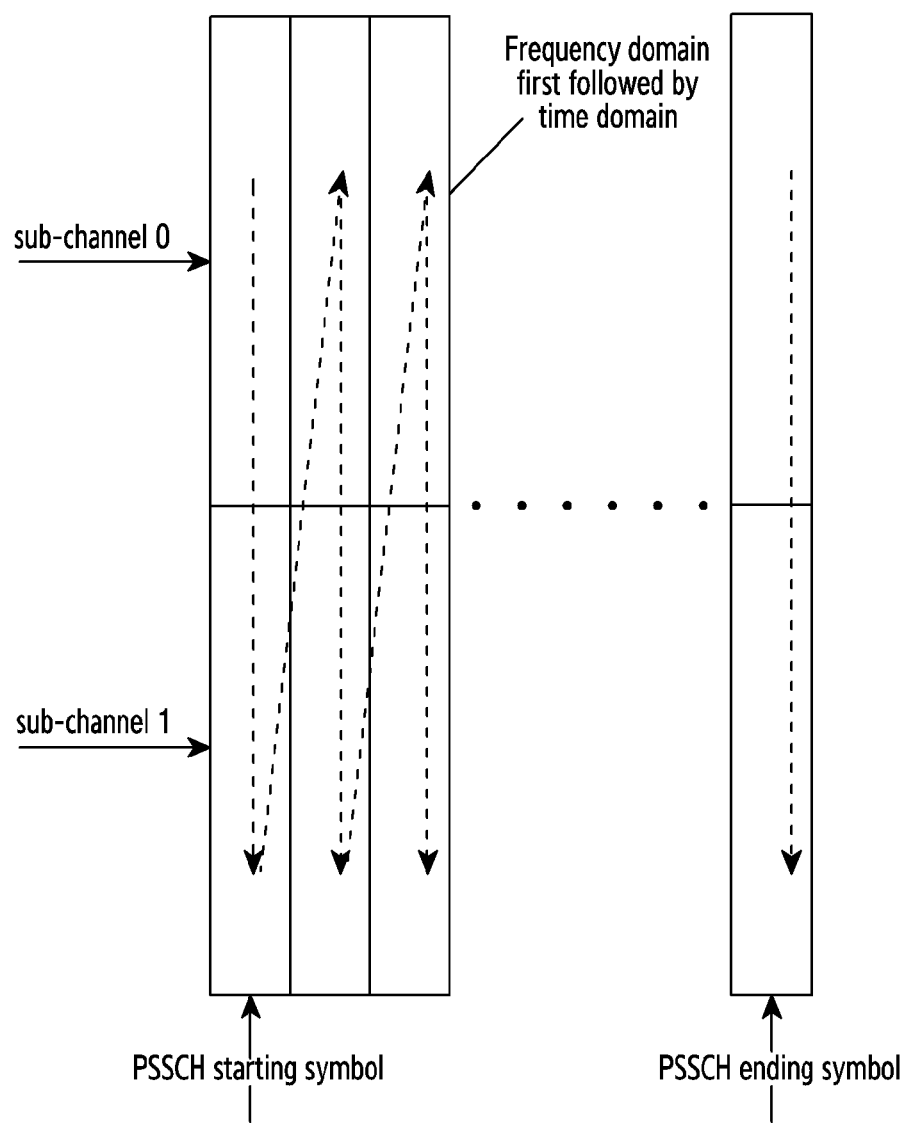

[Fig. 14B]
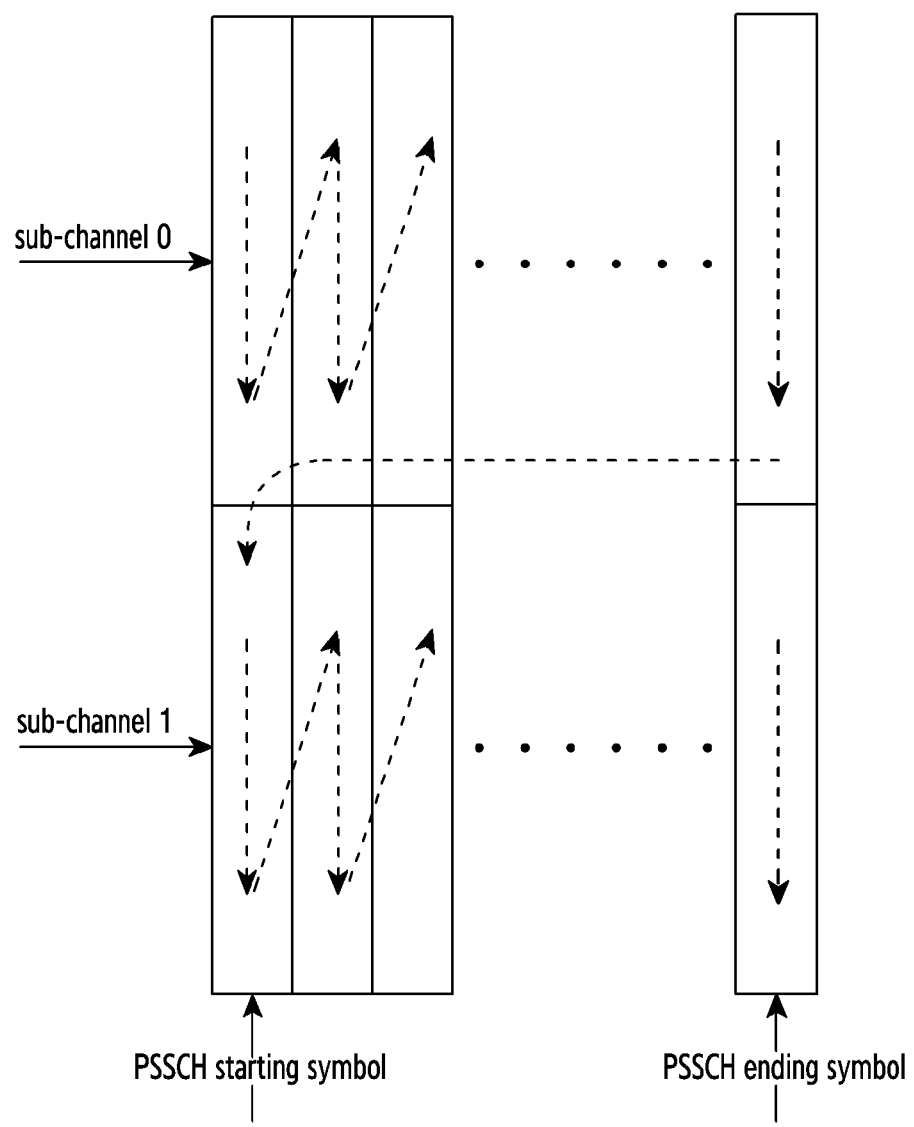

[Fig. 15]
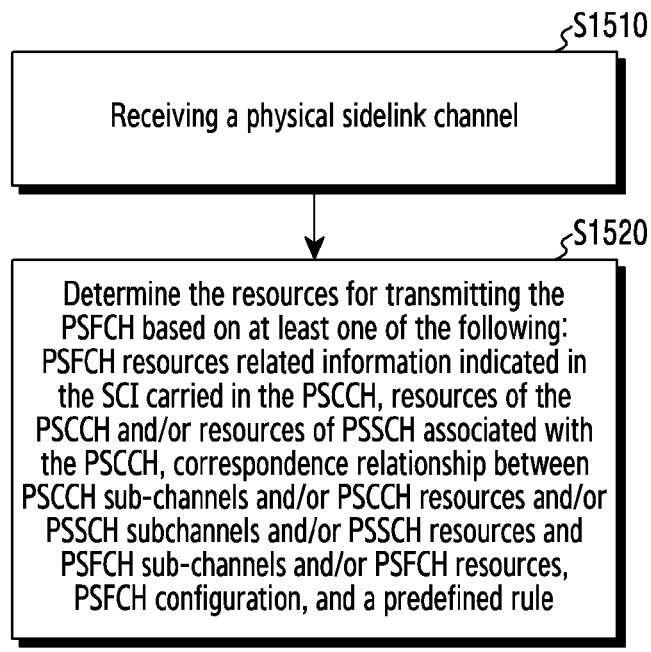
[Fig. 16]
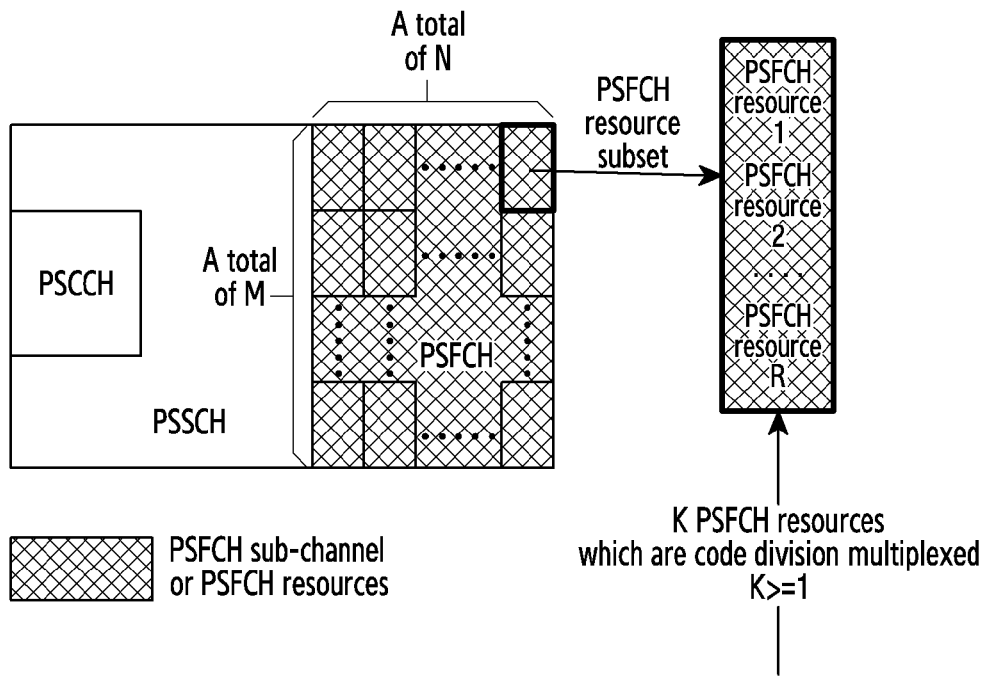

[Fig. 17]
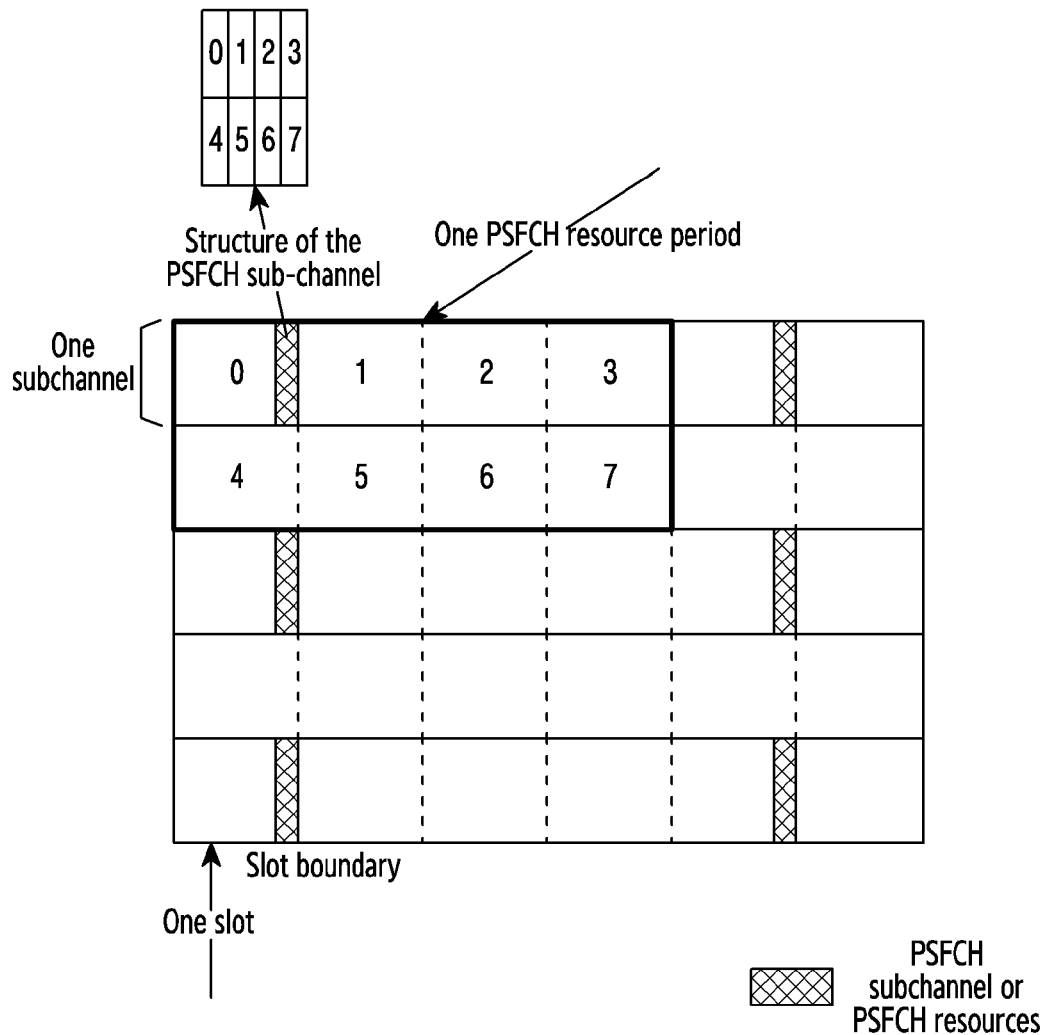

[Fig. 18]
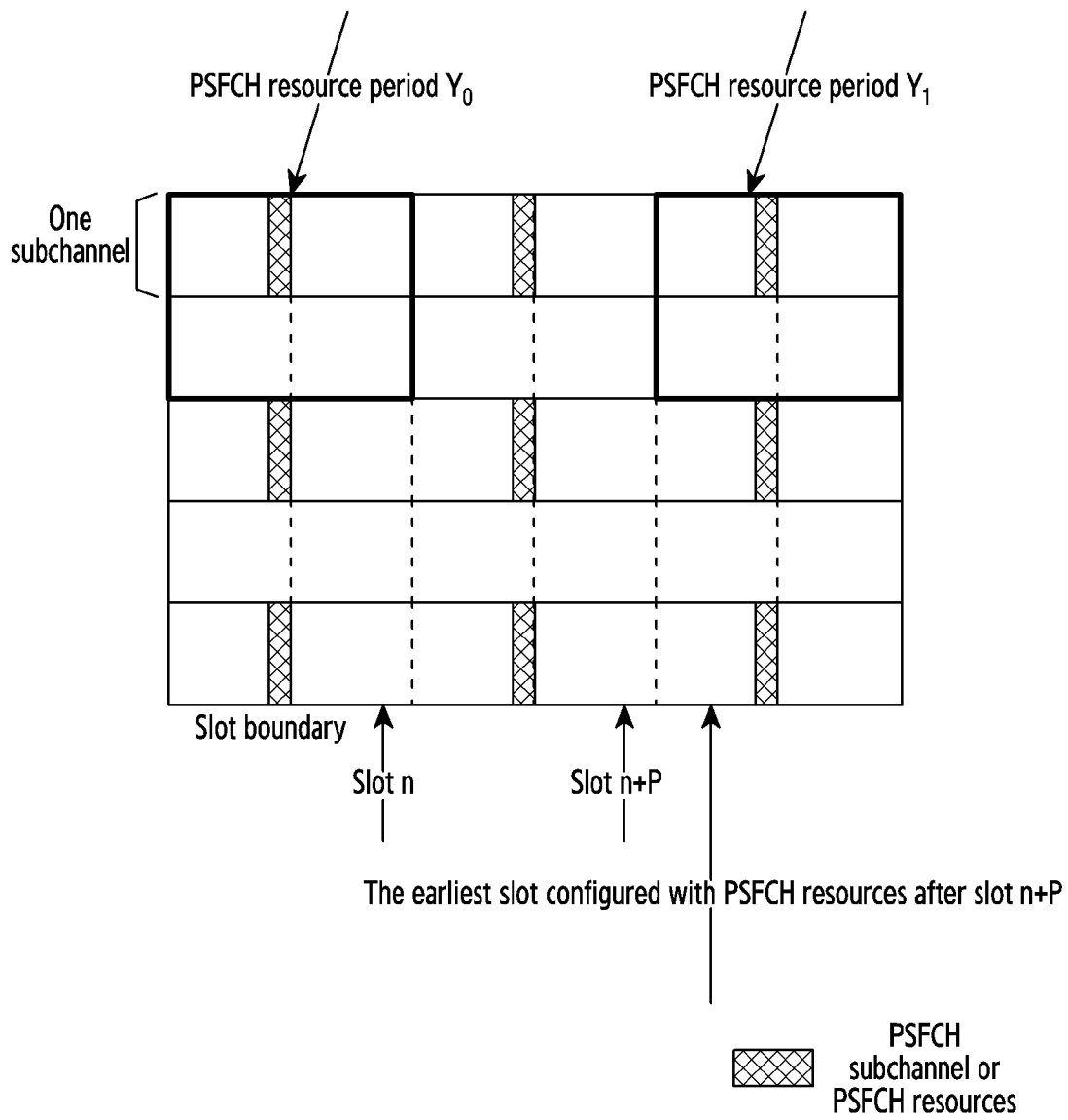
[Fig. 19]
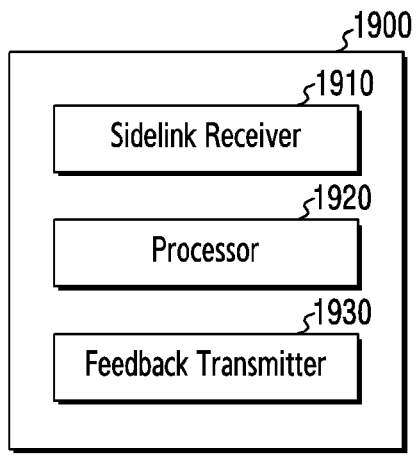

[Fig. 20]
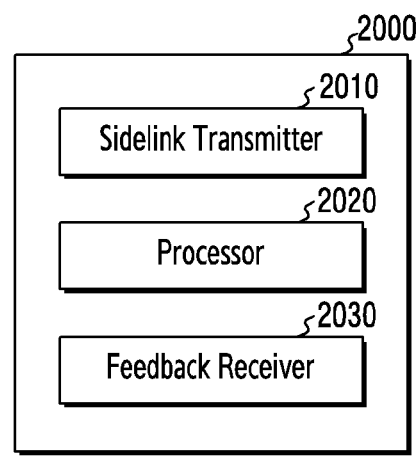

METHOD, RECEPTION DEVICE AND TRANSMISSION DEVICE FOR SIDELINK COMMUNICATION

CROSS-REFERENCE TO RELATED APPLICATIONS

This application is a 371 National Stage of International Application No. PCT/KR2020/005771, filed Apr. 29, 2020, which claims priority to Chinese Patent Application No. 201910365519.2, filed Apr. 30, 2019, Chinese Patent Application No. 201910759378.2, filed Aug. 16, 2019, Chinese Patent Application No. 201910939916.6, filed Sep. 30, 2019, and Chinese Patent Application No. 201911082918.4, filed Nov. 7, 2019, the disclosures of which are herein incorporated by reference in their entirety.

BACKGROUND

1. Field

The present invention relates to a field of wireless communication technologies, and relates to a method for transmitting sidelink (SL) data and corresponding sidelink feedback messages in sidelink communication in a fifth generation new radio access technology (5G NR) system. More specifically, it relates to a method, a reception device, and a transmission device for determining resources for a physical sidelink feedback channel.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In the Long Term Evolution (LTE) technology, sidelink communication includes two main mechanisms of direct communication for device to device (D2D) and communication for vehicle to vehicle/infrastructure/pedestrian/network (hereinafter referred to as V2X). V2X is designed based on D2D technology, which is superior to D2D in terms of data rate, delay, reliability, link capacity and so on. It is the most representative sidelink communication technology in LTE technology.

In a LTE V2X system, different physical channels, including a Physical Sidelink Control Channel (PSCCH) and a Physical Sidelink Shared Channel (PSSCH), are defined in sidelink communication. The PSSCH is used to carry data, and the PSCCH is used to carry sidelink control information (SCI). Resources locations in a time domain and a frequency domain for associated PSSCH transmission, the modulation and coding mode, the ID of a receiving target corresponding to the PSSCH, etc., are indicated in the SCI. It is also defined in the sidelink communication that a sub-channel is a minimum unit for resources allocation, and a sub-channel includes control channel resources or data channel resources, or both. Alternatively, a sub-channel can be defined for a specific channel. For example, a PSSCH sub-channel can be defined independently.

From the perspective of resource allocation, the LTE V2X system includes two modes: a resource allocation mode (Mode 3) based on base station scheduling and a resource allocation mode (Mode 4) in which a user equipment (UE) performs autonomous resource selection. Both modes are based on sub-channels defined in the sidelink system, and the base station schedules or the UE autonomously selects several control and/or data sub-channels for sidelink transmission.

The 5G NR system, as an evolution technology of LTE, correspondingly further includes evolution of sidelink communication, and the concepts of PSCCH and PSSCH are similarly introduced in NR V2X. Further, unlike the sidelink communication system of LTE in which Hybrid Automatic Repeat reQuest Acknowledgement (HARQ-ACK) feedback is not supported, the HARQ-ACK feedback mechanism is introduced in the NR V2X. The mechanism is applicable to unicast and groupcast services. After data and the corresponding SCI are transmitted by a transmission UE, a reception UE transmits corresponding acknowledgment/negative acknowledgment (ACK/NACK) feedback information to the transmission UE, so that the transmission UE determines whether retransmission of data is required. In the NR V2X, a channel for carrying ACK/NACK feedback information is a Physical Sidelink Feedback Channel (PSFCH).

SUMMARY

The method and device for sidelink communication according to embodiments of the present application may determine a structure and resources of a physical sidelink feedback channel for carrying HARQ-ACK feedback information, and correspondence relationship and mapping between the physical sidelink feedback channel resources and corresponding data channel resources and/or control channel resources.

At least one embodiment of the present application provides a method and a device for sidelink communication, which enable determination of a structure of and resources of a physical sidelink feedback channel for carrying HARQ-ACK feedback information in sidelink communications, and a correspondence relationship and mapping between the resources of the physical sidelink feedback channel and resources of a corresponding data channel and/or resources of a corresponding control channel.

The present application provides a receiving method for sidelink communication, a transmitting method for sidelink communication, a reception device for sidelink communication, and a transmission device for sidelink communication.

According to a first aspect of the present application, a method for sidelink communication is provided. The method for sidelink communication may include: receiving a physical sidelink channel, to obtain sidelink data corresponding to the physical sidelink channel; obtaining physical sidelink feedback channel (PSFCH) configuration, wherein a PSFCH is used to carry feedback information for the sidelink data; determining at least one PSFCH resource for transmitting the PSFCH based on the PSFCH configuration; and transmitting the PSFCH on the determined PSFCH resources.

With reference to the first aspect, in an implementation of the first aspect, the PSFCH configuration may be indicated in at least one of a predefined configuration, broadcasted or groupcasted configuration, sidelink resource pool configuration, User-Equipment (UE)-specific configuration or UE-group-specific configuration, sidelink control information (SCI), and a sidelink grant message.

With reference to the first aspect and the foregoing implementation, in another implementation of the first aspect, the PSFCH configuration may include at least one of the following: PSFCH resource pool configuration; PSFCH resource configuration; PSFCH sub-channel configuration; PSFCH channel structure configuration; configuration corresponding to feedback of unicast; configuration corresponding to feedback of groupcast; whether to enable multiplexing and/or bundling of the feedback information; configuration for multiplexing and/or bundling of the feedback information.

With reference to the first aspect and the foregoing implementation, in another implementation of the first aspect, the determining at least one PSFCH resource for transmitting the PSFCH may further include determining at least one of the following: whether to transmit the PSFCH, and whether the at least one PSFCH resource for transmitting the PSFCH exists.

With reference to the first aspect and the foregoing implementation, in another implementation of the first aspect, the physical sidelink channel may be at least one of a physical sidelink control channel (PSCCH), a physical sidelink shared channel (PSSCH), and a PSSCH associated with the PSCCH.

With reference to the first aspect and the foregoing implementation, in another implementation of the first aspect, the received physical sidelink channel may be transmitted on multiple physical sidelink channel resources, and the transmitting the PSFCH may include determining a PSFCH transmission mode based on at least one of the following: the PSFCH configuration, information transmitted on the received physical sidelink channel and a predefined rule.

With reference to the first aspect and the foregoing implementation, in another implementation of the first aspect, the information transmitted on the received physical sidelink channel may further include at least one of the following: whether more than one physical sidelink channel resource of the multiple physical sidelink channel resources carries the same transport blocks (TBs); whether more than one physical sidelink channel resource of the multiple physical sidelink channel resources carries bundled transport blocks (TBs); whether sidelink data carried by more than one physical sidelink channel resources of the multiple physical sidelink channel resources is transmitted by the same terminal.

With reference to the first aspect and the foregoing implementation, in another implementation of the first aspect, the received physical sidelink channel may be transmitted on multiple physical sidelink channel resources, and the transmitting the PSFCH may include transmitting at least one PSFCH based on at least one of the following PSFCH transmission modes in which: one transmitted PSFCH is used for indicating feedback information corresponding to physical sidelink channels carried on the multiple physical sidelink channel resources, and physical sidelink channels carried on at least two physical sidelink channel resources of the multiple physical sidelink channel resources correspond to the same or bundled sidelink data or transport blocks (TBs); one transmitted PSFCH is used for indicating feedback information corresponding to physical sidelink channels carried on the multiple physical sidelink channel resources, and physical sidelink channels carried on at least two physical sidelink channel resources of the multiple physical sidelink channel resources correspond to independent sidelink data or TBs; one transmitted PSFCH is used for indicating feedback information corresponding to physical sidelink channels carried on one or more than one physical sidelink channel resource of the multiple physical sidelink channel resources, and physical sidelink channels carried on at least two physical sidelink channel resources in the more than one physical sidelink channel resource correspond to the same or bundled sidelink data or TBs; one transmitted PSFCH is used for indicating feedback information corresponding to physical sidelink channels carried on one or more than one physical sidelink channel resources of the multiple physical sidelink channel resources, and physical sidelink channels carried on at least two physical sidelink channel resources in the more than one physical sidelink channel resource correspond to independent sidelink data or TBs.

With reference to the first aspect and the foregoing implementation, in another implementation of the first aspect, the one transmitted PSFCH may be used to carry feedback information of sidelink data corresponding to the received physical sidelink channel or one subset of the received physical sidelink channel.

With reference to the first aspect and the foregoing implementation, in another implementation of the first aspect, in one transmitted PSFCH, the same information field may indicate feedback information corresponding to more than one physical sidelink channel or feedback information corresponding to physical sidelink channels carried on more than one physical sidelink channel resource, and the more than one physical sidelink channel or the physical sidelink channels carried on the more than one physical sidelink channel resources may be transmitted by the same terminal.

With reference to the first aspect and the foregoing implementation, in another implementation of the first aspect, the one transmitted PSFCH may include at least one of the following information in which: the same information field is used to indicate feedback information corresponding to more than one physical sidelink channel or feedback information corresponding to physical sidelink channels carried on more than one physical sidelink channel resource; and independent information fields are used to indicate feedback information corresponding to each physical sidelink channel or feedback information corresponding to physical sidelink channels carried on each physical sidelink channel resource.

With reference to the first aspect and the foregoing implementation, in another implementation of the first aspect, the resources used for transmitting the PSFCH may be determined based on at least one of the following: PSFCH resources related information indicated in sidelink control information (SCI) associated with the sidelink data, resources of the received physical sidelink channel, correspondence relationship between physical sidelink channel resources and PSFCH resources, the PSFCH configuration, and a predefined rule.

With reference to the first aspect and the foregoing implementation, in another implementation of the first aspect, the correspondence relationship may include that R physical sidelink channel resources correspond to S PSFCH resources, wherein R and S are positive integers; and wherein, one physical sidelink channel resources may correspond to at least one of the following: a minimum resource scheduling unit for a corresponding physical sidelink channel in a time domain and a frequency domain; and a minimum resource scheduling unit for a corresponding physical sidelink channel in a time domain, a frequency domain, and a code domain; and wherein one PSFCH resources corresponds to a minimum resource scheduling unit for a corresponding PSFCH in a time domain, a frequency domain and a code domain.

With reference to the first aspect and the foregoing implementation, in another implementation of the first aspect, PSFCH resources corresponding to physical sidelink channel resources on a M1th sidelink sub-channel in a N1th slot within a Y0th PSFCH resource period may be first PSFCH resources on a PSFCH sub-channel configured in a Y1th resource period, wherein a mapping between Y0 and Y1 may be predefined or configured or indicated by specific signaling, wherein a mapping between M1 and at least one of time domain resources, frequency domain resources, and code domain resources of the first PSFCH resources may be predefined or configured or indicated by specific signaling, and wherein a mapping between N1 and at least one of time domain resources, frequency domain resources, and code domain resources of the first PSFCH resources may be predefined or configured or indicated by specific signaling, wherein Y0, Y1, M1, and N1 are all positive integers, and wherein the PSFCH resource periods may be N slots in the time domain and M sidelink sub-channels in the frequency domain including one PSFCH sub-channel, respectively, the predefined mappings are defined in or derived from the PSFCH configuration and the specific signaling is sidelink control information (SCI) or a sidelink grant message associated with the sidelink data.

With reference to the first aspect and the foregoing implementation, in another implementation of the first aspect, the N slots in the time domain may be consecutive in the time domain in the sidelink resource pool, the M sidelink sub-channels in a frequency domain may be consecutive in the frequency domain in the sidelink resource pool.

With reference to the first aspect and the foregoing implementation, in another implementation of the first aspect, the determining at least one PSFCH resource for transmitting the PSFCH based on the PSFCH configuration may include: determining a PSFCH resource pool for transmitting the PSFCH based on the PSFCH configuration; and determining at least one PSFCH resource for transmitting the PSFCH from the PSFCH resource pool.

With reference to the first aspect and the foregoing implementation, in another implementation of the first aspect, the PSFCH resource pool may include multiple PSFCH sub-channels, and each PSFCH sub-channel may include one PSFCH resource or multiple PSFCH resources multiplexed in at least one of the following multiplexing modes: time division multiplexing (TDM), frequency division multiplexing (FDM) and code division multiplexing (CDM).

With reference to the first aspect and the foregoing implementation, in another implementation of the first aspect, the PSFCH configuration may be associated with the sidelink resource pool configuration, the determining a PSFCH resource pool for transmitting the PSFCH based on the PSFCH configuration may include: determining the PSFCH resource pool based on at least one of the PSFCH configuration, the sidelink resource pool configuration, and a first association relationship between the PSFCH configuration and the sidelink resource pool configuration.

With reference to the first aspect and the foregoing implementation, in another implementation of the first aspect, the at least one PSFCH sub-channel or the at least one PSFCH resource may be periodically configured in the frequency domain or periodically configured in the time domain and the frequency domain in a sidelink resource pool associated with the PSFCH resource pool, the period for the time domain is N slots, and the period for the frequency domain is M sidelink sub-channels, wherein one PSFCH sub-channel includes one PSFCH resource or multiple PSFCH resources multiplexed in at least one of the following multiplexing modes: time division multiplexing (TDM), frequency division multiplexing (FDM) and code division multiplexing (CDM), and wherein N and M are positive integers that can be configured, and $1 \leq N \leq +\infty$, $1 \leq M \leq +\infty$.

With reference to the first aspect and the foregoing implementation, in another implementation of the first aspect, the PSFCH configuration is associated with the physical sidelink channel configuration, and the determining a PSFCH resource pool for transmitting the PSFCH based on the PSFCH configuration may include: determining the PSFCH resource pool based on at least one of the PSFCH configuration, the physical sidelink channel configuration, and a second association relationship between the PSFCH configuration and the physical sidelink channel configuration.

With reference to the first aspect and the foregoing implementation, in another implementation of the first aspect, $+\infty$ indicates that transmitting the PSFCH in the sidelink resource pool is not supported.

With reference to the first aspect and the foregoing implementation, in another implementation of the first aspect, each configured PSFCH sub-channel may include M*N PSFCH resource subsets, and each PSFCH resource subset may include K PSFCH resources, and wherein if M is greater than 1 or N is greater than 1, the M*N PSFCH resource subsets may be time division multiplexed and/or frequency division multiplexed, and the occupied time domain resources and frequency domain resources do not overlap with each other, and if K is greater than 1, the K PSFCH resources may be time division multiplexed on the same time domain resources and frequency domain resources, and K is a positive integer.

With reference to the first aspect and the foregoing implementation, in another implementation of the first aspect, PSFCH resources corresponding to physical sidelink channel resources on the M1th sidelink sub-channel in the N1th slot within the Y0th PSFCH resource period may be all resources in a PQth PSFCH resource subset on one PSFCH sub-channel configured in the Y1 resource period, wherein a mapping between Y0 and Y1 may be predefined or configured or indicated by specific signaling, wherein a mapping between M1 and PQ and a mapping between N1 and PQ may be predefined or configured or indicated by specific signaling, wherein Y0, Y1, M1, N1 and PQ are all positive integers, $1 \leq PQ \leq M*N$, and wherein the PSFCH resource periods are N slots in the time domain and M sidelink sub-channels in the frequency domain including one PSFCH sub-channel, respectively, the predefined mappings are defined in or derived from the PSFCH configuration and the specific signaling is sidelink control information (SCI) or a sidelink grant message associated with the sidelink data.

With reference to the first aspect and the foregoing implementation, in another implementation of the first aspect, the transmitting the PSFCH may include: one transmitted PSFCH carrying feedback information corresponding to multiple physical sidelink channels, the multiple physical sidelink channels being transmitted by multiple terminals; determining transmitting power of the one PSFCH based on the power control information of the multiple physical sidelink channels obtained from the multiple terminals; transmitting the one PSFCH associated with the multiple physical sidelink channels on the determined PSFCH resources based on the transmitting power of the PSFCH. The power control information may include at least one of the following: a lowest and/or highest pathloss of the multiple terminals; an average of pathlosses of the multiple terminals; a sum of pathlosses of the multiple terminals; a pathloss of a terminal of the multiple terminals corresponding to a latest one physical sidelink channel in the time domain; a pathloss of a predefined or configured one terminal of the multiple terminals; a pathloss corresponding to a terminal of the multiple terminals with a farthest geographical distance.

With reference to the first aspect and the foregoing implementation, in another implementation of the first aspect, the N slots in the time domain may be consecutive in the time domain in the sidelink resource pool, the M sidelink sub-channels in a frequency domain may be consecutive in the frequency domain in the sidelink resource pool.

With reference to the first aspect and the foregoing implementation, in another implementation of the first aspect, determining the resources used for transmitting the PSFCH based on resources of the received physical sidelink channel and correspondence relationship between physical sidelink channel resources and PSFCH resources may include: determining PSFCH resources corresponding to the resources of the received physical sidelink channel; if the corresponding PSFCH resources include one PSFCH resource, determining that the one PSFCH resource is used to transmit the PSFCH; if the corresponding PSFCH resources include multiple PSFCH resources, determining second PSFCH resources used to transmit the PSFCH of the multiple PSFCH resources based on at least one of the following: the PSFCH configuration, content of feedback information carried by the PSFCH, information transmitted on the received physical sidelink channel and a predefined rule; wherein the second PSFCH resources are all or part of the multiple PSFCH resources.

With reference to the first aspect and the foregoing implementation, in another implementation of the first aspect, the PSFCH configuration may include at least one of the following: configuration corresponding to feedback of groupcast; and configuration indicating whether to enable multiplexing and/or bundling of the feedback information.

With reference to the first aspect and the foregoing implementation, in another implementation of the first aspect, when the received physical sidelink channel is transmitted on multiple physical sidelink channel resources, information transmitted on the received physical sidelink channel may further include information indicating at least one of the following: whether more than one physical sidelink channel resource of the multiple physical sidelink channel resources carries the same transport blocks (TBs); whether more than one physical sidelink channel resource of the multiple physical sidelink channel resources carries bundled TBs; and whether sidelink data carried by more than one physical sidelink channel resource of the multiple physical sidelink channel resources is transmitted by the same terminal.

With reference to the first aspect and the foregoing implementation, in another implementation of the first aspect, the transmitting the PSFCH on determined PSFCH resources includes transmitting the PSFCH according to at least one of the following: mapping one PSFCH to be transmitted to one PSFCH resource; mapping or rate matching one PSFCH to be transmitted to one PSFCH resource, the mapping or rate matching being repeated T times on T PSFCH resources; and mapping or rate matching one PSFCH to be transmitted to T PSFCH resources; wherein T is an integer greater than one.

With reference to the first aspect and the foregoing implementation, in another implementation of the first aspect, the method may further include determining to transmit or receive a physical sidelink channel on remaining PSFCH resources not used to transmit a PSFCH of the multiple PSFCH resources, or determining the remaining resources to be vacant, based on the PSFCH configuration.

With reference to the first aspect and the foregoing implementation, in another implementation of the first aspect, the receiving the physical sidelink channel may include determining, based on the PSFCH configuration, whether a terminal that transmits the physical sidelink channel uses third PSFCH resources which are in the same slot in the time domain and in the same sidelink sub-channel in the frequency domain as physical sidelink channel resources used by the terminal to transmit physical sidelink channels, to transmit the physical sidelink channel, and whether to receive the physical sidelink channel on the third PSFCH resources.

With reference to the first aspect and the above implementation thereof, in another implementation of the first aspect, the receiving the physical sidelink channel may include determining, based on at least one of sidelink control information (SCI) associated with the received sidelink data and a sidelink grant message associated with the received sidelink data, whether the terminal that transmits the physical sidelink channel uses the fourth PSFCH resources which are in the same slot in the time domain and in the same sidelink sub-channel in the frequency domain, to transmit the physical sidelink channel, and whether to receive the physical sidelink channel on the fourth PSFCH resources.

With reference to the first aspect and the foregoing implementation, in another implementation of the first aspect, the PSFCH configuration is indicated by specific signaling, wherein the specific signaling is at least one of physical layer signaling and high layer signaling.

With reference to the first aspect and the foregoing implementation, in another implementation of the first aspect, if the specific signaling is the physical layer signaling, a mapping configured or indicated by the physical layer signaling is applied only to a sidelink transmission scheduled by or associated with the physical layer signaling.

With reference to the first aspect and the above implementation thereof, in another implementation of the first aspect, the pathloss may be derived and determined based on at least one of the following of a pre-defined signal: received power of the predefined signal, a pre-configured target received power of the predefined signal, and pre-configured transmitting power or maximum transmitting power corresponding to the predefined signal.

With reference to the first aspect and the foregoing implementation, in another implementation of the first aspect, the predefined signal includes at least one of the following: a reference signal received power (RSRP), a reference signal received quality (RSRQ), and a received signal strength indicator (RSSI).

With reference to the first aspect and the foregoing implementation, in another implementation of the first aspect, the configuration dynamically indicated by the physical layer signaling rewrites configuration semi-statically indicated by the high layer signaling.

According to a second aspect of the present application, a method for sidelink communication is provided. The transmitting method for sidelink communication may include: transmitting a physical sidelink channel, to transmit sidelink data corresponding to the physical sidelink channel; obtaining physical sidelink feedback channel (PSFCH) configuration, wherein a PSFCH is used to carry feedback information for the sidelink data; determining at least one PSFCH resource for receiving the PSFCH based on the PSFCH configuration; and receiving the PSFCH on the determined PSFCH resources.

With reference to the second aspect, in an implementation of the second aspect, the PSFCH configuration may be indicated in at least one of a predefined configuration, broadcasted or groupcasted configuration, sidelink resource pool configuration, UE-specific configuration or UE-group-specific configuration, sidelink control information (SCI), and a sidelink grant message.

With reference to the second aspect and the foregoing implementation, in another implementation of the second aspect, the PSFCH configuration may include at least one of the following: PSFCH resource pool configuration; PSFCH resource configuration; PSFCH sub-channel configuration; PSFCH channel structure configuration; configuration corresponding to feedback of unicast; configuration corresponding to feedback of groupcast; whether to enable multiplexing and/or bundling of the feedback information; and configuration for multiplexing and/or bundling of the feedback information.

With reference to the second aspect and the foregoing implementation, in another implementation of the second aspect, the determining at least one PSFCH resource for receiving the PSFCH may further include determining at least one of the following: whether to receive the PSFCH, and whether the at least one PSFCH resource for receiving the PSFCH exists.

With reference to the second aspect and the foregoing implementation, in another implementation of the second aspect, the physical sidelink channel may be at least one of a physical sidelink control channel (PSCCH), a physical sidelink shared channel (PSSCH), and a PSSCH associated with the PSCCH.

With reference to the second aspect and the foregoing implementation, in another implementation of the second aspect, the transmitted physical sidelink channel may be transmitted on multiple physical sidelink channel resources, and the receiving the PSFCH may include determining a PSFCH reception mode based on at least one of the following: PSFCH configuration, information transmitted on the transmitted physical sidelink channel and a predefined rule.

With reference to the second aspect and the foregoing implementation, in another implementation of the second aspect, the information transmitted on the transmitted physical sidelink channel may further include at least one of the following: whether more than one physical sidelink channel resource of the multiple physical sidelink channel resources carries the same transport blocks (TBs); whether more than one physical sidelink channel resource of the multiple physical sidelink channel resources carries bundled transport blocks (TBs); and whether sidelink data carried by more than one physical sidelink channel resource of the multiple physical sidelink channel resources is transmitted by the same terminal.

With reference to the second aspect and the foregoing implementation, in another implementation of the second aspect, the transmitted physical sidelink channel may be transmitted on multiple physical sidelink channel resources, and the receiving the PSFCH may include receiving at least one PSFCH based on at least one of the following PSFCH reception modes in which: one received PSFCH is used for indicating feedback information corresponding to physical sidelink channels carried on the multiple physical sidelink channel resources, and physical sidelink channels carried on at least two physical sidelink channel resources of the multiple physical sidelink channel resources correspond to the same or bundled sidelink data or transport blocks (TBs); one received PSFCH is used for indicating feedback information corresponding to physical sidelink channels carried on the multiple physical sidelink channel resources, and physical sidelink channels carried on at least two physical sidelink channel resources of the multiple physical sidelink channel resources correspond to independent sidelink data or TBs; one received PSFCH is used for indicating feedback information corresponding to physical sidelink channels carried on one or more than one physical sidelink channel resource of the multiple physical sidelink channel resources, and physical sidelink channels carried on at least two physical sidelink channel resources in the more than one physical sidelink channel resource correspond to the same or bundled sidelink data or TBs; one received PSFCH is used for indicating feedback information corresponding to physical sidelink channels carried on one or more than one physical sidelink channel resource of the multiple physical sidelink channel resources, and physical sidelink channels carried on at least two physical sidelink channel resources in the more than one physical sidelink channel resource correspond to independent sidelink data or TBs.

With reference to the second aspect and the foregoing implementation, in another implementation of the second aspect, the one received PSFCH includes at least one of the following information in which: the same information field is used to indicate feedback information corresponding to more than one physical sidelink channel or feedback information corresponding to physical sidelink channels carried on more than one physical sidelink channel resource; and independent information fields are used to indicate feedback information corresponding to each physical sidelink channel or feedback information corresponding to physical sidelink channels carried on each physical sidelink channel resource.

With reference to the second aspect and the foregoing implementation, in another implementation of the second aspect, the one received PSFCH is used to carry feedback information of sidelink data corresponding to the transmitted physical sidelink channel or one subset of the transmitted physical sidelink channel.

With reference to the second aspect and the foregoing implementation, in another implementation of the second aspect, in one received PSFCH, the same information field may indicate feedback information corresponding to more than one physical sidelink channel or feedback information corresponding to physical sidelink channels carried on more than one physical sidelink channel resource, the more than one physical sidelink channel or the physical sidelink channels carried on the more than one physical sidelink channel resource may be transmitted by the same terminal.

With reference to the second aspect and the foregoing implementation, in another implementation of the second aspect, the resources used for receiving the PSFCH is determined based on at least one of the following: PSFCH resources related information indicated in sidelink control information (SCI) associated with the sidelink data, resources of the transmitted physical sidelink channel, correspondence relationship between physical sidelink channel resources and PSFCH resources, the PSFCH configuration, and a predefined rule.

With reference to the second aspect and the foregoing implementation, in another implementation of the second aspect, the correspondence relationship may include that the R physical sidelink channel resources correspond to S PSFCH resources, wherein R and S are positive integers; and wherein, one physical sidelink channel resource corresponds to at least one of the following: a minimum resource scheduling unit for a corresponding physical sidelink channel in a time domain and a frequency domain; and a minimum resource scheduling unit for a corresponding physical sidelink channel in a time domain, a frequency domain, and a code domain; and wherein one PSFCH resources corresponds to a minimum resource scheduling unit for a corresponding PSFCH in a time domain, a frequency domain and a code domain.

With reference to the second aspect and the foregoing implementation, in another implementation of the second aspect, PSFCH resources corresponding to physical sidelink channel resources on a M1th sidelink sub-channel in a N1th slot within a Y0th PSFCH resource period may be first PSFCH resources on a PSFCH sub-channel configured in a Y1th resource period, wherein a mapping between Y0 and Y1 may be predefined or configured or indicated by specific signaling, wherein a mapping between M1 and at least one of time domain resources, frequency domain resources, and code domain resources of the first PSFCH resources may be predefined or configured or indicated by specific signaling, and wherein a mapping between N1 and at least one of time domain resources, frequency domain resources, and code domain resources of the first PSFCH resources may be predefined or configured or indicated by specific signaling, wherein Y0, Y1, M1, and N1 are all positive integers, and wherein the PSFCH resource periods are N slots in the time domain and M sidelink sub-channels in the frequency domain including one PSFCH sub-channel, respectively, the predefined mappings are defined in or derived from the PSFCH configuration and the specific signaling is sidelink control information (SCI) or a sidelink grant message associated with the sidelink data.

With reference to the second aspect and the foregoing implementation, in another implementation of the second aspect, the determining at least one PSFCH resource for receiving the PSFCH based on the PSFCH configuration includes: determining a PSFCH resource pool for receiving the PSFCH based on the PSFCH configuration; and determining at least one PSFCH resource for receiving the PSFCH from the PSFCH resource pool.

With reference to the second aspect and the foregoing implementation, in another implementation of the second aspect, the PSFCH resource pool may include multiple PSFCH sub-channels, and each PSFCH sub-channel may include one PSFCH resource or multiple PSFCH resources multiplexed in at least one of the following multiplexing modes: time division multiplexing (TDM), frequency division multiplexing (FDM) and code division multiplexing (CDM).

With reference to the second aspect and the foregoing implementation, in another implementation of the second aspect, the at least one PSFCH sub-channel or the at least one PSFCH resource is periodically configured in the frequency domain or periodically configured in the time domain and the frequency domain in a sidelink resource pool associated with the PSFCH resource pool, the period for the time domain is N slots, and the period for the frequency domain is M sidelink sub-channels, wherein one PSFCH sub-channel includes one PSFCH resource or multiple PSFCH resources multiplexed in at least one of the following multiplexing modes: time division multiplexing (TDM), frequency division multiplexing (FDM) and code division multiplexing (CDM), and wherein N and M are positive integers that can be configured, and $1 \le N \le +\infty$, $1 \le M \le +\infty$.

With reference to the second aspect and the foregoing implementation, in another implementation of the second aspect, the N slots in the time domain are consecutive in the time domain in the sidelink resource pool, the M sidelink sub-channels in the frequency domain are consecutive in the frequency domain in the sidelink resource pool.

With reference to the second aspect and the foregoing implementation, in another implementation of the second aspect, the PSFCH configuration is associated with the sidelink resource pool configuration, the determining the PSFCH resource pool for receiving the PSFCH based on the PSFCH configuration includes: determining the PSFCH resource pool based on at least one of the PSFCH configuration, the sidelink resource pool configuration, and a first association relationship between the PSFCH configuration and the sidelink resource pool configuration.

With reference to the second aspect and the foregoing implementation, in another implementation of the second aspect, the PSFCH configuration is associated with physical sidelink channel configuration, and the determining the PSFCH resource pool for receiving the PSFCH based on the PSFCH configuration includes: determining the PSFCH resource pool based on at least one of the PSFCH configuration, the physical sidelink channel configuration, and a second association relationship between the PSFCH configuration and the physical sidelink channel configuration.

With reference to the second aspect and the foregoing implementation, in another implementation of the second aspect, each configured PSFCH sub-channel includes M*N PSFCH resource subsets, and each PSFCH resource subset includes K PSFCH resources, and wherein if M is greater than 1 or N is greater than 1, the M*N PSFCH resource subsets are time division multiplexed and/or frequency division multiplexed, and the occupied time domain resources and frequency domain resources do not overlap with each other, and if K is greater than 1, the K PSFCH resources are time division multiplexed on the same time domain resources and frequency domain resources, and K is a positive integer.

With reference to the second aspect and the foregoing implementation, in another implementation of the second aspect, PSFCH resources corresponding to physical sidelink channel resources on the M1th sidelink sub-channel in the N1th slot within the Y0th PSFCH resource period are all resources in the PQth PSFCH resource subset on one PSFCH sub-channel configured in the Y1 resource period, wherein a mapping between Y0 and Y1 may be predefined or configured or indicated by specific signaling, wherein a mapping between M1 and PQ and a mapping between N1 and PQ may be predefined or configured or indicated by specific signaling, wherein Y0, Y1, M1, N1 and PQ are all positive integers, 1≤PQ≤M*N, and wherein the PSFCH resource periods are N slots in the time domain and M sidelink sub-channels in the frequency domain including one PSFCH sub-channel, respectively, the predefined mappings are defined in or derived from the PSFCH configuration and the specific signaling is sidelink control information (SCI) or a sidelink grant message associated with the sidelink data.

With reference to the second aspect and the foregoing implementation, in another implementation of the second aspect, +∞ indicates that receiving the PSFCH in the sidelink resource pool is not supported.

With reference to the second aspect and the foregoing implementation, in another implementation of the second aspect, the N slots in the time domain may be consecutive in the time domain in the sidelink resource pool, the M sidelink sub-channels in a frequency domain may be consecutive in the frequency domain in the sidelink resource pool.

With reference to the second aspect and the foregoing implementation, in another implementation of the second aspect, determining the resources used for receiving the PSFCH based on resources of the received physical sidelink channel and correspondence relationship between physical sidelink channel resources and PSFCH resources includes: determining PSFCH resources corresponding to the resources of the transmitted physical sidelink channel; if the corresponding PSFCH resources includes one PSFCH resource, determining that the one PSFCH resource is used to receive the PSFCH; if the corresponding PSFCH resources includes multiple PSFCH resources, determining the second PSFCH resources used to receive the PSFCH of the multiple PSFCH resources based on at least one of the following: the PSFCH configuration, content of feedback information carried by the PSFCH, information transmitted on the transmitted physical sidelink channel and a predefined rule; wherein the second PSFCH resources are all or part of the multiple PSFCH resources.

With reference to the second aspect and the foregoing implementation, in another implementation of the second aspect, the PSFCH configuration includes at least one of the following: configuration corresponding to feedback of groupcast; configuration indicating whether to enable multiplexing and/or bundling of the feedback information.

With reference to the second aspect and the foregoing implementation, in another implementation of the second aspect, when the transmitted physical sidelink channel is transmitted on multiple physical sidelink channel resources, information transmitted on the transmitted physical sidelink channel further includes information indicating at least one of the following: whether more than one physical sidelink channel resource of the multiple physical sidelink channel resources carries the same transport blocks (TBs); whether more than one physical sidelink channel resource of the multiple physical sidelink channel resources carries bundled TBs; whether sidelink data carried by more than one physical sidelink channel resource of the multiple physical sidelink channel resources is transmitted by the same terminal.

With reference to the second aspect and the foregoing implementation, in another implementation of the second aspect, the receiving the PSFCH on determined PSFCH resources includes receiving according to at least one of the following: mapping one received PSFCH to one PSFCH resource; mapping or rate matching one received PSFCH to one PSFCH resource, the mapping or rate matching being repeated T times on T PSFCH resources; mapping or rate matching one received PSFCH to T PSFCH resources; wherein T is an integer greater than one.

With reference to the second aspect and the foregoing implementation, in another implementation of the second aspect, the method further includes determining to receive or transmit a physical sidelink channel on remaining PSFCH resources not used to receive a PSFCH of the multiple PSFCH resources or determining the remaining resources to be vacant based on the PSFCH configuration.

With reference to the second aspect and the foregoing implementation, in another implementation of the second aspect, the transmitting the physical sidelink channel includes determining, based on the PSFCH configuration, whether it is possible to use third PSFCH resources, which are in the same slot in the time domain and in the same sidelink sub-channel in the frequency domain as physical sidelink channel resources used to transmit physical sidelink channels, to transmit the physical sidelink channel, and whether to transmit the physical sidelink channel on the third PSFCH resources.

With reference to the second aspect and the above implementation thereof, in another implementation of the second aspect, the transmitting the physical sidelink channel includes using sidelink control information (SCI) associated with transmitted sidelink data, to indicate whether the physical sidelink channel is transmitted on the third PSFCH resources.

With reference to the second aspect and the foregoing implementation, in another implementation of the second aspect, the PSFCH configuration is indicated by specific signaling, wherein the specific signaling is at least one of physical layer signaling and high layer signaling.

With reference to the second aspect and the foregoing implementation, in another implementation of the second aspect, if the specific signaling is the physical layer signaling, a mapping configured or indicated by the physical layer signaling is supposed to be applied only to a sidelink transmission scheduled by or associated with the physical layer signaling.

With reference to the second aspect and the foregoing implementation, in another implementation of the second aspect, configuration dynamically indicated by the physical layer signaling rewrites configuration semi-statically indicated by the high layer signaling.

According to a third aspect of the present application, a reception device for sidelink communication is provided. The reception device may include: a sidelink receiver, configured to receive a physical sidelink channel to obtain sidelink data corresponding to the physical sidelink channel, and a processor, configured to obtain physical sidelink feedback channel (PSFCH) configuration, wherein a PSFCH is used to carry feedback information for the sidelink data and determine at least one PSFCH resource for transmitting the PSFCH based on the PSFCH configuration; and a feedback transmitter, configured to transmit the PSFCH on the determined PSFCH resources.

With reference to the third aspect, in an implementation of the third aspect, the PSFCH configuration may be indicated in at least one of a predefined configuration, broadcasted or groupcasted configuration, sidelink resource pool configuration, UE-specific configuration or UE-group-specific configuration, sidelink control information (SCI), and a sidelink grant message.

With reference to the third aspect and the foregoing implementation, in another implementation of the third aspect, the PSFCH configuration includes at least one of the following: PSFCH resource pool configuration; PSFCH resource configuration; PSFCH sub-channel configuration; PSFCH channel structure configuration; configuration corresponding to feedback of unicast; configuration corresponding to feedback of groupcast; whether to enable multiplexing and/or bundling of the feedback information; and configuration for multiplexing and/or bundling of the feedback information.

With reference to the third aspect and the foregoing implementation, in another implementation of the third aspect, the processor further determines at least one of the following: whether to transmit the PSFCH, and whether the at least one PSFCH resource for transmitting the PSFCH exists.

With reference to the third aspect and the foregoing implementation, in another implementation of the third aspect, the physical sidelink channel is at least one of a physical sidelink control channel (PSCCH), a physical sidelink shared channel (PSSCH), and a PSSCH associated with the PSCCH.

With reference to the third aspect and the foregoing implementation, in another implementation of the third aspect, the physical sidelink channel received by the sidelink receiver may be transmitted on multiple physical sidelink channel resources, and the feedback transmitter may determine a PSFCH transmission mode based on at least one of the following: PSFCH configuration, information transmitted on the received physical sidelink channel and a predefined rule.

With reference to the third aspect and the foregoing implementation, in another implementation of the third aspect, the information transmitted on the received physical sidelink channel may further include at least one of the following information about: whether more than one physical sidelink channel resource of the multiple physical sidelink channel resources carries the same transport blocks (TBs); whether more than one physical sidelink channel resource of the multiple physical sidelink channel resources carries bundled transport blocks (TBs); and whether sidelink data carried by more than one physical sidelink channel resource of the multiple physical sidelink channel resources is transmitted by the same terminal.

With reference to the third aspect and the foregoing implementation, in another implementation of the third aspect, the physical sidelink channel received by the sidelink receiver may be transmitted on multiple physical sidelink channel resources, and the transmitting the PSFCH includes transmitting at least one PSFCH based on at least one of the following PSFCH transmission modes in which: one transmitted PSFCH is used for indicating feedback information corresponding to physical sidelink channels carried on the multiple physical sidelink channel resources, and physical sidelink channels carried on at least two physical sidelink channel resources of the multiple physical sidelink channel resources correspond to the same or bundled sidelink data or transport blocks (TBs); one transmitted PSFCH is used for indicating feedback information corresponding to physical sidelink channels carried on the multiple physical sidelink channel resources, and physical sidelink channels carried on at least two physical sidelink channel resources of the multiple physical sidelink channel resources correspond to independent sidelink data or TBs; one transmitted PSFCH is used for indicating feedback information corresponding to physical sidelink channels carried on one or more than one physical sidelink channel resource of the multiple physical sidelink channel resources, and physical sidelink channels carried on at least two physical sidelink channel resources in the more than one physical sidelink channel resource correspond to the same or bundled sidelink data or TBs; one transmitted PSFCH is used for indicating feedback information corresponding to physical sidelink channels carried on one or more than one physical sidelink channel resource of the multiple physical sidelink channel resources, and physical sidelink channels carried on at least two physical sidelink channel resources in the more than one physical sidelink channel resource correspond to independent sidelink data or TBs.

With reference to the third aspect and the foregoing implementation, in another implementation of the third aspect, the one transmitted PSFCH by the feedback transmitter is used to carry feedback information of sidelink data corresponding to the received physical sidelink channel or one subset of the received physical sidelink channel.

With reference to the third aspect and the foregoing implementation, in another implementation of the third aspect, in one transmitted PSFCH by the feedback transmitter, the same information field may indicate feedback information corresponding to more than one physical sidelink channel or feedback information corresponding to physical sidelink channels carried on more than one physical sidelink channel resource, the more than one physical sidelink channel or the physical sidelink channels carried on the more than one physical sidelink channel resource may be transmitted by the same terminal.

With reference to the third aspect and the foregoing implementation, in another implementation of the third aspect, the one transmitted PSFCH includes at least one of the following in which: the same information field is used to indicate feedback information corresponding to more than one physical sidelink channel or feedback information corresponding to physical sidelink channels carried on more than one physical sidelink channel resource; and independent information fields are used to indicate feedback information corresponding to each physical sidelink channel or feedback information corresponding to physical sidelink channels carried on each physical sidelink channel resource.

With reference to the third aspect and the foregoing implementation, in another implementation of the third aspect, the processor may determine the resources used for transmitting the PSFCH based on at least one of the following: PSFCH resources related information indicated in sidelink control information (SCI) associated with the sidelink data, resources of the received physical sidelink channel, correspondence relationship between physical sidelink channel resources and PSFCH resources, the PSFCH configuration, and a predefined rule.

With reference to the third aspect and the foregoing implementation, in another implementation of the third aspect, the correspondence relationship may include that the R physical sidelink channel resources correspond to S PSFCH resources, wherein R and S are positive integers; and wherein, one physical sidelink channel resource may correspond to at least one of the following: a minimum resource scheduling unit for a corresponding physical sidelink channel in a time domain and a frequency domain; and a minimum resource scheduling unit for a corresponding physical sidelink channel in a time domain, a frequency domain, and a code domain; and wherein one PSFCH resource corresponds to a minimum resource scheduling unit for a corresponding PSFCH in a time domain, a frequency domain and a code domain.

With reference to the third aspect and the foregoing implementation, in another implementation of the third aspect, PSFCH resources corresponding to physical sidelink channel resources on the M1th sidelink sub-channel in the N1th slot within a Y0th PSFCH resource period may be first PSFCH resources on a PSFCH sub-channel configured in a Y1th resource period, wherein a mapping between Y0 and Y1 may be predefined or configured or indicated by specific signaling, wherein a mapping between M1 and at least one of time domain resources, frequency domain resources, and code domain resources of the first PSFCH resources may be predefined or configured or indicated by specific signaling, and wherein a mapping between N1 and at least one of time domain resources, frequency domain resources, and code domain resources of the first PSFCH resources may be predefined or configured or indicated by specific signaling, wherein Y0, Y1, M1, and N1 are all positive integers, and wherein the PSFCH resource period may include N slots in the time domain and M sidelink sub-channels in the frequency domain including one PSFCH sub-channel, the predefined mappings are defined in or derived from the PSFCH configuration and the specific signaling is sidelink control information (SCI) or a sidelink grant message associated with the sidelink data.

With reference to the third aspect and the foregoing implementation, in another implementation of the third aspect, the processor determines the at least one PSFCH resource according to the following: determining a PSFCH resource pool for transmitting the PSFCH based on the PSFCH configuration; and determining at least one PSFCH resource for transmitting the PSFCH from the PSFCH resource pool.

With reference to the third aspect and the foregoing implementation, in another implementation of the third aspect, the PSFCH resource pool includes multiple PSFCH sub-channels, and each PSFCH sub-channel may include one PSFCH resource or multiple PSFCH resources multiplexed in at least one of the following multiplexing modes: time division multiplexing (TDM), frequency division multiplexing (FDM) and code division multiplexing (CDM).

With reference to the third aspect and the foregoing implementation, in another implementation of the third aspect, the N slots in the time domain may be consecutive in the time domain in the sidelink resource pool, and the M sidelink sub-channels in a frequency domain may be consecutive in the frequency domain in the sidelink resource pool.

With reference to the third aspect and the foregoing implementation, in another implementation of the third aspect, the PSFCH configuration is associated with sidelink resource pool configuration, the processor determines a PSFCH resource pool for transmitting the PSFCH according to the following: determining the PSFCH resource pool based on at least one of the PSFCH configuration, the sidelink resource pool configuration, and a first association relationship between the PSFCH configuration and the sidelink resource pool configuration.

With reference to the third aspect and the foregoing implementation, in another implementation of the third aspect, the at least one PSFCH sub-channel or the at least one PSFCH resource is periodically configured in the frequency domain or periodically configured in the time domain and the frequency domain in a sidelink resource pool associated with the PSFCH resource pool, the period for the time domain is N slots, and the period for the frequency domain is M sidelink sub-channels, wherein one PSFCH sub-channel includes one PSFCH resource or multiple PSFCH resources multiplexed in at least one of the following multiplexing modes: time division multiplexing (TDM), frequency division multiplexing (FDM) and code division multiplexing (CDM), and wherein N and M are positive integers that can be configured, and $1 \leq N \leq +\infty$, $1 \leq M \leq +\infty$.

With reference to the third aspect and the foregoing implementation, in another implementation of the third aspect, the PSFCH configuration is associated with physical sidelink channel configuration, and the processor determines a PSFCH resource pool for transmitting the PSFCH according to the following: determining the PSFCH resource pool based on at least one of the PSFCH configuration, the physical sidelink channel configuration, and a second association relationship between the PSFCH configuration and the physical sidelink channel configuration.

With reference to the third aspect and the foregoing implementation, in another implementation of the third aspect, $+\infty$ indicates that transmitting the PSFCH in the sidelink resource pool is not supported.

With reference to the third aspect and the foregoing implementation, in another implementation of the third aspect, each configured PSFCH sub-channel may include M*N PSFCH resource subsets, and each PSFCH resource subset may include K PSFCH resources, and wherein if M is greater than 1 or N is greater than 1, the M*N PSFCH resource subsets may be time division multiplexed and/or frequency division multiplexed, and the occupied time domain resources and frequency domain resources do not overlap with each other, and if K is greater than 1, the K PSFCH resources may be time division multiplexed on the same time domain resources and frequency domain resources, and K is a positive integer.

With reference to the third aspect and the foregoing implementation, in another implementation of the third aspect, PSFCH resources corresponding to physical sidelink channel resources on the M1th sidelink sub-channel in the N1th slot within the Y0th PSFCH resource period may be all resources in the PQth PSFCH resource subset on one PSFCH sub-channel configured in the Y1 resource period, wherein a mapping between Y0 and Y1 may be predefined or configured or indicated by specific signaling, wherein a mapping between M1 and PQ and a mapping between N1 and PQ may be predefined or configured or indicated by specific signaling, wherein Y0, Y1, M1, N1 and PQ are all positive integers, $1 \leq PQ \leq M*N$, and wherein the PSFCH resource periods are N slots in the time domain and M sidelink sub-channels in the frequency domain including one PSFCH sub-channel, respectively, the predefined mappings are defined in or derived from the PSFCH configuration and the specific signaling is sidelink control information (SCI) or a sidelink grant message associated with the sidelink data.

With reference to the third aspect and the foregoing implementation, in another implementation of the third aspect, configuration dynamically indicated by a physical layer signaling rewrites configuration semi-statically indicated by a high layer signaling.

With reference to the third aspect and the foregoing implementation, in another implementation of the third aspect, the feedback transmitter transmits the PSFCH according to the following: one transmitted PSFCH carrying feedback information corresponding to multiple physical sidelink channels, and the multiple physical sidelink channels being transmitted by multiple terminals; determining transmitting power of the one PSFCH based on the power control information of the multiple physical sidelink channels obtained from the multiple terminals; and transmitting the one PSFCH associated with the multiple physical sidelink channels on determined PSFCH resources based on the transmitting power of the PSFCH. The power control information includes at least one of the following: a lowest and/or highest pathloss of the multiple terminals; an average of pathlosses of the multiple terminals; a sum of pathlosses of the multiple terminals; a pathloss of a terminal of the multiple terminals corresponding to the latest physical sidelink channel in the time domain; a pathloss of a predefined or configured one terminal of the multiple terminals; a pathloss corresponding to a terminal of the multiple terminals with the farthest geographical distance.

With reference to the third aspect and the foregoing implementation, in another implementation of the third aspect, the processor determines the resources used for transmitting the PSFCH according to the following: determining PSFCH resources corresponding to the resources of the received physical sidelink channel; if the corresponding PSFCH resources includes one PSFCH resource, determining that the one PSFCH resource is used to transmit the PSFCH; if the corresponding PSFCH resources includes multiple PSFCH resources, determining the second PSFCH resources used to transmit the PSFCH of the multiple PSFCH resources based on at least one of the following: the PSFCH configuration, content of feedback information carried by the PSFCH, information transmitted on the received physical sidelink channel and a predefined rule; wherein the second PSFCH resources are all or part of the multiple PSFCH resources.

With reference to the third aspect and the foregoing implementation, in another implementation of the third aspect, the PSFCH configuration includes at least one of the following: configuration corresponding to feedback of groupcast; and configuration indicating whether to enable multiplexing and/or bundling of the feedback information.

With reference to the third aspect and the foregoing implementation, in another implementation of the third aspect, when the received physical sidelink channel is transmitted on multiple physical sidelink channel resources, information transmitted on the received physical sidelink channel further includes information indicating at least one of the following: whether more than one physical sidelink channel resource of the multiple physical sidelink channel resources carries the same transport blocks (TBs); whether more than one physical sidelink channel resource of the multiple physical sidelink channel resources carries bundled TBs; whether sidelink data carried by more than one physical sidelink channel resource of the multiple physical sidelink channel resources is transmitted by the same terminal.

With reference to the third aspect and the foregoing implementation, in another implementation of the third aspect, the feedback transmitter transmits the PSFCH on determined PSFCH resources according to at least one of the following: mapping one PSFCH to be transmitted to one PSFCH resource; mapping or rate matching one PSFCH to be transmitted to one PSFCH resource, the mapping or rate matching being repeated T times on T PSFCH resources; and mapping or rate matching one PSFCH to be transmitted to T PSFCH resources; wherein T is an integer greater than one.

With reference to the third aspect and the foregoing implementation, in another implementation of the third aspect, the processor further determines to transmit or receive a physical sidelink channel on remaining PSFCH resources not used to transmit a PSFCH of the multiple PSFCH resources or determines the remaining resources to be vacant based on the PSFCH configuration.

With reference to the third aspect and the foregoing implementation, in another implementation of the third aspect, the sidelink receiver determines, based on the PSFCH configuration, whether a terminal that transmits the physical sidelink channel uses third PSFCH resources which are in the same slot in the time domain and in the same sidelink sub-channel in the frequency domain as physical sidelink channel resources used by the terminal to transmit physical sidelink channels, to transmit the physical sidelink channel, and whether to receive the physical sidelink channel on the third PSFCH resources.

With reference to the third aspect and the above implementation thereof, in another implementation of the third aspect, the sidelink receiver determines, based on at least one of sidelink control information (SCI) and a sidelink grant message associated with received sidelink data, whether the terminal that transmits the physical sidelink channel uses the third PSFCH resources, which is in the same slot in the time domain and in the same sidelink sub-channel in the frequency domain, to transmit the physical sidelink channel, and whether to receive the physical sidelink channel on the third PSFCH resources.

With reference to the third aspect and the foregoing implementation, in another implementation of the third aspect, the PSFCH configuration is indicated by specific signaling, wherein the specific signaling is at least one of physical layer signaling and high layer signaling.

With reference to the third aspect and the foregoing implementation, in another implementation of the third aspect, if the specific signaling is the physical layer signaling, a mapping configured or indicated by the physical layer signaling is applied only to a sidelink transmission scheduled by or associated with the physical layer signaling.

With reference to the third aspect and the above implementation thereof, in another implementation of the third aspect, the pathloss may be derived and determined based on at least one of the following of a pre-defined signal: received power of the predefined signal, a pre-configured target received power of the predefined signal, and a pre-configured transmitting power or maximum transmitting power corresponding to the predefined signal. The predefined signal includes at least one of the following: a reference signal received power (RSRP), a reference signal received quality (RSRQ), and a received signal strength indicator (RSSI).

According to a fourth aspect of the present application, a transmission device for sidelink communication is provided. The transmission device for sidelink communication may include: a sidelink transmitter, configured to transmit a physical sidelink channel and transmit sidelink data corresponding to the physical sidelink channel; a processor, configured to obtain physical sidelink feedback channel (PSFCH) configuration, wherein a PSFCH is used to carry feedback information for the sidelink data and determine at least one PSFCH resource for receiving the PSFCH based on the PSFCH configuration; and a feedback receiver, configured to receive the PSFCH on the determined PSFCH resources.

With reference to the fourth aspect, in an implementation of the fourth aspect, the PSFCH configuration is indicated in at least one of a predefined configuration, broadcasted or groupcasted configuration, sidelink resource pool configuration, UE-specific configuration or UE-group-specific configuration, sidelink control information (SCI), and a sidelink grant message.

With reference to the fourth aspect and the foregoing implementation, in another implementation of the fourth aspect, the PSFCH configuration includes at least one of the following: PSFCH resource pool configuration; PSFCH resource configuration; PSFCH sub-channel configuration; PSFCH channel structure configuration; configuration corresponding to feedback of unicast; configuration corresponding to feedback of groupcast; whether to enable multiplexing and/or bundling of the feedback information; and configuration for multiplexing and/or bundling of the feedback information.

With reference to the fourth aspect and the foregoing implementation, in another implementation of the fourth aspect, the processor determines at least one PSFCH resource for receiving the PSFCH according to at least one of the following: whether to receive the PSFCH, and whether the at least one PSFCH resource for receiving the PSFCH exists.

With reference to the fourth aspect and the foregoing implementation, in another implementation of the fourth aspect, the physical sidelink channel may be at least one of a physical sidelink control channel (PSCCH), a physical sidelink shared channel (PSSCH), and a PSSCH associated with the PSCCH.

With reference to the fourth aspect and the foregoing implementation, in another implementation of the fourth aspect, the physical sidelink channel transmitted by the sidelink transmitter is transmitted on multiple physical sidelink channel resources, and the feedback receiver determines a PSFCH reception mode based on at least one of the following: PSFCH configuration, information transmitted on the transmitted physical sidelink channel and a predefined rule.

With reference to the fourth aspect and the foregoing implementation, in another implementation of the fourth aspect, the information transmitted on the physical sidelink channel transmitted by the sidelink transmitter further includes at least one of the following information about: whether more than one physical sidelink channel resource of the multiple physical sidelink channel resources carries the same transport blocks (TBs); whether more than one physical sidelink channel resource of the multiple physical sidelink channel resources carries bundled transport blocks (TBs); and whether sidelink data carried by more than one physical sidelink channel resource of the multiple physical sidelink channel resources is transmitted by the same terminal.

With reference to the fourth aspect and the foregoing implementation, in another implementation of the fourth aspect, the physical sidelink channel by the sidelink transmitter is transmitted on multiple physical sidelink channel resources, and the feedback receiver receives at least one PSFCH based on at least one of the following PSFCH reception modes in which: one received PSFCH is used for indicating feedback information corresponding to physical sidelink channels carried on the multiple physical sidelink channel resources, and physical sidelink channels carried on at least two physical sidelink channel resources of the multiple physical sidelink channel resources correspond to the same or bundled sidelink data or transport blocks (TBs); one received PSFCH is used for indicating feedback information corresponding to physical sidelink channels carried on the multiple physical sidelink channel resources, and physical sidelink channels carried on at least two physical sidelink channel resources of the multiple physical sidelink channel resources correspond to independent sidelink data or TBs; one received PSFCH is used for indicating feedback information corresponding to physical sidelink channels carried on one or more than one physical sidelink channel resource of the multiple physical sidelink channel resources, and physical sidelink channels carried on at least two physical sidelink channel resources in the more than one physical sidelink channel resource correspond to the same or bundled sidelink data or TBs; one received PSFCH is used for indicating feedback information corresponding to physical sidelink channels carried on one or more than one physical sidelink channel resource of the multiple physical sidelink channel resources, and physical sidelink channels carried on at least two physical sidelink channel resources in the more than one physical sidelink channel resource correspond to independent sidelink data or TBs.

With reference to the fourth aspect and the foregoing implementation, in another implementation of the fourth aspect, the one received PSFCH includes at least one of the following in which: the same information field is used to indicate feedback information corresponding to more than one physical sidelink channel or feedback information corresponding to physical sidelink channels carried on more than one physical sidelink channel resource; and independent information fields are used to indicate feedback information corresponding to each physical sidelink channel or feedback information corresponding to physical sidelink channels carried on each physical sidelink channel resource.

With reference to the fourth aspect and the foregoing implementation, in another implementation of the fourth aspect, the one received PSFCH is used to carry feedback information of sidelink data corresponding to the transmitted physical sidelink channel or one subset of the transmitted physical sidelink channel.

With reference to the fourth aspect and the foregoing implementation, in another implementation of the fourth aspect, in one received PSFCH, the same information field may indicate feedback information corresponding to more than one physical sidelink channel or feedback information corresponding to physical sidelink channels carried on more than one physical sidelink channel resource, the more than one physical sidelink channel or the physical sidelink channels carried on the more than one physical sidelink channel resource may be transmitted by the same terminal.

With reference to the fourth aspect and the foregoing implementation, in another implementation of the fourth aspect, the processor determines the resources used for receiving the PSFCH based on at least one of the following: PSFCH resources related information indicated in sidelink control information (SCI) associated with the sidelink data, resources of the transmitted physical sidelink channel, correspondence relationship between physical sidelink channel resources and PSFCH resources, the PSFCH configuration, and a predefined rule.

With reference to the fourth aspect and the foregoing implementation, in another implementation of the fourth aspect, the correspondence relationship includes that the R physical sidelink channel resources correspond to S PSFCH resources, wherein R and S are positive integers; and wherein, one physical sidelink channel resource corresponds to at least one of the following: a minimum resource scheduling unit for a corresponding physical sidelink channel in a time domain and a frequency domain; and a minimum resource scheduling unit for a corresponding physical sidelink channel in a time domain, a frequency domain, and a code domain; and wherein one PSFCH resource corresponds to a minimum resource scheduling unit for a corresponding PSFCH in a time domain, a frequency domain and a code domain.

With reference to the fourth aspect and the foregoing implementation, in another implementation of the fourth aspect, PSFCH resources corresponding to physical sidelink channel resources on the M1th sidelink sub-channel in the N1th slot within a Y0th PSFCH resource period may be first PSFCH resources on a PSFCH sub-channel configured in a Y1th resource period, wherein a mapping between Y0 and Y1 may be predefined or configured or indicated by specific signaling, wherein a mapping between M1 and at least one of time domain resources, frequency domain resources, and code domain resources of the first PSFCH resources may be predefined or configured or indicated by specific signaling, and wherein a mapping between N1 and at least one of time domain resources, frequency domain resources, and code domain resources of the first PSFCH resources may be predefined or configured or indicated by specific signaling, wherein Y0, Y1, M1, and N1 are all positive integers, and wherein the PSFCH resource periods are N slots in the time domain and M sidelink sub-channels in the frequency domain including one PSFCH sub-channel, respectively, the predefined mappings are defined in or derived from the PSFCH configuration and the specific signaling is sidelink control information (SCI) or a sidelink grant message associated with the sidelink data.

With reference to the fourth aspect and the foregoing implementation, in another implementation of the fourth aspect, the processor determines at least one PSFCH resource for receiving the PSFCH according to the following: determining a PSFCH resource pool for receiving the PSFCH based on the PSFCH configuration; and determining at least one PSFCH resource for receiving the PSFCH from the PSFCH resource pool.

With reference to the fourth aspect and the foregoing implementation, in another implementation of the fourth aspect, the PSFCH resource pool includes multiple PSFCH sub-channels, and each PSFCH sub-channel may include one PSFCH resource or multiple PSFCH resources multiplexed in at least one of the following multiplexing modes: time division multiplexing (TDM), frequency division multiplexing (FDM) and code division multiplexing (CDM).

With reference to the fourth aspect and the foregoing implementation, in another implementation of the fourth aspect, the at least one PSFCH sub-channel or the at least one PSFCH resource are periodically configured in the frequency domain or periodically configured in the time domain and the frequency domain in a sidelink resource pool associated with the PSFCH resource pool, the period for the time domain is N slots, and the period for the frequency domain is M sidelink sub-channels, wherein one PSFCH sub-channel includes one PSFCH resource or multiple PSFCH resources multiplexed in at least one of the following multiplexing modes: time division multiplexing (TDM), frequency division multiplexing (FDM) and code division multiplexing (CDM), and wherein N and M are positive integers that can be configured, and $1 \leq N \leq +\infty$, $1 \leq M \leq +\infty$.

With reference to the fourth aspect and the foregoing implementation, in another implementation of the fourth aspect, the N slots in the time domain are consecutive in the time domain in the sidelink resource pool, and the M sidelink sub-channels in a frequency domain are consecutive in the frequency domain in the sidelink resource pool.

With reference to the fourth aspect and the foregoing implementation, in another implementation of the fourth aspect, the PSFCH configuration is associated with sidelink resource pool configuration, the determining the PSFCH resource pool for receiving the PSFCH based on the PSFCH configuration includes: determining the PSFCH resource pool based on at least one of the PSFCH configuration, the sidelink resource pool configuration, and a first association relationship between the PSFCH configuration and the sidelink resource pool configuration.

With reference to the fourth aspect and the foregoing implementation, in another implementation of the fourth aspect, the PSFCH configuration is associated with physical sidelink channel configuration, and the determining the PSFCH resource pool for receiving the PSFCH based on the PSFCH configuration includes: determining the PSFCH resource pool based on at least one of the PSFCH configuration, the physical sidelink channel configuration, and a second association relationship between the PSFCH configuration and the physical sidelink channel configuration.

With reference to the fourth aspect and the foregoing implementation, in another implementation of the fourth aspect, each configured PSFCH sub-channel includes M*N PSFCH resource subsets, and each PSFCH resource subset includes K PSFCH resources, and wherein if M is greater than 1 or N is greater than 1, the M*N PSFCH resource subsets are time division multiplexed and/or frequency division multiplexed, and the occupied time domain resources and frequency domain resources do not overlap with each other, and if K is greater than 1, the K PSFCH resources are time division multiplexed on the same time domain resources and frequency domain resources, and K is a positive integer.

With reference to the fourth aspect and the foregoing implementation, in another implementation of the fourth aspect, PSFCH resources corresponding to physical sidelink channel resources on the M1th sidelink sub-channel in the N1th slot within the Y0th PSFCH resource period are all resources in the PQth PSFCH resource subset on one PSFCH sub-channel configured in the Y1 resource period, wherein a mapping between Y0 and Y1 may be predefined or configured or indicated by specific signaling, wherein a mapping between M1 and PQ and a mapping between N1 and PQ may be predefined or configured or indicated by specific signaling, wherein Y0, Y1, M1, N1 and PQ are all positive integers, $1 \leq PQ \leq M*N$, and wherein the PSFCH resource periods are N slots in the time domain and M sidelink sub-channels in the frequency domain including one PSFCH sub-channel, respectively, the predefined mappings are defined in or derived from the PSFCH configuration and the specific signaling is sidelink control information (SCI) or a sidelink grant message associated with the sidelink data.

With reference to the fourth aspect and the foregoing implementation, in another implementation of the fourth aspect, $+\infty$ indicates that receiving the PSFCH in the sidelink resource pool is not supported.

With reference to the fourth aspect and the foregoing implementation, in another implementation of the fourth aspect, the processor determines the resources used for receiving the PSFCH based on resources of the received physical sidelink channel and correspondence relationship between physical sidelink channel resources and PSFCH resources according to the following: determining PSFCH resources corresponding to the resources of the transmitted physical sidelink channel; if the corresponding PSFCH resources includes one PSFCH resource, determining that the one PSFCH resource is used to receive the PSFCH; if the corresponding PSFCH resources includes multiple PSFCH resources, determining the second PSFCH resources used to receive the PSFCH of the multiple PSFCH resources based on at least one of the following: the PSFCH configuration, content of feedback information carried by the PSFCH, information transmitted on the transmitted physical sidelink channel and a predefined rule; wherein the second PSFCH resources are all or part of the multiple PSFCH resources.

With reference to the fourth aspect and the foregoing implementation, in another implementation of the fourth aspect, the PSFCH configuration includes at least one of the following: configuration corresponding to feedback of groupcast; and configuration indicating whether to enable multiplexing and/or bundling of the feedback information.

With reference to the fourth aspect and the foregoing implementation, in another implementation of the fourth aspect, when the transmitted physical sidelink channel is transmitted on multiple physical sidelink channel resources, information transmitted on the transmitted physical sidelink channel further includes information indicating at least one of the following: whether more than one physical sidelink channel resource of the multiple physical sidelink channel resources carries the same transport blocks (TBs); whether more than one physical sidelink channel resource of the multiple physical sidelink channel resources carries bundled TBs; whether sidelink data carried by more than one physical sidelink channel resource of the multiple physical sidelink channel resources is transmitted by the same terminal.

With reference to the fourth aspect and the foregoing implementation, in another implementation of the fourth aspect, the feedback receiver receives the PSFCH on determined PSFCH resources according to at least one of the following: mapping one received PSFCH to one PSFCH resource; mapping or rate matching one received PSFCH to one PSFCH resource, the mapping or rate matching being repeated T times on T PSFCH resources; and mapping or rate matching one received PSFCH to T PSFCH resources; wherein T is an integer greater than one.

With reference to the fourth aspect and the foregoing implementation, in another implementation of the fourth aspect, the processor further determines to receive or transmit a physical sidelink channel on remaining PSFCH resources not used to receive a PSFCH of the multiple PSFCH resources or determining the remaining resources to be vacant based on the PSFCH configuration.

With reference to the fourth aspect and the foregoing implementation, in another implementation of the fourth aspect, the sidelink transmitter transmits the physical sidelink channel according to the following: determining, based on the PSFCH configuration, whether it is possible to use third PSFCH resources which are in the same slot in the time domain and in the same sidelink sub-channel in the frequency domain as physical sidelink channel resources used to transmit physical sidelink channels, to transmit the physical sidelink channel, and whether to transmit the physical sidelink channel on the third PSFCH resources.

With reference to the fourth aspect and the above implementation thereof, in another implementation of the fourth aspect, the sidelink transmitter uses sidelink control information (SCI) associated with transmitted sidelink data to indicate whether the physical sidelink channel is transmitted on the third PSFCH resources.

With reference to the fourth aspect and the foregoing implementation, in another implementation of the fourth aspect, the PSFCH configuration is indicated by specific signaling, and wherein the specific signaling is at least one of physical layer signaling and high layer signaling.

With reference to the fourth aspect and the foregoing implementation, in another implementation of the fourth aspect, if the specific signaling is the physical layer signaling, a mapping configured or indicated by the physical layer signaling is supposed to be applied only to a sidelink transmission scheduled by or associated with the physical layer signaling.

With reference to the fourth aspect and the foregoing implementation, in another implementation of the fourth aspect, configuration dynamically indicated by the physical layer signaling rewrites configuration semi-statically indicated by the high layer signaling.

It is possible for a data reception UE to transmit corresponding ACK/NACK feedback information to a data transmission UE, so that the data transmission UE can determine where to receive the feedback information, and determine whether data retransmission is necessary.

BRIEF DESCRIPTION OF THE DRAWINGS

In order to more clearly illustrate the technical scheme of the embodiments of the present application, a brief introduction will be given below to accompanying drawings used in describing the embodiments or the prior art. Obviously, the accompanying drawings described below are only some embodiments of the present application, and for those of ordinary skill in the art, other drawings can also be obtained from these drawings without creative labor.

FIG. 1 is a schematic diagram illustrating a scenario 100 in which embodiments in accordance with the present application are applied;

FIG. 2 schematically illustrates a structure of a V2X resource pool;

FIG. 3 schematically illustrates another structure of a V2X resource pool;

FIGS. 4(A) and 4(B) show illustrative structural examples of V2X sub-channels;

FIG. 5 is a method for sidelink communication according to an embodiment of the present application;

FIG. 6 is a method for sidelink communication according to an embodiment of the present application;

FIG. 7 is a flowchart of a process of determining a PSFCH resource pool according to an embodiment of the present application;

FIG. 8 is a flowchart of a process of determining a PSFCH resource pool according to an embodiment of the present application;

FIG. 9 is an example schematically showing that PSFCH resources are periodically configured in a frequency domain;

FIG. 10 is an example schematically showing that PSFCH resources are periodically configured in time and frequency domains;

FIGS. 11(A)-11(D) schematically illustrate multiplexing relationship between PSFCH sub-channels and PSCCH and/or PSSCH;

FIG. 12 is a schematic diagram showing relationship among PSFCH sub-channels, PSFCH resource subsets and PSFCH resources;

FIG. 13 shows a schematic diagram of a PSFCH sub-channel supporting PSSCH and/or PSCCH transmission;

FIGS. 14(A) and 14(B) are schematic diagrams of two specific examples of PSSCH mapping on multiple V2X sub-channels in a certain slot;

FIG. 15 is a flowchart of a method for determining resources for transmitting PSFCH in accordance with an embodiment of the present application;

FIG. 16 schematically illustrates a multiplexing mode of PSFCH resource subset;

FIG. 17 schematically shows indexes of PSSCH resources and PSFCH resources in a PSFCH resource period;

FIG. 18 is a schematic diagram showing a mapping between PSFCH resource periods;

FIG. 19 is a block diagram schematically illustrating a reception device 1900 according to an embodiment of the present application; and FIG. 20 is a block diagram schematically illustrating a transmission device 2000 according to an embodiment of the present application.

DETAILED DESCRIPTION

Embodiments of the present application are described in detail below, and examples of the embodiments are shown in the drawings in which identical or similar reference signs represent identical or similar elements or elements with the same or similar functions throughout the specification. The following embodiments described by reference to the drawings are illustrative and are used only to explain the present application, not to be construed as limiting the present application.

It should be understood by those skilled in the art that the singular forms "a", "one", "the" and "said" used herein may also include plural forms, unless specifically stated. It should be further understood that the phrase "including" used in the specification of the present application means the existence of the said features, integers, steps, operations, elements and/or components, but does not exclude the existence or addition of one or more other features, integers, steps, operations, elements, components and/or groups thereof. It should be understood that when a component is described as "connected" or "coupled" to another component, it can be directly connected or coupled to another component, or there may be intermediate elements. In addition, the "connection" or "coupling" used herein may include wireless connection or wireless coupling. The phrase "and/or" used herein includes all or any unit of one or more associated list items and all combinations.

It should be understood by those skilled in the art that all terms used herein (including technical terms and scientific terms) have the same meaning as those generally understood by one of ordinary skill in the art to which the application belongs, unless otherwise defined. It should also be understood that terms such as those defined in a general dictionary should be understood to have meanings consistent with those in the context of the prior art, and will not be interpreted in idealized or over-formal terms unless specifically defined here.

It should be understood by those skilled in the art that the "terminal" and "terminal device" used herein include not only a wireless signal receiver device having only a wireless signal receiver without a transmitting capability, but also a device having a receiving and transmitting hardware capable of two-way communication over a two-way communication link. Such devices may include cellular or other communication devices having a single line display or a multi-line display or a cellular or other communication device without a multi-line display; PCS (Personal Communications Service), which may combine voice, data processing, fax, and/or data communication capabilities; PDA (Personal Digital Assistant), which can include radio frequency receivers, pagers, internet/intranet access, web browsers, notepads, calendars, and/or GPS (Global Positioning System) receiver; conventional laptop and/or palmtop computer or other device having and/or including a radio frequency receiver. As used herein, "terminal" and "terminal device" may be portable, transportable, installed in a vehicle (aviation, sea and/or land), or adapted and/or configured to operate locally, and/or run in any other location on the earth and/or space in a distributed manner. The "terminal" and "terminal device" used herein may also be a communication terminal, an internet terminal, and a music/video playing terminal, and may be, for example, a PDA, a MID (Mobile Internet Device), and/or mobile phones with a music/video playback unction, smart TVs, set-top boxes and other devices.

In the prior art of sidelink communication in LTE, the HARQ-ACK feedback mechanism is not supported, and thus there is no related design. In the NR V2X system, it is necessary to design a PSFCH channel structure for carrying a hybrid automatic repeat request acknowledgement, and a mapping relationship between a PSFCH channel carrying HARQ-ACK information and a corresponding PSSCH.

FIG. 1 is a schematic diagram illustrating a scenario 100 in which embodiments in accordance with the present application are applied. In FIG. 1, a transmission device 101 and a reception device 102 are included. The two devices may be various types of terminals or user equipment (UE) such as a vehicle, an infrastructure, a pedestrian, and the like. The transmission device 101 and the reception device 102 are equivalent devices, the transmission device 101 can also function as a reception device, and the reception device 102 can also function as a transmission device. It can be understood that the types of the transmission device 101 and the reception device 102 do not constitute a limitation on the embodiments of the present application.

A specific practical example is as follows. After the transmission device 101 transmits data through PSSCH and transmits a corresponding SCI through PSCCH to the reception device 102, the reception device 102 transmits corresponding ACK/NACK feedback information to the transmission device 101, so that the transmission device 101 can determine whether retransmission of data is necessary. The reception device 102 determines resources of the PSFCH, and transmits corresponding PSFCH on the determined resources to indicate the ACK/NACK feedback information to the transmission device 101.

Several specific embodiments are given below. In the following embodiments, description is made by taking the transmission device 101 as a transmission UE, the reception device 102 as a reception UE, and the sidelink communication system as V2X as an example. It should be understood that the types of the transmission device 101, the reception device 102 and the sidelink communication system do not constitute a limitation on the embodiments of the present application.

In the following embodiments, the physical sidelink control channel (PSCCH) may also be a physical downlink control channel (PDCCH), an EPDCCH, an MPDCCH (MTC PDCCH), an NPDCCH (NB PDCCH), or an NR-PDCCH, and the physical sidelink shared channel (PSSCH) may also be a physical downlink shared channel (PDSCH), an EPDSCH, an MPDSCH (MTC PDSCH), an NPDSCH (NB PDSCH), or an NR-PDSCH. In some embodiments of the present application, descriptions are made with respect to the PSSCH resources or the PSCCH resources only, it should be understood that the PSSCH resources may be equivalently replaced with PSCCH resources or replaced with PSSCH resources and PSCCH resources, where appropriate. Similarly, the PSCCH resources can also be equivalently replaced with PSSCH resources or with PSSCH resources and PSCCH resources.

The slots in the following embodiments may also be subframes or slots corresponding to the resource pool of the sidelink communication, unless otherwise specified. For example, in a V2X system, a resource pool is defined by a repeated bitmap that maps to a particular set of slots, which may be all slots, or all other slots except certain slots (such as slots for transmitting MIB/SIB). The slot indicated as "1" in the bitmap can be used for V2X transmission, and is a slot or subframe corresponding to a V2X resource pool; the slot indicated as "0" is not available for V2X transmission, and is not the slot or subframe corresponding to the V2X resource pool. Further, the slot in the following embodiments may be a complete slot, or may be a number of symbols corresponding to the sidelink communication in one slot. For example, when the sidelink communication is configured to be performed on the X1th~X2th symbols of each slot, the slot in the following embodiment is the X1th~X2th symbols in the slot in this scenario; for example, when the sidelink communication is configured to be transmitted on mini-slots, the slots in the following embodiments are mini-slots defined or configured in the sidelink system, rather than slots in the NR system. Further, unless otherwise specified, consecutive slots (symbols) in the following embodiments may also be consecutive slots (symbols) in the resource pool of the sidelink communication, but may be consecutive or inconsecutive in a physical sense. For example, two consecutive slots in a V2X resource pool are two consecutive slots indicating "1" in a bitmap defining a V2X resource pool, but between the physical locations of the two slots, there can be slots that are indicated as "0" in the bitmap and do not correspond to the V2X resource pool.

In the following, the difference between physical subframes or slots and logical subframes or slots will be described in a typical application scenario. When calculating a time gap between two specific channels/messages (for example, a PSSCH carrying sidelink data and a PSFCH carrying corresponding feedback information), the gap is assumed to be N slots. If physical subframes or slots are to be calculated, the N slots correspond to an absolute time length of N*x milliseconds in the time domain, which x is a time length in unit of milliseconds of a physical slot (subframe) in the numerology of the scenario; otherwise, if logical subframes or slots are to be calculated, taking a sidelink resource pool defined by a bitmap as an example, the gap of the N slots corresponds to N slots indicated as "1" in the bitmap, and the absolute time length of the gap varies according to the specific configuration of the resource pool of sidelink communication and has no fixed value.

Similarly, the RBs and sub-channels in the following embodiments may be RBs or sub-channels corresponding to the resource pool of the sidelink communication, unless otherwise specified. Consecutive RBs (sub-channels) may also be consecutive RBs (sub-channels) in the resource pool of sidelink communication, unless otherwise specified, but may be consecutive or inconsecutive physically.

In the following embodiments, the information that is configured by the base station, indicated by signaling, configured by a high layer, or pre-configured includes one piece of configuration, or includes a set of configuration, the set of configuration includes multiple subsets, and the UE selects one subset therefrom to use according to predefined conditions; alternatively, the information that is configured by the base station, indicated by signaling, configured by a high layer, or pre-configured includes multiple sets of configuration, and the UE selects one set of configuration therefrom to use according to predefined conditions. For example, the UE selects different configuration (two different sets of configuration or two different subsets of one set of configuration) in mode 3 and mode 4, and selects different configuration within the network coverage and outside the network coverage.

In the following embodiments, the technology applicable to V2X can also be extended to other sidelink transmission systems. For example, the V2X sub-channel can also be extended as D2D sub-channels to be applied to other sidelink transmission systems such as D2D. The V2X resource pool can also be extended as a D2D resource pool to be applied to other sidelink transmission systems such as D2D.

In the following embodiments, if the sidelink communication system is a V2X system, the terminal or the UE may be various types of terminals or UEs such as a vehicle, an infrastructure, a pedestrian, and the like.

In the following embodiments, the feedback information includes the HARQ-ACK feedback information, and may further include channel state information (CSI) feedback information, and may further include other feedback information that is obtained and derived by the reception UE based on the received sidelink transmission of the transmission UE and needs to be fed back to the transmission UE.

Channel Structure of PSFCH

In the current LTE V2X, all the resources that can be used by the sidelink communication system can be configured by a concept of resource pool, and the resources used by each UE to transmit sidelink data information and the control information are all located in the V2X resource pool. The V2X resource pool may be configured to transmit PSCCH and PSSCH on adjacent frequency domain resources or on non-adjacent frequency domain resources.

Similarly, after the feedback mechanism is introduced in NR V2X, the resources used by the feedback information are also located in the V2X resource pool. Specifically, a possible scenario is that a V2X resource pool (also referred to as a resource pool) includes at least one sidelink data channel (PSSCH) resource pool, and at least one sidelink control channel (PSCCH) resource pool, and may or may not include at least one sidelink feedback channel (PSFCH) resource pool.

With respect to resource scheduling for sidelink transmission, in the time domain, the unit of resource scheduling is a subframe in LTE D2D and V2X systems, and is a slot and/or symbol in NR V2X systems. In the frequency domain, the unit of resource scheduling may be a physical resources block (PRB) (such as in an LTE D2D system), or may be a sub-channel (such as in LTE V2X and NR V2X).

When the sub-channel is used as a unit in the frequency domain for scheduling resources of at least one channel in the system, there are two feasible methods.

The first method is to respectively divide sub-channels for each channel in the resource pool of the channel (for example, dividing PSSCH sub-channels in the PSSCH resource pool, and dividing PSCCH sub-channels in the PSCCH resource pool), and whether a resource pool is divided into sub-channels may be independent or associated with each other among multiple different channels. Further, the frequency domain resources of a resource pool of one channel may be defined by a set of sub-channels.

Taking the LTE V2X as an example, the UE determines the frequency domain resources (a set of resources blocks (RBs)) allocated to the PSSCH resource pool according to the following rule: the PSSCH resource pool is composed of $N_{subCH}$ sub-channels, in which $N_{subCH}$ is configured by a high layer parameter numSubchannel; For example, for $m=0, 1, \ldots, N_{subCH}-1$, the mth sub-channel is composed of $n_{subCHsize}$ consecutive RBs, and the numbers for physical resources blocks (PRBs) of the $n_{subCHsize}$ consecutive RBs are indicated as: for $j=0, 1, \ldots, n_{subCHsize}-1$, $n_{PRB}=n_{subCHRBstrt}+m*n_{subCHsize}+j$; in which $n_{subCHRBstrt}$ and $n_{subCHsize}$ are given by the high layer parameter.

Similar to the determination of the PSSCH resource pool, the PSCCH can also be regarded as using the sub-channel for frequency domain resource scheduling, but the frequency domain size of the PSCCH sub-channel is fixed to 2 RBs. In the LTE V2X system, a resource pool may be configured to transmit PSCCH and PSSCH on adjacent frequency domain resources or on non-adjacent frequency domain resources.

FIG. 2 shows a structure of a V2X resource pool. As shown in FIG. 2, the resource pool is (pre)configured so that the UE always transmits the PSCCH and the corresponding PSSCH on adjacent RBs in one subframe. In this case, the PSCCH resources m is a set of two consecutive RBs, and the PRB numbers of the two consecutive RBs are $n_{PRB}=n_{subCHRBstrt}+m*n_{subCHsize}+j$, j=0, 1, and $n_{subCHRBstat}$ and $n_{subCHsize}$ are given by the high layer parameters startRBSubchannel and sizeSubchannel, respectively.

FIG. 3 shows another structure of a V2X resource pool. As shown in FIG. 3, the resource pool is (pre)configured so that the UE may transmit the PSCCH and corresponding PSSCH on non-adjacent RBs in one subframe. In this case, the PSCCH resources m is a set of two consecutive RBs, and the PRB numbers of the two consecutive RBs are $n_{PRB}=n_{PSCCHstart}+2*m+j$, j=0, 1, and $n_{subCHRBstrt}$ is given by a high layer parameter startRBPSCCHPool. According to the resources determination manner, the resource scheduling for PSCCH is actually performed in units of sub-channels having a frequency domain size of 2 RBs, the PSCCH resources m is a PSCCH sub-channel, and the PSCCH is a set composed of multiple PSCCH sub-channels (PSCCH resources m). Therefore, it can be considered that in the LTE V2X system, the PSCCH resource pool and the PSSCH resource pool are respectively divided into several PSCCH sub-channels and PSSCH sub-channels in the frequency domain. The time domain resources of the PSCCH resource pool and the PSSCH resource pool are the same, and the frequency domain resources thereof do not overlap.

Therefore, for this method, a PSFCH resource pool for transmitting feedback information may also be introduced in the V2X system, and the PSFCH resource pool is divided into several PSFCH sub-channels in the frequency domain. Further, the frequency domain resources of the PSFCH resource pool may be defined by a set of PSFCH sub-channels.

The second method is to perform sub-channel division in a unit of the entire V2X resource pool, and divide a V2X resource pool (also referred to as a resource pool) into several V2X sub-channels (also referred to as sub-channels). Further, the frequency domain resources of the V2X resource pool may be defined by a set of V2X sub-channels. A V2X sub-channel may further include at least one of a control sub-channel, a data sub-channel, and a feedback sub-channel.

Taking LTE V2X as an example, if the resource pool is (pre)configured so that the UE always transmits the PSCCH and corresponding PSSCH on the adjacent RBs in one subframe, it can be considered that the V2X resource pool is divided into several V2X sub-channels in the frequency domain, each sub-channel including one PSCCH sub-channel (PSCCH resources m) and one PSSCH sub-channel, as shown in FIG. 2.

For this method, a PSFCH sub-channel for transmitting feedback information can also be introduced in the V2X sub-channel. FIG. 4(A) and FIG. 4(B) show an example of a schematic structure of a V2X sub-channel. Specifically, FIG. 4(A) and FIG. 4(B) respectively provide two examples of structures of V2X sub-channels when one V2X sub-channel includes one PSCCH sub-channel, one PSSCH sub-channel, and one PSFCH sub-channel in one slot. FIG. 4(A) and FIG. 4(B) are only schematic examples of channel structures of a V2X sub-channel including a PSCCH/PSSCH/PSFCH, and do not limit locations of time domain resources and frequency domain resources used by the PSCCH/PSSCH/PSFCH sub-channels and do not limit the multiplexing relationship among the above sub-channels.

In a typical scenario based on the existing NR V2X technology, the PSCCH sub-channel and the PSSCH sub-channel in one V2X sub-channel are used to transmit the control message SCI of the sidelink communication and the data associated with the SCI, respectively. Therefore, when the UE performs the sidelink transmission, the SCI and the data associated with the SCI are transmitted in the same one or more V2X sub-channels. In addition, the SCI may not be transmitted in the other one or more V2X sub-channels, and only the transmission of the data associated with the SCI is performed. In another typical scenario based on the existing NR V2X technology, there may be no association between the SCI and the data which are transmitted by the PSCCH sub-channel and the PSSCH sub-channel respectively in one V2X sub-channel. Therefore, when the UE performs sidelink transmission, the SCI is transmitted on the PSCCH in one or several V2X sub-channels, and the data associated with the SCI is transmitted on the PSSCH in the other one or more V2X sub-channels.

FIG. 5 is a method for sidelink communication in accordance with an embodiment of the present application. The method is applied to a data reception UE. Specifically, the method includes: receiving a physical sidelink channel to obtain sidelink data corresponding to the physical sidelink channel at S510; obtaining physical sidelink feedback channel (PSFCH) configuration, wherein a PSFCH is used to carry feedback information for the sidelink data at S520; determining at least one PSFCH resource for transmitting the PSFCH based on the PSFCH configuration at S530; and transmitting the PSFCH on the determined PSFCH resources at S540.

In an exemplary embodiment, the determining at least one PSFCH resource for transmitting the PSFCH may further include determining at least one of the following: whether to transmit the PSFCH, and whether the at least one PSFCH resource for transmitting the PSFCH exists.

FIG. 6 is a method for sidelink communication in accordance with an embodiment of the present application. The method is applied to a data transmission UE, and corresponds to the method applied to the data reception UE in FIG. 5. Specifically, the method includes: transmitting a physical sidelink channel to transmit sidelink data corresponding to the physical sidelink channel at S610; obtaining physical sidelink feedback channel (PSFCH) configuration, wherein a PSFCH is used to carry feedback information for the sidelink data at S620; determining at least one PSFCH resource for receiving the PSFCH based on the PSFCH configuration at S630; and receiving the PSFCH on the determined PSFCH resources at S640.

The physical sidelink channel described above is at least one of a physical sidelink control channel PSCCH, a physical sidelink shared channel PSSCH, and a physical sidelink shared channel PSSCH associated with the PSCCH. The corresponding sidelink data is sidelink data carried on the PSSCH and/or sidelink data carried on the PSSCH associated with the PSCCH.

In an exemplary embodiment, the determining at least one PSFCH resource for receiving the PSFCH further includes determining at least one of the following: whether to receive the PSFCH, and whether the at least one PSFCH resource for receiving the PSFCH exists.

In an exemplary embodiment, S530 or S630 includes determining a PSFCH resource pool for transmitting/receiving the PSFCH based on the PSFCH configuration; and determining at least one PSFCH resource from the PSFCH resource pool, for transmitting/receiving the PSFCH.

As used below, one physical sidelink channel resource corresponds to a minimum resource scheduling unit for a corresponding physical sidelink channel in the time domain and the frequency domain, and/or a minimum resource scheduling unit for a corresponding physical sidelink channel in the time domain, the frequency domain, and the code domain. One PSFCH resource corresponds to a minimum resource scheduling unit for a corresponding PSFCH in the time domain, the frequency domain, and the code domain. A PSFCH sub-channel may include one or more PSFCH resources. Similarly, one PSSCH sub-channel may include one or more PSSCH resources, and one PSCCH sub-channel may include one or more PSCCH resources.

FIG. 7 and FIG. 8 are flowcharts of processes of determining a PSFCH resource pool, respectively, in accordance with embodiments of the present application. As shown in FIG. 7, in an exemplary embodiment, at S710, the transmission UE or the reception UE obtains PSFCH configuration, and the PSFCH configuration is associated with sidelink resource pool (for example, V2X resource pool) configuration; and at S720, the UE determines a PSFCH resource pool according at least one of the following: the PSFCH configuration, the V2X resource pool configuration, a association relationship between the PSFCH configuration and the V2X resource pool configuration. As shown in FIG. 8, in another exemplary embodiment, at S810, the transmission UE or the reception UE obtains PSFCH configuration, and the PSFCH configuration is associated with the PSCCH configuration and/or the PSSCH configuration; and at S820, the UE determines a PSFCH resource pool according to at least one of the following: the PSFCH configuration, the PSCCH configuration and/or the PSSCH configuration, a association relationship between the PSFCH configuration and the PSCCH configuration and/or the PSSCH configuration.

In an exemplary embodiment, the one PSFCH resource pool includes one time domain resource pool and one frequency domain resource pool. Specifically, the time domain resource pool is a slot pool and/or a symbol pool, and the frequency domain resource pool is a resource block (RB) pool and/or a sub-channel pool. The UE determining a PSFCH resource pool includes the UE determining a time domain resource pool and/or a frequency domain resource pool of a PSFCH resource pool, and further includes the UE determining, time domain resources and/or frequency domain resources allocated to one PSFCH resource pool.

Further, in an exemplary embodiment, a frequency domain resource pool of one PSFCH resource pool is composed of a set of PSFCH sub-channels including NsubCH-PSFCH PSFCH sub-channels, and NsubCH-PSFCH is given in the PSFCH configuration. The UE determining a frequency domain resource pool of a PSFCH resource pool includes determining frequency domain resources (for example, a set of RBs) allocated to one PSFCH resource pool in the following manner:

For m=0, 1, . . . , NsubCH-PSFCH-1, the mth PSFCH sub-channel is composed of nsubCHsize-PSFCH consecutive RBs, and the physical resources block number (PRB number) nPRB-PSFCH of the nsubCHsize-PSFCH consecutive RBs is: j=0, 1, . . . , nsubCHsize-PSFCH-1, $$nPRB\text{-}PSFCH = \quad\quad\quad\quad\quad\quad\quad\quad\quad\quad\quad\text{(Equation 1)}$$
$$nsubCHRBstart\text{-}PSFCH + m * nsubCHsize\text{-}PSFCH + j;$$

wherein nsubCHRBstart-PSFCH and nsubCHsize-PSFCH are given in the PSFCH configuration.

$$\text{Alternatively, } nPRB\text{-}PSFCH = \quad\quad\quad\quad\quad\quad\text{(Equation 2)}$$
$$nsubCHRBstart\text{-}PSFCH + m * nsubCHsize + j;$$

wherein nsubCHRBstart-PSFCH and nsubCHsize are given in the PSFCH configuration, and nsubCHsize is the frequency domain size of the V2X sub-channel.

For the above equations, Equation 1 is applicable to a scenario in which the NsubCH-PSFCH PSFCH sub-channels in the PSFCH resource pool are consecutive in the frequency domain; and for example, in one V2X sub-channel, the PSFCH sub-channel and other sub-channels are time division multiplexed, as shown in FIG. 4(A). Equation 2 is applicable to a scenario in which the NsubCH-PSFCH PSFCH sub-channels in the PSFCH resource pool are inconsecutive in the frequency domain; for example, in one V2X sub-channel, the PSFCH sub-channel and other sub-channels are at least frequency division multiplexed, and therefore the frequency domain resources of the PSFCH sub-channel and PSFCH sub-channels adjacent thereto in the frequency domain are inconsecutive, and the frequency domain interval between adjacent PSFCH sub-channels is the time and frequency domain resources of other sub-channels, as shown in FIG. 4(b). In this scenario, the location of the frequency resources of the PSFCH sub-channel is calculated using the frequency domain size of the V2X sub-channel instead of the frequency domain size of the PSFCH sub-channel.

For the above equations, in a specific example, nsubCHRBstart-PSFCH is derived based on the starting position nsubCHRBstart of the V2X sub-channel in the frequency domain and the starting position of the PSFCH sub-channel in the V2X sub-channel (for example, nsubCHRBstart-PSFCH=nsubCHRBstart+RF, RF is the starting position of the PSFCH sub-channel in the V2X sub-channel) given in the resource pool configuration; and/or nsubCHsize-PSFCH is derived based on the frequency domain size of the V2X sub-channel and the position of the PSFCH sub-channel in the V2X sub-channel in the frequency domain (for example, the PSFCH sub-channel and other sub-channels in the V2X sub-channel are time division multiplexed, nsubCHsize-PSFCH=nsubCHsize) given in the resource pool configuration, alternatively, it is independently configured (for example, the PSFCH sub-channel and other sub-channels in the V2X sub-channel are at least frequency division multiplexed, and the nsubCHsize-PSFCH is given by independent high layer parameters in the PSFCH configuration).

In an exemplary embodiment, the PSFCH configuration is indicated or configured in at least one of a predefined configuration, broadcasted or groupcasted configuration, sidelink resource pool configuration, UE-specific configuration or UE-group-specific configuration, sidelink control information (SCI), and a sidelink grant message. The PSFCH configuration may be semi-statically configured and/or dynamically configured. The PSFCH configuration may be explicitly indicated and/or implicitly indicated. The PSFCH configuration may be indicated by high layer signaling and/or indicated by physical layer signaling. The PSFCH configuration may be resource pool-specific and/or UE-specific and/or traffic-specific and/or UE-group-specific or service-group-specific and/or QoS (Quality of Service)-specific. For example, sidelink transmissions of different services (or groups of services) or different QoS correspond to different PSFCH configurations.

Further, in an exemplary embodiment, if the PSFCH configuration is indicated by physical layer signaling, then the PSFCH configuration is dynamically configured. Specifically, the PSFCH configuration is a TB (transport block)-specific, or the PSFCH configuration applies only to sidelink transmission associated with or scheduled by the physical layer signaling. Otherwise, if the PSFCH configuration is configured by high layer signaling, then the PSFCH configuration is semi-statically configured. In a specific example, the UE determines the PSFCH configuration corresponding to the sidelink transmission scheduled by a sidelink grant message according to the information dynamically indicated by the base station through the sidelink grant message in the physical layer signaling.

In an exemplary embodiment, the PSFCH configuration obtained by the UE includes configuration indicated in the sidelink resource pool configuration and UE-specific configuration, and the UE-specific configuration overwrites the sidelink resource pool configuration. In another exemplary embodiment, the PSFCH configuration obtained by the UE includes configuration indicated by the physical layer signaling and the high layer signaling, and the dynamic configuration indicated by the physical layer signaling rewrites the semi-static configuration indicated by the high layer signaling.

In another exemplary embodiment, part or all of the information in the PSFCH configuration is implicitly indicated, specifically, is derived by the UE based on other configuration. The other configuration includes at least one of the following: predefined configuration, high layer configuration, V2X resource pool configuration, PSCCH configuration, and PSCCH configuration. The UE derives the PSFCH configuration according to at least one of the following: a UE ID, a UE type, a traffic type, a network coverage (for example, in coverage or out of coverage), a transmission mode (for example, mode 1 or mode 2), whether the PSSCH is initially transmitted or retransmitted, whether the transmission is unicast or groupcast, the type of the group corresponding to the groupcast transmission, the number of members of the group corresponding to the groupcast transmission, and the modulation and coding scheme (MCS) and/or the transport block size (TBS) of the PSSCH, and the link quality parameter of the PSSCH (for example, reference signal received power (RSRP) and reference signal received quality (RSRQ) between transmitter and receiver), received signal strength indicator (RSSI), pathloss, packet priority, quality of service (QoS), service latency requirement, a resource pool congestion level, geographical location information (for example, zone ID, and a geographic distance between the transmitter and the receiver), a V2X scenario type (for example, urban or freeway), and V2X scenario parameters (for example, moving speed, density of the vehicle, etc.).

In an exemplary embodiment, the time domain resource pool in the PSFCH resource pool determined by the UE and the time domain resource pool in the V2X resource pool and/or the PSCCH resource pool and/or the PSSCH resource pool associated with the PSFCH resource pool are the same or correspond to the same slots and/or symbols. Alternatively, the time domain resource pool in the PSFCH resource pool determined by the UE is a subset of the time domain resource pool in the V2X resource pool and/or the PSCCH resource pool and/or the PSSCH resource pool associated with the PSFCH resource pool. In another exemplary embodiment, the frequency domain resource pool in the PSFCH resource pool determined by the UE is the same as or corresponds to the same RBs and/or sub-channels as the frequency domain resource pool in the V2X resource pool and/or the PSCCH resource pool and/or the PSSCH resource pool associated with the PSFCH resource pool. Alternatively, the frequency domain resource pool in the PSFCH resource pool determined by the UE is a subset of the frequency domain resource pool in the V2X resource pool and/or the PSCCH resource pool and/or the PSSCH resource pool associated with the PSFCH resource pool. Similarly, the time domain resources and/or the frequency domain resources in the PSFCH resource pool determined by the UE may be the same as or corresponds to the same slots and/or symbols and/or RBs and/or sub-channels as the time domain resources and/or the frequency domain resources in the V2X resource pool and/or the PSCCH resource pool and/or the PSSCH resource pool associated with the PSFCH resource pool, or may be a subset of the time domain resources and/or frequency domain resources in the V2X resource pool and/or the PSCCH resource pool and/or the PSSCH resource pool associated with the PSFCH resource pool.

In an exemplary embodiment, within a V2X resource pool, in each slot associated with the resource pool, the PSFCH resources are periodically configured in the time domain, and the period is N slots, and the value of N includes at least one configurable positive integer. When N=1, the time domain resource pool of the PSFCH is the same as or corresponds to the same slots as the time domain resource pool of V2X and/or PSCCH and/or PSSCH; when N>1, the time domain resource pool of the PSFCH is a subset of the time domain resource pool of V2X and/or PSCCH and/or PSSCH, or the slots corresponding to the time domain resource pool of the PSFCH are in a subset of the slots corresponding to the time domain resource pool of V2X and/or PSCCH and/or PSSCH. In this exemplary embodiment, one slot of every N slots in the V2X resource pool contains PSFCH sub-channels/resources. The value of N may also include a state dedicated to indicate that no PSFCH resources are available and/or that the HARQ-ACK feedback feature is disabled (i.e., the PSFCH is not supported for transmission within the V2X resource pool), such as infinity.

In another exemplary embodiment, within a V2X resource pool, in each slot associated with the resource pool, the PSFCH resources are periodically configured in the frequency domain, and the period is M V2X sub-channels (referred to as sub-channels). The value of M includes at least one configurable positive integer. When M=1, the frequency domain resource pool of the PSFCH is the same as or corresponds to the same V2X sub-channels as the frequency domain resource pool of the V2X and/or the PSCCH and/or the PSSCH; and when M>1, the V2X sub-channels corresponding to the frequency domain resource pool of the PSFCH are a subset of the V2X sub-channels corresponding to the frequency domain resource pool of V2X and/or PSCCH and/or PSSCH. The value of M may also include a state dedicated to indicate that no PSFCH resources are available and/or that the HARQ-ACK feedback feature is disabled (i.e., the transmission of PSFCH is not supported within the V2X resource pool), such as infinity. In this exemplary embodiment, one out of every M sub-channels in each slot in the V2X resource pool contains a PSFCH sub-channel/resource. FIG. 9 is an example schematically showing that PSFCH resources are periodically configured in the frequency domain. Specifically, an example of M=2 is given in FIG. 9, in which structures of other channels (such as PSSCH sub-channel, PSCCH sub-channel) in the V2X sub-channel are not shown, and FIG. 9 is only used for illustrative purposes to explain how the PSFCH resources are periodically configured in the V2X resource pool, but does not introduce a limitation on the time domain resources and the frequency domain resources specifically used by the PSFCH sub-channel or the PSFCH resources, or the multiplexing manner of the PSFCH sub-channel and other sub-channels.

As a combination of the above two exemplary embodiments, within a V2X resource pool, in each slot associated with the resource pool, the PSFCH resources are periodically configured in the time domain and the frequency domain, and the periods are respectively N slots and M V2X sub-channels (referred to as sub-channels). In this exemplary embodiment, in one slot of every N slots in the V2X resource pool, one sub-channel of every M sub-channels contains a PSFCH sub-channel/resources. FIG. 10 is an example schematically showing that PSFCH resources are periodically configured in the time domain and the frequency domain. Specifically, an example of M=2 and N=4 is given in FIG. 10, in which structures of other channels (such as PSSCH sub-channel, PSCCH sub-channel) in the V2X sub-channel are not shown, and FIG. 10 is only used for illustrative purposes to explain how the PSFCH resources are periodically configured in the V2X resource pool, but does not introduce a limitation on the time domain resources and frequency domain resources specifically used by the PSFCH sub-channel or the PSFCH resources, or the multiplexing manner of the PSFCH sub-channel and other sub-channels. Further, in another exemplary embodiment, in N1 slots of every N slots in the V2X resource pool, M1 sub-channels of every M sub-channels contain PSFCH sub-channels/resources. N, M, N1 and M1 are configurable integers, and $1 \leq N \leq +\infty$, $1 \leq M \leq +\infty$, $1 \leq N1 \leq N$, and $1 \leq M1 \leq M$. $+\infty$ indicates that transmitting or receiving the PSFCH in the sidelink resource pool is not supported.

Further, in an exemplary embodiment, within the V2X resource pool, in each slot associated with the resource pool, the PSFCH resources are periodically configured in the time domain and the frequency domain, and the periods are respectively N slots and M V2X sub-channels (referred to as sub-channels).

The time domain resource pool of one PSFCH resource pool is composed of a set of slots and/or a set of symbols in the time domain. The UE determining a time domain resource pool of a PSFCH resource pool includes determining time domain resources (for example, the set of slots and/or the set of symbols) allocated to a PSFCH resource pool in the following manner:

Using a bitmap associated with the PSFCH resource pool $(b_0, b_1, \ldots, b_{L_{bitmap}})$, in which the length $L_{bitmap}$ of the bitmap is given in the PSFCH configuration and/or the V2X resource pool configuration, if $b_{k'}=1$ when k'=k mod $L_{bitmap}$ and ((k mod Lbitmap)–kPSFCH-start) mod N=0, then the subframe $t_k^{SL}(0 \leq k < (10240-N_{slss}-N_{dssf}-N_{reserved}))$ belongs to the PSFCH resource pool.

Alternatively, using a bitmap (b0, b1, bLbitmap-PSFCH) associated with the PSFCH resource pool, in which the length bLbitmap-PSFCH of the bitmap is given in the PSFCH configuration, if $b_{k'}=1$ when k'=k mod bLbitmap-PSFCH, then the subframe configuration, if $t_k^{SL}(0 \leq k < (10240-N_{slss}-N_{dssf}-N_{reserved}))$ belongs to the resource pool.

N is a period length in the time domain when the PSFCH resources are periodically configured in the time domain, and specifically, may be the number of the slots.

The frequency domain resource pool of one PSFCH resource pool is composed of a set of PSFCH sub-channels including NsubCH-PSFCH PSFCH sub-channels, and the NsubCH-PSFCH is given in the PSFCH configuration. The UE determines a frequency domain resource pool of a PSFCH resource pool, including determining frequency domain resources (for example, a set of RBs) allocated to the PSFCH resource pool in the following manner:

For m=0, 1, . . . , NsubCH-PSFCH-1, the mth PSFCH sub-channel is composed of nsubCHsize-PSFCH consecutive RBs, and the physical resources block number (PRB number) nPRB-PSFCH of the nsubCHsize-PSFCH consecutive RBs is: for j=0, 1, . . . , nsubCHsize-PSFCH-1, $$nPRB\text{-}PSFCH = nsubCHRBstart\text{-}PSFCH + \qquad \text{(Equation 3)}$$
$$M * m * nsubCHsize\text{-}PSFCH + j;$$

wherein nsubCHRBstart-PSFCH and nsubCHsize-PSFCH are given in the PSFCH configuration;

Alternatively, nPRB-PSFCH=nsubCHRBstart-PSFCH+ M*m*nsubCHsize+j (Equation 4);

wherein nsubCHRBstart-PSFCH and nsubCHsize are given in the PSFCH configuration, and nsubCHsize is the frequency domain size of the V2X sub-channel.

M is a period length in the frequency domain when the PSFCH resources are periodically configured in the frequency domain, and specifically, may be the number of the V2X sub-channels.

For the above equations, Equation 3 is applicable to a scenario in which the NsubCH-PSFCH PSFCH sub-channels in the PSFCH resource pool are consecutive in the frequency domain; and for example, in one V2X sub-channel, the PSFCH sub-channel and other sub-channels are time division multiplexed, as shown in FIG. 4(A). Equation 4 is applicable to a scenario in which the NsubCH-PSFCH PSFCH sub-channels in the PSFCH resource pool are inconsecutive in the frequency domain; and for example, in one V2X sub-channel, the PSFCH sub-channel and other sub-channels are at least frequency division multiplexed, and therefore the PSFCH sub-channel and its adjacent PSFCH sub-channel are inconsecutive, and the interval between adjacent PSFCH sub-channels is the time domain resources and frequency domain resources of other sub-channels, as shown in FIG. 4(b); and in this scenario, the location of the frequency resources of the PSFCH sub-channel is calculated using the frequency domain size of the V2X sub-channel instead of the frequency domain size of the PSFCH sub-channel.

For the above equations, in a specific example, the nsubCHRBstart-PSFCH is derived based on the starting position nsubCHRBstart of the V2X sub-channel in the frequency domain, the starting position of the PSFCH sub-channel in the V2X sub-channel and the frequency domain period starting position in which the PSFCH resources are periodically configured in the resource pool (for example, nsubCHRBstart-PSFCH=nsubCHRBstart+ M0*m*nsubCHsize+RF, RF is the starting position of the PSFCH sub-channel in the V2X sub-channel, and M0 is the frequency domain period starting position in which the PSFCH resources are periodically configured in the resource pool) given in the resource pool configuration; and/or nsubCHsize-PSFCH is derived based on the frequency domain size of the V2X sub-channel and the position of the PSFCH sub-channel in the V2X sub-channel in the frequency domain (for example, the PSFCH sub-channel and other sub-channels in the V2X sub-channel are time division multiplexed, nsubCHsize-PSFCH=nsubCHsize) given in the resource pool configuration, or alternatively, it is independently configured (for example, the PSFCH sub-channel and other sub-channels in the V2X sub-channel are at least frequency division multiplexed, and the nsubCHsize-PSFCH is given by independent high layer parameters in the PSFCH configuration).

In an exemplary embodiment, the UE determines, according to the PSFCH configuration, that at least one PSFCH sub-channel or at least one PSFCH resource is included in one V2X sub-channel, and the PSFCH sub-channel/resources are time division multiplexed and/or frequency division multiplexed with the PSCCH and/or the PSSCH within the V2X sub-channel. FIGS. 11(A)-11(D) schematically show the multiplexing relationships between the PSFCH sub-channels and the PSCCH and/or the PSSCH. Specifically, FIG. 11(A) shows that the PSFCH sub-channel and the PSCCH and/or the PSSCH are time division multiplexed, and FIG. 11(B) shows that the PSFCH sub-channel and the PSCCH and/or the PSSCH are frequency division multiplexed and time division multiplexing, FIG. 11(C) shows that the PSFCH sub-channel and the PSCCH and/or the PSSCH are frequency division multiplexed, and FIG. 11(D) shows that the PSFCH sub-channel and the PSCCH are time division multiplexed, the PSFCH sub-channel and the PSSCH are frequency division multiplexed.

In an exemplary embodiment, the UE determines that one PSFCH sub-channel includes one PSFCH resource according to the PSFCH configuration.

In another exemplary embodiment, the UE determines, according to the PSFCH configuration, that one PSFCH sub-channel includes N PSFCH resources, the time domain resources and frequency domain resources of the N PSFCH resources are the same and are the same as the time domain resources and frequency domain resources of the PSFCH sub-channel, and the N PSFCH resources are code division multiplexed. A typical application scenario of the exemplary embodiment is that one PSFCH sub-channel is used for feedback of a groupcast service, and the groupcast service is configured to use an independent feedback resources for the UE; and correspondingly, multiple UEs at the receiver of the groupcast service respectively use at least one PSFCH resource of the N code division multiplexed PSFCH resources, and different UEs use independent PSFCH resources.

In another exemplary embodiment, the UE determines, according to the PSFCH configuration, that one PSFCH sub-channel includes N PSFCH resources, the N PSFCH resources being frequency division multiplexed and/or time division multiplexed and/or code division multiplexed. FIG. 12 is a schematic diagram showing a relationship among PSFCH sub-channels, PSFCH resource subsets, and PSFCH resources. As shown in FIG. 12, in a specific example, the one PSFCH sub-channel is composed of a set of PSFCH resources, the set of PSFCH resources includes several subsets, each subset includes one PSFCH resource, or includes more than one PSFCH resource having the same time domain resources and frequency domain resources and being code division multiplexed, and different subsets are time division multiplexed and/or frequency division multiplexed. One PSFCH resource is a PSFCH resource defined in the time domain, the frequency domain and the code domain. Alternatively, one PSFCH resource is a PSFCH resource defined in the time domain and the frequency domain.

The PSFCH sub-channel shown in FIG. 12 has the same frequency domain size and frequency domain resource location as the PSSCH sub-channel. The design is to reduce the complexity of the system. When the PSSCH and the PSFCH have the same sub-channel division method in the frequency domain, the mapping relationship thereof and the step of calculating the resource location are simpler. However, it is considered that under different sub-channel sizes and resource sizes, when one PSFCH sub-channel includes N PSFCH resources or resource subsets which are time division multiplexed (or TDMed), the frequency domain size of the PSSCH sub-channel may not be divisible by N. This is because during determination of the frequency domain size of the PSSCH sub-channel and determination of the frequency domain size of the PSFCH resources, the influence of the frequency domain size on the code rate and the reception performance needs to be considered, and the value of N may be possibly determined according to the distribution density of the PSFCH resources, for example, if it is indicated in the PSFCH configuration that one slot of every N slots includes PSFCH resources, one PSFCH sub-channel may be determined to include N PSFCH resources. Therefore, another feasible scenario is that frequency domain resources of a PSFCH sub-channel correspond to a subset of frequency domain resources of a PSSCH sub-channel.

In a specific example, the UE determines, according to the PSFCH configuration, that a frequency domain size of one PSFCH resource is K RBs, and that there are N PSFCH resource subsets in one PSFCH sub-channel (or one PSSCH sub-channel corresponds to the N PSFCH resource subsets). Then the UE may determine that the frequency domain size of one PSFCH sub-channel (or a set of PSFCH resources occupied by the N PSFCH resource subsets) is N*K. The starting position (or may also be replaced by the end position) of the PSFCH sub-channel (or the set of PSFCH resources occupied by the N PSFCH resource subsets) in the frequency domain and the starting position (or may also be replaced by the end position) of the PSSCH sub-channel in the frequency domain are aligned with each other.

In another specific example, the UE determines, according to the PSFCH configuration, that there are N PSFCH resource subsets in one PSFCH sub-channel (or one PSSCH sub-channel corresponds to N PSFCH resource subsets), and that a frequency domain size of a PSSCH sub-channel is M RBs. Then the UE may determine that the frequency domain size of one PSFCH resource is K RBs, and K is a positive integer no more than M/N (for example, if M=10, N=4, then K may be 1 or 2) or a maximum positive integer no more than M/N (for example, if M=10, N=4, then K=2).

In addition, in a scenario where the frequency domain resources of a PSFCH sub-channel correspond to a subset of frequency domain resources of a PSSCH sub-channel, the remaining resources may be used to transmit the PSSCH, or used to transmit other channels/signals, or as reserved resources (that is, the UE does not transmit/receive sidelink signals/channels on the resources). For example, in the above example, it is assumed that the frequency domain size of the PSSCH sub-channel is M RBs, and if N*K<M, the remaining M−N*K RBs are used to transmit the PSSCH, or are used to transmit other channels/signals, or are used as reserved resources.

A PSFCH sub-channel can be used to transmit at least one PSFCH. As used herein, in the present application, transmitting a channel means transmitting, on the channel, data carried by the channel.

In an exemplary embodiment, the time domain size and/or frequency domain size and/or code domain size of one PSFCH sub-channel and/or one PSFCH resource determined by the UE are predefined or configurable. The time domain size may be the number of symbols in the time domain; the frequency domain size may be the number of RBs and/or the number of sub-channels; and the code domain size may be at least one of the following: the number of sequences used to carry the feedback information, the number of masks used to carry feedback information, the number of sequences used to scramble the feedback information, and the number of sequences of reference signals for feedback information. The size being configurable further means that the UE derives and determines the size of the PSFCH sub-channel or resources according to other configuration. In a specific example, the time domain size and the frequency domain size of one PSFCH sub-channel determined by the UE are predefined, and the code domain size thereof is configurable. For example, when the PSFCH may be used to carry feedback information for groupcast, different group members use different PSFCH resources to transmit the feedback information for groupcast, and when the maximum number of group members is N, then the code domain size is configured as N. In another specific example, the PSFCH is periodically configured in the time domain with a period of N slots (thus, in each of every N slots, each V2X sub-channel in the frequency domain contains one PSFCH sub-channel), and each PSFCH sub-channel includes N PSFCH resources that are frequency division multiplexed, and the UE derives and determines that the frequency domain size of the PSFCH resources is 1/N of the frequency domain size of the PSFCH sub-channel.

In an exemplary embodiment, the UE determines, according to the PSFCH configuration, that on the PSFCH sub-channel or the PSFCH resources, not only the transmission of the PSFCH is supported, but also the transmission of the PSSCH and/or the PSCCH is supported. Accordingly, the UE may transmit the PSFCH on the PSFCH sub-channel or the PSFCH resources, and it may also transmit the PSSCH and/or the PSCCH on the PSFCH sub-channel or PSFCH resource.

In an exemplary embodiment, the UE determines, according to the PSFCH configuration, that on the PSFCH sub-channel or the PSFCH resources, not only the transmission of the PSFCH is supported, but also the transmission of the PSSCH and/or the PSCCH is supported. FIG. 13 shows a schematic diagram of a PSFCH sub-channel supporting transmission of PSSCH and/or PSCCH. As shown in FIG. 13, the UE transmitting the PSSCH and/or the PSCCH on the PSFCH sub-channel or the PSFCH resources further includes the UE mapping the PSSCH and/or the PSCCH to the PSSCH sub-channel and/or PSCCH sub-channel and PSFCH sub-channel in the same slot and/or in the same V2X sub-channel.

In a specific example, the UE maps the PSSCH to a PSSCH sub-channel or PSSCH resources in one V2X sub-channel in a certain slot and maps the PSSCH to a PSFCH sub-channel or PSFCH resources in the V2X sub-channel in any of the following manners that:

the UE maps the PSSCH to the PSSCH sub-channel/resources in a rate matching manner, and copies one or more time domain symbols, to which the PSSCH is mapped, to the PSFCH sub-channel or PSFCH resources. When the frequency domain size of the PSFCH sub-channel/resources and the frequency domain size of the PSSCH sub-channel/resources are not equal, part of the symbols are copied, for example, the resource elements (REs) in the part where locations of the PSFCH sub-channel/resources and PSSCH sub-channel/resources in the frequency domain are the same are copied; otherwise, when the frequency domain size of the PSFCH sub-channel/resources and the frequency domain size of PSSCH the sub-channel/resources are equal, all symbols are copied;

the UE maps the PSSCH to the PSSCH sub-channel/resources in a rate matching manner, and then continues to map the PSSCH to the PSFCH sub-channel or the PSFCH resources; and the UE maps the PSSCH to the PSSCH sub-channel/resources and the PSFCH sub-channel/resources in a rate matching manner.

In another specific example, the UE maps the PSSCH to a PSSCH sub-channel or PSSCH resources in one V2X sub-channel in a certain slot, and does not transmit the PSSCH on the PSFCH sub-channel or PSFCH resources in the V2X sub-channel, in any of the following manners:

the UE maps the PSSCH to the PSSCH sub-channel/resources in a rate matching manner;

the UE maps the PSSCH to the PSSCH sub-channel/resources and the PSFCH sub-channel/resources in a rate matching manner, and punctures the PSSCH out of the PSFCH sub-channel/resources.

In the above two examples for explaining how the UE performs PSSCH mapping, the PSSCH can be equivalently replaced with PSCCH or with PSSCH and PSCCH. The one V2X sub-channel in a certain slot can be further extended to multiple V2X sub-channels in a certain slot. In this scenario, the UE performs mapping of PSSCH on PSSCH sub-channels/resources and/or PSFCH sub-channels/resources in multiple sub-channels according to a predefined rule. For example, according to a manner of first the frequency domain and then the time domain, the PSSCH is mapped on the first PSSCH symbol in the multiple of sub-channels, is then mapped on the second PSSCH symbol in the multiple of sub-channels, and so on. For example, according to a manner of first the intra-sub-channel mapping and then the cross-sub-channel mapping, the PSSCH in the first PSSCH sub-channel of the multiple sub-channels is mapped in a manner similar to using one V2X sub-channel, and then the PSSCH in the second PSSCH sub-channel of the multiple sub-channels is mapped in a manner similar to using one V2X sub-channel, and so on. FIG. 14(A) and FIG. 14(B) are schematic diagrams of two specific examples of PSSCH mapping on multiple V2X sub-channels in a slot.

With respect to a scenario in which the PSFCH sub-channel or PSFCH resources not only support transmission of PSFCH, but also support transmission of PSSCH and/or PSCCH, in an exemplary embodiment, the UE will always transmit the PSSCH and/or the PSCCH on the PSFCH. In particular, when the UE transmits the PSSCH and/or the PSCCH on at least one sub-channel in a certain slot, it will also transmit the PSSCH and/or the PSCCH on the PSFCH in the at least one sub-channel.

In another exemplary embodiment, the transmission UE may transmit the PSSCH and/or the PSCCH on the PSFCH, or may not transmit the PSSCH and/or the PSCCH on the PSFCH, so the reception UE needs to know whether the PSFCH carries the PSSCH and/or the PSCCH. Whether the UE transmits the PSSCH and/or the PSCCH on the PSFCH sub-channel or the PSFCH resources is explicitly or implicitly indicated in the PSCCH or the sidelink control information (SCI), and the reception UE first decodes the PSCCH carrying the SCI, and then determines how to decode the PSSCH and/or the PSFCH according to information in the SCI and/or a predetermined rule. Alternatively, whether the UE transmits the PSSCH and/or the PSCCH on the PSFCH sub-channel or the PSFCH resources is not indicated, and the reception UE performs blind detection of the PSCCH and/or the PSSCH and/or the PSFCH. Alternatively, whether the UE transmits the PSSCH and/or the PSCCH on the PSFCH sub-channel or the PSFCH resources is not indicated, and the reception UE to determines how to decode the PSCCH and/or the PSSCH and/or the PSFCH according to a predetermined rule. In a specific example, whether the UE transmits the PSSCH on the PSFCH sub-channel/resources is indicated in the SCI, and the UE does not transmit the PSCCH on the PSFCH sub-channel/resources. If the reception UE determines that the transmission UE does not transmit the PSSCH on the PSFCH after the UE decodes and obtains the information in the SCI, then the reception UE determines that the transmission UE maps the PSSCH to the PSSCH sub-channel/resources in a rate matching manner according to a predetermined rule, and decodes the PSSCH accordingly; otherwise, if the reception UE determines that the transmission UE transmits the PSSCH on the PSFCH after the UE decodes and obtains the information in the SCI, then the reception UE determines that the transmission UE maps the PSSCH to the PSSCH sub-channel/resources in a rate matching manner according to a predetermined rule, copies one or more time domain symbols, to which the PSSCH is mapped, to the PSFCH sub-channel or PSFCH resources, and decodes the PSSCH accordingly. In another specific example, whether the UE transmits the PSCCH and/or the PSSCH on the PSFCH sub-channel/resources is not indicated, and the reception UE first assumes that the transmission UE does not transmit the PSCCH and/or the PSSCH on the PSFCH sub-channel/resources, and decodes the PSCCH and/or the PSSCH accordingly; and if the decoding fails, the reception UE further assumes that the transmission UE transmits the PSCCH and/or the PSSCH on the PSFCH sub-channel/resources, and decodes the PSCCH and/or the PSSCH accordingly. In another specific example, whether the UE transmits the PSCCH on the PSFCH sub-channel/resources is not indicated, and whether the UE transmits the PSSCH on the PSFCH sub-channel/resources is indicated in the SCI, then the reception UE first assumes that the transmission UE does not transmit the PSCCH on the PSFCH sub-channel/resources and decodes the PSCCH accordingly; if the decoding fails, the reception UE further assumes that the transmission UE transmits the PSCCH on the PSFCH sub-channel/resources, and decodes the PSCCH accordingly; and if any one attempt of the above two attempts to decode the PSCCH is successful, then the UE decodes the PSSCH accordingly according to the indication in the SCI with respect to whether the PSSCH is transmitted on the PSFCH sub-channel.

In another exemplary embodiment, the PSFCH sub-channel or the PSFCH resources only support the transmission of the PSFCH, but not the transmission of the PSSCH and/or the PSCCH. Accordingly, the UE may transmit the PSFCH on the PSFCH sub-channel or the PSFCH resources, and may not transmit the PSSCH and/or the PSCCH on the PSFCH sub-channel or the PSFCH resources, and there is no need to additionally indicate which channel is transmitted on the PSFCH sub-channel or PSFCH resources.

In an exemplary embodiment, whether the transmission of the PSSCH and/or the PSCCH is supported on the PSFCH sub-channel or PSFCH resources are indicated in the PSFCH configuration. In a specific example, the UE determines, according to the V2X resource pool configuration, the transmission of the PSSCH and/or the PSCCH on the PSFCH sub-channel in the corresponding resource pool is supported; and the UE then obtains the UE-specific configuration that the base station sends through the RRC signaling, and determines, according to the information therein, that the PSSCH and/or the PSCCH transmission is not supported on the PSFCH sub-channel in a specific sidelink resource pool or all sidelink resource pools. In this example, the UE-specific configuration rewrites the PSFCH configuration in the sidelink resource pool configuration. Similarly, in another specific example, the dynamic configuration indicated by the physical layer signaling rewrites semi-statical configuration indicated by the high layer signalling so that: the UE determines, according to the information dynamically indicated by the base station through a sidelink grant message in the physical layer signalling, that in the sidelink resources scheduled by the sidelink grant message, whether the transmission of the PSCCH and/or the PSSCH is supported on the PSFCH sub-channel or the PSFCH resources, and/or determines that with respect to the sidelink transmission scheduled by the sidelink grant message, whether the PSCCH and/or the PSSCH should be transmitted on the PSFCH sub-channel or PSFCH resources.

In another exemplary embodiment, whether the transmission of the PSSCH and/or the PSCCH is supported on the PSFCH sub-channel or the PSFCH resources is determined by the UE itself or is derived and determined by the UE according to the PSFCH configuration. Specifically, the UE determines whether the transmission of the PSSCH and/or the PSCCH is supported on the PSFCH sub-channel or the PSFCH resources according to at least one of the following: a UE ID, a UE type, a service type, a network coverage (for example, in coverage or out of coverage), a transmission mode (for example, mode 1 or mode 2), whether the PSSCH is first transmitted or retransmitted, whether the transmission is unicast or groupcast, the type of the group corresponding to the groupcast transmission, the number of members of the group corresponding to the groupcast transmission, and MCS and/or TBS of the PSSCH, the link quality parameter of the PSSCH (for example, RSRP, RSRQ, RSSI and pathloss between the transmitter and the receiver), packet priority, QoS, service latency requirement, resource pool congestion level, geographical location information (for example, zone ID, and a geographic distance between the transmitter and the receiver), a V2X scenario type (for example, urban city or freeway), and V2X scenario parameters (for example, moving velocity, density of the vehicle, etc.). In a specific example, the PSFCH configuration includes a threshold for determining whether the transmission of the PSSCH and/or the PSCCH is supported on the PSFCH sub-channel or the PSFCH resources corresponding to at least one of the foregoing information, and the criteria according to which the UE determines whether the transmission of the PSSCH and/or the PSCCH is supported on the PSFCH sub-channel or the PSFCH resources is whether a certain item or some items listed above is higher or lower than a corresponding configuration threshold, or whether at least one item in a given subset of the above items is higher or lower than a corresponding configuration threshold.

In an exemplary embodiment, the PSFCH may be the same as or different from the PSCCH and/or the PSSCH with respect to at least one of the following: automatic gain control (AGC) symbol length, numerology, cyclic prefix (CP) length, the length of the gap in the last symbol, and conversion time for the transmission and reception.

Mapping Between PSFCH and PSSCH

When a PSFCH carries feedback information used to indicate HARQ-ACK feedback information corresponding to the PSSCH and/or the channel state information (CSI) corresponding to a PSSCH, the PSSCH and the PSFCH are associated. Further, if a PSCCH and a PSFCH are associated with a same PSSCH, the PSCCH and the PSFCH are associated too. With respect to the SCI carried on the PSCCH, the SCI is also associated with the PSSCH and the PSFCH.

In sidelink transmission, if the function of the transmission of the PSFCH is configured to be enabled, it is necessary to define a correspondence relationship between resources of the PSSCH and/or the PSCCH and resources of the PSFCH associated therewith. In the sidelink data transmission, the transmission UE determines, according to the correspondence relationship, where to listen to the potential HARQ-ACK feedback information and/or the CSI feedback information; and accordingly, the reception UE determines, according to the correspondence relationship, where to transmit the potential HARQ-ACK feedback information and/or CSI feedback information.

FIG. 15 is a flowchart of a method 1500 for determining resources for transmitting PSFCH in accordance with an embodiment of the present application. As shown in FIG. 15, in an exemplary embodiment, at S1510, the UE successfully decodes the PSCCH and the associated PSSCH, or successfully decodes the PSCCH, and then the UE determines that it is required to transmit the PSFCH carrying feedback information corresponding to the PSCCH and/or PSSCH; at S1520, the UE determines resources for transmitting the PSFCH according to at least one of the following: PSFCH resources related information indicated in the SCI carried in the PSCCH, resources of the PSCCH and/or resources of PSSCH associated with the PSCCH, correspondence relationship between PSCCH sub-channels and/or PSCCH resources and/or PSSCH sub-channels and/or PSSCH resources and PSFCH sub-channels and/or PSFCH resources, PSFCH configuration, and a predefined rule.

Correspondingly, the UE transmits the PSCCH and the associated PSSCH, and determines that the PSFCH carrying the feedback information corresponding to the PSCCH and/or the PSSCH needs to be received. The UE determines the resources for receiving the PSFCH according to at least one of the following: PSFCH resources indicated in the SCI carried in a PSCCH, PSCCH resources and/or resources of PSSCH associated with the PSCCH, correspondence relationship between PSCCH sub-channels and/or PSCCH resources and/or PSSCH sub-channels and/or PSSCH resources and PSFCH sub-channels and/or PSFCH resources, PSFCH configuration, and a predefined rule.

The correspondence relationships between PSCCH sub-channels and/or PSCCH resources and/or PSSCH sub-channels and/or PSSCH resources and PSFCH sub-channels and/or PSFCH resources are configured and/or predefined. The UE determining whether it is necessary to transmit and/or receive a PSFCH carrying feedback information corresponding to the PSCCH and/or the PSSCH includes determining it, according to information for enabling or disabling the HARQ-ACK explicitly or implicitly indicated in the PSFCH configuration. For an explicit indication, a specific example is that the UE obtains PSFCH configuration which is indicated in a sidelink grant message, the PSFCH configuration includes information indicating whether to enable or disable HARQ-ACK feedback. For an implicit indication, a specific example is that if it is indicated in the PSFCH configuration obtained by the UE that the PSFCH is periodically configured in the resource pool, and the time domain period and/or the frequency domain period are dedicated to indicating the status of disabling the HARQ-ACK feedback (for example, positive infinity), then the UE determines that the PSFCH needs not to be transmitted and/or received, otherwise the UE determines that the PSFCH needs to be transmitted and/or received. Another specific example is that the PSRP threshold or the geographical distance threshold between the transmitter and the receiver is indicated in the PSFCH configuration obtained by the UE, and the UE determines whether the PSFCH needs to be transmitted and/or received according to whether the RSRP of the PSSCH and/or the PSCCH is lower than or higher than a threshold, and/or whether the geographic distance between the transmission UE and the reception UE is lower than or higher than a threshold.

In an exemplary embodiment, the UE determines time domain resources of the PSFCH associated with the SCI and/or PSSCH, according to the information explicitly or implicitly indicated in the SCI, the resources of the PSCCH carrying the SCI and/or the resources of the PSSCH associated with the PSCCH, PSFCH configuration; and the UE determines the frequency domain resources of PSFCH associated with the SCI and/or PSSCH, according to the resources of SCI and/or resources of PSSCH associated with the SCI, PSFCH configuration and a predefined rule.

In a specific example, the UE performs decoding on the sub-channel M in slot N and obtain an SCI and the associated PSSCH, and transmits PSFCH associated with the SCI and the PSSCH on the PSFCH resource in the sub-channel M+M1 in slot N+N1. N1 is explicitly indicated in a field in the SCI, and M1 is predefined or included in the PSFCH configuration. Further, if there is no PSFCH resource on the sub-channel M+M1 in the slot N+N1 according to the PSFCH configuration, the UE determines another available PSFCH resource according to a predefined rule. For example, the PSFCH resources determined by the UE are PSFCH resources in subchannel M+M1 in the earliest slot containing PSFCH resources after the slot N+N1. Alternatively, it is PSFCH resources in the sub-channel M+M2 in slot N+N1, where M2 is the minimum value that satisfies the following conditions: sub-channel M+M2 contains PSFCH resources and M2>M1 (or may also be replaced by M2<M1).

In the above example, the logical meaning of N1 is the minimum time delay between the PSSCH and its associated PSFCH, which time delay may typically be determined based on capability of the UE. Therefore, the UE obtaining the PSFCH configuration includes the UE obtaining the value of N1 in the PSFCH configuration. Optionally, the UE obtains the value of N1 by using at least one of the following methods of: the UE obtaining a pre-configured/predefined value of the N1 (further including: determining and deriving, by the UE, the value of N1 according to the pre-configured/predefined capability of the UE); the UE obtaining the value of N1 indicated in the sidelink resource pool configuration; the UE obtaining the value of N1 indicated in the UE-specific configuration; and the UE obtaining the value of N1 specific to particular parameters. The particular parameters include at least one of the following: a service priority (such as a service priority indicated by Quality of Service (QoS)), a service type (unicast/broadcast/groupcast), and a communication range (including a target range of communication). After obtaining the value of N1, the UE determines the location of the PSFCH resources corresponding to the PSSCH resources according to the value of N1 and other information indicated by the PSFCH configuration. For example, the UE determines, according to the value of N1 and the location of the PSFCH resources, that PSFCH resources corresponding to the PSSCH on a sub-channel M in slot N are PSFCH resources on the sub-channel M in the earliest slot with PSFCH resources after slot N+N1 (assuming M1=0 in this example).

The value of N1 may be common (for example, all UEs in the resource pool use the same N1, and then the value of N1 is common in the resource pool level) or UE-specific/particular parameters-specific. The advantage of the common value of N1 is that all UEs use the same N1 and will follow the same PSSCH-PSFCH mapping criteria, therefore, UEs using the same PSSCH resources will use the same PSFCH time domain resources, which avoids resource waste due to the same PSSCH corresponding to multiple PSFCH time domain resources. For example, the scenario in which multiple reception UEs receive sidelink data on the same PSSCH resources but feed back PSFCH on different PSFCH time domain resources in groupcast will not occur (it is to be noted here, only the time domain resources are concerned, and the frequency domain/code domain resources are not restricted hereto), thereby avoiding the situation that the transmission UE needs to listen to the PSFCH in multiple slots in groupcast, reducing the PSFCH resource overhead and reducing the overhead for the transmission UE to listen to the PSFCH. The UEs that use different PSSCH resources use different PSFCH time domain resources. Therefore, if the sidelink data transmissions of multiple transmission UEs do not conflict, the feedback information thereof does not conflict. Therefore, the common value of N1 helps to reduce the complexity of the system both in Mode 1 in which the base station schedules sidelink transmission and in Mode 2 in which the UE selects sidelink resources, and can ensure the fixity of the PSSCH-PSFCH mapping at the system level (specifically, the system level depends on the level at which N1 is common; and for example, if N1 is the common parameter at the resource pool level, then the system level is the resource pool level). That is, at the system level, the given PSSCH resources will always be mapped to given PSFCH resources, which will not be changed according to other parameters. In addition, in Mode 2, additional collisions can be avoided. Specifically, the circumstance in which data of the two transmission UEs are not in conflict (with different PSSCH resources) but feedback information thereof is in conflict (with overlapped PSFCH resources) can be avoided, thereby avoiding the negative impact of PSFCH collision on the performance of HARQ-based transmission.

The benefit of the value of N1 being UE-specific/specific parameters-specific is that a UE with higher capability can use a smaller value of N1, thereby reducing the transmission time delay. The benefit of the value of N1 being UE-specific/particular parameters-specific is particularly significant for time-delay-sensitive sidelink services. The method is more suitable for use in Mode 1, because the base station can acquire the performance of each UE and determine the corresponding N1 value, so that when sidelink resources for the UE is scheduled, not only the location of the PSSCH resources is considered but also the location of the PSFCH resources is considered according to the location of the PSSCH resources and N1, thereby avoiding the PSSCH collision and the PSFCH collision, by the base station scheduling the appropriate resource location. This method can also be used in Mode 2, but it will make it more difficult to control the conflicts, which may cause a negative effect on the decoding performance of the system, equivalent to the trade off between time delay and reliability.

Whether the value of N1 can be common or UE-specific/particular parameters-specific does not absolutely depend on the method by which the UE obtains the value of N1. For example, the UE may obtain the value of N1 indicated in the resource pool configuration, and the value is common; and the UE may also obtain the value of N1 indicated by the base station through UE-specific RRC signaling, if the base station indicates the same value of N1 for all UEs, the actual effect is that the value of N1 is common although the value is indicated in the UE-specific signaling (the UE may also assume that the value is UE-specific).

In a specific example, the UE obtains at least the value of N1 indicated in the resource pool configuration, and the value is common. In addition, the UE may also obtain the value of N1 indicated in the UE-specific RRC signaling, or derive the value of N1 according to the capability of the UE, and the value of N1 indicated in the resource pool configuration is replaced by the value of N1 indicated in the UE-specific RRC signaling/derived according to the capability of the UE. In another specific example, the UE only obtains the value of N1 indicated in the resource pool configuration; or the UE only derives the value of N1 according to the capability of the UE.

The method for the UE to obtain N1 and the attribute of N1 (common/specific) provided in the above example may also be similarly used for other parameters, such as other parameters of the time domain, other parameters of the frequency domain (such as M1, M2 in the above example) and other parameters of the code domain (such as offset between different cyclic shifts of the PSFCH sequence corresponding to different code domain resources) in the PSSCH-PSFCH mapping relationship.

In the above example, if the PSFCH resources are divided into PSFCH sub-channels, the sub-channels in the above example may be replaced by PSSCH sub-channels if they correspond to PSSCH resources (for example, PSSCH resources on sub-channel X), and may be replaced by PSFCH sub-channels if they correspond to PSFCH resources. Indices of the sub-channels (for example, M and M+M1 in the above example) are indices of sub-channels of corresponding types, or are all indices of PSSCH sub-channels. If the PSFCH resources are not divided into sub-channels, frequency domain location thereof may also be indicated by the PSSCH sub-channel. For example, when the frequency domain location of the PSFCH resource overlaps with the frequency domain location of a certain PSSCH sub-channel (referred to as sub-channel X) or is a subset of the frequency domain position of a certain PSSCH sub-channel, the UE assumes that the PSFCH resources are PSFCH resources in the sub-channel X. In this example, the index X of the sub-channel is actually the index of the PSSCH sub-channel.

In another exemplary embodiment, there is a predefined and/or configured correspondence relationship between PSSCH sub-channels and/or PSCCH sub-channels and PSFCH sub-channels or PSFCH resources, and PSFCH sub-channels or PSFCH resources corresponding to the PSSCH sub-channels and/or the PSCCH sub-channels are used to transmit the PSSCH carried on the PSSCH sub-channels and/or the PSFCH corresponding to the PSCCH carried on the PSCCH sub-channels.

The UE successfully decodes the PSCCH and the associated PSSCH, or successfully decodes the PSCCH, and then the UE determines that a PSFCH carrying feedback information corresponding to the PSCCH and/or the PSSCH needs to be transmitted, and the UE determines resources for transmitting the PSFCH according to the correspondence relationship between the PSSCH sub-channels and/or the PSCCH sub-channels and the PSFCH sub-channels and/or PSFCH resources and the PSFCH configuration. Correspondingly, the UE transmits the PSCCH and the associated PSSCH, and determines that a PSFCH carrying the feedback information corresponding to the PSCCH and/or the PSSCH needs to be received, and the UE determines resources for receiving the PSFCH according to the correspondence relationship between the PSSCH sub-channels and/or the PSCCH sub-channels and the PSFCH sub-channels and/or PSFCH resources and the PSFCH configuration. In this embodiment, the PSSCH sub-channel may also be PSSCH resources, and the PSCCH sub-channel may also be PSCCH resources.

In an exemplary embodiment, the UE determines resources for transmitting or receiving the PSFCH according to the PSCCH resources and/or resources of the PSSCH associated with the PSCCH, and a correspondence relationship between the PSSCH resources and/or the PSCCH resources and the PSFCH resources. The correspondence relationship includes at least one of the following (the PSSCH resources may be equivalently replaced with PSCCH resources or replaced with PSSCH resources and PSCCH resources) in which:

One PSSCH resource corresponds to one PSFCH resource;
One PSSCH resource corresponds to more than one PSFCH resource;
More than one PSSCH resource corresponds to the same PSFCH resource; and
R PSSCH resources correspond to S PSFCH resources, wherein R and S are positive integers.

In a specific example, one PSSCH resource is one PSSCH sub-channel in one slot; and the same one PSSCH sub-channel in multiple slots is regarded as multiple PSSCH resources, and multiple PSSCH sub-channels in one slot are regarded as multiple PSSCH resources.

In a specific example, one PSFCH resource is one PSFCH resource defined in the time domain, the frequency domain and the code domain. According to the PSFCH configuration, one PSFCH sub-channel may include one PSFCH resource or include multiple PSFCH resources. The more than one PSSCH resource may be used to carry the same data, or the same transport blocks (TBs) or bundled transport blocks (TBs). Correspondingly, the PSFCHs corresponding to the more than one PSSCH resource are the same (for example, correspond to the same PSFCH message, or carry the same feedback information (for example, both ACK or both NACK) in corresponding PSFCH). Alternatively, the more than one PSSCH resource may be used to carry different data or different transport blocks (TBs), and correspondingly, the PSFCH corresponding to the more than one PSSCH resource may be the same or different.

As a description of the exemplary embodiment of another form, the UE determines resources for transmitting or receiving the PSFCH based on at least the PSCCH resources and/or resources of the PSSCH associated with the PSCCH, and a correspondence relationship between the PSSCH sub-channels/resources and/or the PSCCH sub-channels/resources and the PSFCH sub-channels and/or PSFCH resources, and the UE maps the PSFCH associated with the PSSCH and/or the PSCCH to the PSFCH resources. The correspondence relationship includes at least one of the following:

Mapping a PSFCH associated with one PSSCH to one PSFCH resource;
Mapping a PSFCH associated with one PSSCH to more than one PSFCH resource;
Mapping a PSFCH associated with more than one PSSCH to the same PSFCH resource;
Mapping a PSFCH associated with the M PSSCHs to N PSFCH resources.

In a specific example, one PSFCH resource is one PSFCH resource defined in the time domain, the frequency domain and the code domain, and one PSSCH is a PSSCH transmitted on one PSSCH sub-channel in one slot. The more than one PSSCH may be used to carry the same data or the same transport blocks (TBs). Correspondingly, the PSFCHs corresponding to the more than one PSSCH are the same (for example, correspond to the same PSFCH message, or carry the same feedback information (for example, both ACK or both NACK) in corresponding PSFCH). Alternatively, the more than one PSSCH may be used to carry different data or different transport blocks (TBs), and correspondingly, the PSFCH corresponding to the more than one PSSCH may be the same or different.

It should be noted that, in the foregoing exemplary embodiment, the description of the correspondence relationship between the PSSCH resources and the PSFCH resources is from the perspective of the UE. From a perspective of a system, the correspondence relationship between PSSCH resources and PSFCH resources may be the same or different from the perspective of the UE. In a specific example, from the perspective of the UE, one PSSCH resource corresponds to one PSFCH resource defined in the time domain, the frequency domain and the code domain; but from the perspective of the system, one PSSCH resource may be used by multiple UEs to transmit the PSSCH. Correspondingly, when multiple reception UEs that receive the PSSCHs transmitted by the multiple UEs transmit the corresponding PSFCHs, the multiple used PSFCH resources use the same time domain resources and frequency domain resources, but may use different code domain resources and multiplex them in a form of CDM. Therefore, from the perspective of the system, one PSSCH resource corresponds to multiple PSFCH resources defined in the time domain, the frequency domain and the code domain, and the time domain resources and the frequency domain resources of the multiple PSFCH resources are the same, but the code domain resources thereof are different. A typical application scenario of the example is that when the HARQ-ACK feedback is carried on the PSFCH in a form of a sequence, and each UE may use a sequence generated according to the UE-specific configuration, so that the PSFCHs of multiple UEs are code division multiplexed on the same time domain resources and frequency domain resources. If the transmission of the HARQ-ACK feedback information is based on channel coding, it is also possible to implement the CDM of the PSFCH of the multiple UEs on the same time domain resources and frequency domain resources based on the reference signal of the CDM or the scrambling code of the CDM. On the contrary, in another specific example, from the perspective of the system, one PSSCH resource corresponds to a unique PSFCH resource defined in the time domain, the frequency domain and the code domain, that is, all UEs using the PSSCH resources will select the same code domain resources during transmission of the PSFCH resources. Both the sequence-based HARQ-ACK feedback and the channel coding based HARQ-ACK feedback are applicable to this method.

In an exemplary embodiment, the UE determining resources for transmitting or receiving the PSFCH based on at least the PSCCH resources and/or resources of the PSSCH associated with the PSCCH, and a correspondence relationship between the PSSCH resources and/or the PSCCH resources and the PSFCH resources further includes the following: if the PSCCH resources include more than one PSCCH resource, and/or the PSSCH resources include more than one PSSCH resource, and the PSSCH resources and/or the PSCCH resources correspond to more than one PSFCH resource, the UE determining to transmit or receive the PSFCH on all of the more than one PSFCH resource, or the UE determining to transmit or receive the PSFCH on a portion of the more than one PSFCH resource.

In an exemplary embodiment, the UE determining resources for transmitting or receiving the PSFCH based on resources of received PSCCH and/or resources of PSSCH associated with the PSCCH and a correspondence relationship between the PSSCH resources and/or PSCCH resources and the PSFCH resources further includes the following: determining PSFCH resources corresponding to the resources of received PSCCH and/or resources of PSSCH associated with the PSCCH; if the corresponding PSFCH resources include a PSFCH resource, determining that the PSFCH resource is used for transmitting the PSFCH; and if the corresponding PSFCH resources include multiple PSFCH resources, determining the second PSFCH resources of the multiple PSFCH resources used for transmitting the PSFCH according to at least one of the following: the PSFCH configuration, content of feedback information carried by the PSFCH, information transmitted on the received physical sidelink channel and a predefined rule.

The second PSFCH resources are all or a portion of the resources of the multiple PSFCH resources.

In an exemplary embodiment, the UE determining to transmit or receive the PSFCH on all or a portion of the resources of the more than one PSFCH resource further includes the UE determining the way in which the PSFCH is mapped to the PSFCH resources, which includes at least one of the following:

Mapping one PSFCH to one PSFCH resource;

Mapping or rate matching one PSFCH to one PSFCH resource, and the mapping or rate matching is repeated R times on R PSFCH resources; and Mapping or rate matching one PSFCH to R PSFCH resources.

R is an integer greater than one.

In an exemplary embodiment, the UE determining to transmit or receive the PSFCH on a portion of the more than one PSFCH resources further includes the UE determining to transmit or receive the PSCCH and/or the PSSCH on remaining PSFCH resources not used to transmit or receive a PSFCH in the more than one PSFCH resource or determining the remaining resources to be vacant.

In an exemplary embodiment, the UE determining to transmit or receive the PSFCH on a portion of the more than one PSFCH resources further includes the UE selecting R PSFCH resources for transmitting or receiving the PSFCH in the more than one PSFCH resources according to a predefined rule and/or information indicated or configured through signalling.

In an exemplary embodiment, the received PSSCH is transmitted on multiple PSSCH resources, and the transmitting the PSFCH includes transmitting in at least one of the following PSFCH transmission modes in which:

One transmitted PSFCH is used for indicating feedback information corresponding to the PSSCHs carried on the multiple PSSCH resources, and the PSSCHs carried on at least two PSSCH resources of the multiple PSSCH resources correspond to the same or bundled sidelink data or transport blocks (TBs);

One transmitted PSFCH is used for indicating feedback information corresponding to the PSSCHs carried on the multiple PSSCH resources, and the PSSCHs carried on at least two PSSCH resources of the multiple PSSCH resources correspond to independent sidelink data or TBs;

One transmitted PSFCH is used for indicating feedback information corresponding to the PSSCH(s) carried on one or more than one PSSCH resource of the multiple PSSCH resources, and the PSSCHs carried on at least two PSSCH resources in the more than one PSSCH resource correspond to the same or bundled sidelink data or TBs;

One transmitted PSFCH is used for indicating feedback information corresponding to the PSSCH(s) carried on one or more than one PSSCH resource of the multiple PSSCH resources, and the PSSCHs carried on at least two PSSCH resources in the more than one PSSCH resources correspond to independent sidelink data or TBs.

In an exemplary embodiment, the UE determining resources for transmitting or receiving the PSFCH based on the more than one PSCCH resource and a correspondence relationship between the PSSCH resources and the PSFCH resources further includes, the PSSCHs carried on each PSSCH resource in the more than one PSSCH resource:

Corresponding to the same data or the same TBs or bundled TBs, and corresponding to the same PSFCH and/or corresponding to the PSFCHs with the same contents; or Corresponding to independent data or independent TBs, and corresponding to the same PSFCH and/or corresponding to the PSFCHs with the same contents and/or corresponding to the PSFCHs with independent contents; or Corresponding to independent data or independent TBs, and corresponding to independent PSFCHs and/or corresponding to the PSFCHs with independent contents.

In particular, the contents of the corresponding PSFCH may be feedback information corresponding to the PSSCH in the feedback information carried by the PSFCH.

The PSSCHs carried on each PSSCH resource corresponding to independent data, and corresponding to the PSFCHs with the same contents, further includes the UE being configured to use the TB bundling, the PSSCHs carried on each PSSCH resource corresponding to one transport block (TB) in one TB bundling window, all TBs in one TB bundling window corresponding to the same content in the same PSFCH or the same content in the PSFCH (for example, the same field in the PSFCH for indicating feedback information).

In a specific example, the UE transmits a transport block TB, and the TB is carried on multiple PSSCH sub-channels in one slot, so multiple PSSCH resources corresponding to the multiple PSSCH sub-channels carry the same TBs. The multiple PSSCH sub-channels may correspond to one PSFCH resource or multiple PSFCH resources, and the same PSFCH is carried on the one or more PSFCH resources, and the contents of the PSFCHs which correspond to the multiple PSSCH resources corresponding to the multiple PSSCH sub-channels are the same.

In another specific example, the UE is configured to transmit multiple TBs in one TB bundling window using TB bundling and each TB is carried on one PSSCH sub-channel in one slot, therefore the multiple PSSCH resources corresponding to the multiple PSSCH sub-channels carry independent TBs. All TBs in one TB bundling window correspond to the same PSFCH, and accordingly, the PSSCHs carried on the multiple PSSCH resources corresponding to the multiple PSSCH sub-channels correspond to the same PSFCHs. If the same field is used to indicate the feedback information of all the TBs in the PSFCHs, then the contents of corresponding PSFCHs are the same; otherwise, if different fields are used to indicate respectively the feedback information of all the TBs in the PSFCHs, then the contents of corresponding PSFCHs are independent, and may be the same or different.

In another specific example, the UE is not configured to use the TB bundling to transmit multiple TBs and each TB is carried on one PSSCH sub-channel in one slot, therefore the multiple PSSCH resources corresponding to the multiple PSSCH sub-channels carry independent TBs. Each TB corresponds to an independent PSFCH, and accordingly, the PSSCHs carried on the multiple PSSCH resources corresponding to the multiple PSSCH sub-channels correspond to the independent PSFCHs, and the contents of the corresponding PSFCHs are independent.

It should be noted that the method does not limit that any one TB in a TB bundling window is transmitted on one or more PSSCHs (or PSSCH sub-channels). For example, the PSSCH carried on each PSSCH resource independently corresponds to one TB, but the TBs corresponding to the PSSCHs carried on more than one PSSCH resource may be the same. As an extension of the method, all b0 TBs in a TB bundling window correspond to a total of b1 PSFCHs, and the mapping between b0 TBs and b1 PSFCHs is predefined, where b0 and b1 are positive integers.

For a case where TBs corresponding to PSSCHs carried on more than one PSSCH resource are the same, slot aggregation can be considered as a specific application example of the case in the TB bundling. In a system in which slot aggregation is enabled, the UE transmits one sidelink TB in multiple slots, and the PSSCH resources used by the TB are PSSCH sub-channels with the same position in the frequency domain in each slot; and the UE also transmits sidelink control information (SCI) corresponding to the TB, which is transmitted in multiple PSCCHs (for example, PSCCHs associated with PSSCHs of the TB in each slot), or transmitted in one PSCCH (for example, the PSCCH associated the PSSCHs in the first slot). Since the sidelink TB is transmitted on PSSCHs in multiple slots, there are two methods for generating the sidelink TB. One method is that the UE performs rate matching on the PSSCHs in each slot, and the PSSCHs generated accordingly in each slot can be independently decoded. This method is similar to the repetition technique in the prior art, which is equivalent to repeating a PSSCH based on one slot for several times in multiple slots after the PSSCH is generated for one sidelink TB. The other method is that the UE performs rate matching based on total resources of the PSSCHs in multiple slots, and the PSSCH generated accordingly in one slot cannot be independently decoded, and needs to be decoded using PSSCHs in multiple slots. This method is equivalent to generating a PSSCH based on multiple slots for one sidelink TB, but not repeating the PSSCH. The two methods can also be used in combination. For example, the UE generates a PSSCH based on multiple slots for one sidelink TB, and repeats the generated PSSCH for several times. Multiple slots corresponding to the one sidelink TB are considered as aggregated slots. Therefore, if the UE is configured to enable slot aggregation, various methods in which the UEs in this application are configured to use TB bundling can be used.

The total number of TBs b0 in a TB bundling window is configured by high layer signaling or by physical layer signaling or predefined. Specifically, at least one of the following embodiments is included, in which:

The UE derives it according to predefined or configured parameters;

The UE determines it by itself without exceeding the predefined or configured maximum size of the TB bundling window.

The UE determining the total number of TBs in the TB bundling window by itself includes determining based on the PSFCH configuration and/or based on at least one of the following:

A service type, a network coverage (for example, in coverage or out of coverage), a transmission mode (for example, mode 1 or mode 2), whether the PSSCH is first transmitted or retransmitted, whether the transmission is unicast or groupcast, the type of the group corresponding to the groupcast transmission, the number of members of the group corresponding to the groupcast transmission, and MCS and/or TBS of the PSSCH, the link quality parameter of the PSSCH (for example, RSRP, RSRQ, RSSI and pathloss between the transmitter and the receiver), packet priority, QoS, service latency requirement, resource pool congestion level, geographical location information (for example, zone ID, and a geographic distance between the transmitter and the receiver), a V2X scenario type (for example, urban city or freeway), and V2X scenario parameters (for example, moving velocity, density of the vehicle, etc.).

The resource relationship of all TBs in one TB bundling window is predefined and/or indicated by high layer signaling or physical layer signaling, and includes at least one of the following in which:

The time domain resources of all TBs in one TB bundling window are the same, the frequency domain resources thereof are different and do not overlap with each other, and the frequency domain locations may be adjacent or not adjacent;

The frequency domain resources of all TBs in one TB bundling window are the same, the time domain resources are different and do not overlap with each other, and the time domain locations may be adjacent or not adjacent;

The time domain and frequency domain resources of all TBs in one TB bundling window are mapped according to a predetermined pattern or a configured pattern.

In a specific example, the time domain resource location of the first TB in one TB bundling window is a slot N0, and the frequency domain resource location thereof is a sub-channel M0; and correspondingly, the time domain resource and frequency domain resource location of the bth TB is:

Slot N0, and sub-channel M0+(b−1)*gap1; or

Slot N0+(b−1)*gap2, and sub-channel M0; or

Derived and determined according to N0, M0, b, predefined or configured mapping patterns.

The above gap1 means the number of sub-channels between two adjacent TBs, and the gap2 means the number of slots between two adjacent TBs.

In another specific example, the UE is configured to enable the feature of slot aggregation, and the UE determines a size and/or resources of a TB bundling window according to a configuration of the slot aggregation. For example, one TB bundling window corresponds to a set of aggregated slots which are used to transmit one sidelink TB, and accordingly, the size of the TB bundling window is a granularity of the slot aggregation, and the resources of the TB bundling window are resources of the set of aggregated slots. Similarly, one TB bundling window may also correspond to more than one set of aggregated slots, and accordingly, the size of the TB bundling window is an integer multiple of the granularity of the slot aggregation, and the UE determines the resources of the TB bundling window based on the resources of the more than one set of aggregated slots.

In an exemplary embodiment, the UE being configured to use the TB bundling includes when the UE transmits TBs by using the TB bundling, indicating additional information related to the TB bundling in the SCI corresponding to the TBs. information. It includes at least one of the following:

Indexes or sequence numbers of the TBs carried by the PSSCHs associated with the SCI in the TB bundling window; and Time domain resources and/or frequency domain resources and/or code domain resources of at least one TB in the other TBs in the TB bundling window.

The indication is explicit or implicit, for example, index or sequence number of the TB carried by the PSSCH associated with the SCI in the TB bundling window is derived according to the resource information of the PSSCH carrying the SCI and/or the PSSCH associated with the SCI; and/or time domain resources and/or frequency domain resources and/or code domain resources of at least one TB in the other TBs in the TB bundling window is derived according to the resource information of the PSSCH carrying the SCI and/or the PSSCH associated with the SCI and the index or sequence number of the TB carried by the PSSCH associated with the SCI in the TB bundling window.

The contents of the PSFCHs corresponding to the PSSCHs are all the feedback information carried in the PSFCHs corresponding to the PSSCHs, or are a specific portion of feedback information carried in the PSFCHs corresponding to the PSSCHs.

In an exemplary embodiment, P PSSCHs correspond to the same one PSFCH, and the corresponding P fields in the PSFCH are respectively used to indicate feedback information of each PSSCH, and P is a positive integer. The contents of the PSFCHs corresponding to the PSSCHs are corresponding fields indicating the feedback information of the PSSCHs. In another exemplary embodiment, all P TBs in one TB bundling window correspond to the same PSFCH, and corresponding P fields in the PSFCH are respectively used to indicate feedback information of each TB. The contents of the PSFCHs corresponding to the PSSCHs are corresponding fields indicating the feedback information of the TBs carried by the PSSCHs. In another exemplary embodiment, all P TBs in one TB bundling window correspond to the same PSFCH, the same field in the PSFCH is used to indicate feedback information of all P TBs in the TB bundling window, and the content of the PSSCH corresponding to PSFCH is all the information carried by the PSFCH.

In a specific example, four PSSCHs correspond to the same one PSFCH, and the PSFCH carries 4-bit information indicating ACK/NACK feedback of 4 PSSCHs, respectively. In another specific example, all 2 TBs in a TB bundling window correspond to the same PSFCH, and the PSFCH carries 2-bit information indicating ACK/NACK feedback of the 2 TBs, respectively. In another specific example, all 2 TBs in a TB bundling window correspond to the same PSFCH, and the PSFCH carries 1-bit information for indicating ACK/NACK feedback of all the 2 TBs, that is, the feedback information of the 2 TBs is either ACK or NACK.

It should be noted that the exemplary embodiment is applicable to a sequence based feedback message and a channel coding based feedback message. For sequence based feedback messages, it can be assumed that 2N sequences carry N-bit information, and the fields in the above exemplary embodiment are specific fields in the N-bit information.

In an exemplary embodiment, a UE transmits a PSFCH which carries feedback information corresponding to more than one PSSCH, and the more than one PSSCH is transmitted by the same UE, or is transmitted by different ones of more than one UE.

In an exemplary embodiment, a UE transmits a PSFCH which carries feedback information corresponding to more than one PSSCH, and the more than one PSSCH is transmitted by more than one UE, and the UE determines a field used in the PSFCH to indicate the PSSCH according to resources of each PSSCH. Correspondingly, a UE receives the PSFCH which carries the feedback information corresponding to more than one PSSCH, and the UE determines the field used in the PSFCH to indicate the PSSCH according to resource used for transmission of the PSSCH corresponding to the received PSFCH and/or the resource used by the UE to transmit its own PSSCH.

In an exemplary embodiment, the UE transmitting a PSFCH which carries feedback information corresponding to more than one PSSCH and the more than one PSSCH being transmitted by more than one UE further includes the UE determining a transmission power of the PSFCH based on the power control information of multiple PSSCHs corresponding to the PSFCH, by at least one of the following:

determining the transmission power of the PSFCH based on power control information of the multiple PSSCHs obtained from the multiple UEs; and transmitting the PSFCH associated with the multiple PSSCHs on the determined PSFCH resources based on the transmission power of the PSFCH.

The power control information includes at least one of the following:

the lowest and/or highest pathloss of the multiple UEs;
the average value of the pathlosses of the multiple UEs;
the sum of the pathlosses of the multiple UEs;
the pathloss of the UE corresponding to the latest PSSCH in the time domain among the multiple UEs;
the pathloss of a predefined or configured one of the multiple UEs; and
the pathloss corresponding to one of the multiple UEs having the farthest geographical distance.

In an exemplary embodiment, the pathloss may be derived and determined based on at least one of the following items of a predefined signal: received power of the predefined signal, preconfigured target reception power of the predefined signal, and preconfigured transmission power or maximum transmission power corresponding to the predefined signal.

In an exemplary embodiment, the UE calculates the pathloss and/or RSRP based on a given reference signal, and the transmission power of the reference signal is fixed and does not vary with the result of the power control. The given reference signal includes at least one of the following: DMRS, CSI-RS, DMRS of PSCCH, and DMRS of PSSCH.

In a specific example, the UE adjusts the transmission power of the DMRS of the PSSCH according to the result of the power control, but fixes the transmission power of the DMRS of the PSCCH. The transmission UE transmits a PSCCH, and the transmission power of the DMRS of the PSCCH is a fixed value which is predetermined or configured; and the reception UE calculates a pathloss and/or an RSRP according to the DMRS of the PSCCH, and the calculated pathloss and/or RSRP is fed back to the transmission UE for power control of the transmission UE.

In an exemplary embodiment, the UE determines that, according to the PSFCH configuration, within the V2X resource pool, in each slot associated with the resource pool, the PSFCH resources are periodically configured in the time domain and/or in the frequency domain, and the period is N slots and/or M sub-channels. With respect to the configuration of the PSFCH, the PSFCH sub-channels are periodically configured in the time domain and/or in the frequency domain, and the periods are N slots and M sub-channels respectively. Each configured PSFCH sub-channel is composed of M*N PSFCH resource subsets, each PSFCH resource subset includes K PSFCH resources, and K is a positive integer. Therefore, within one PSFCH resource period, there are a total of M*N PSSCH resources and M*N*K PSFCH resources. The UE determines that, according to the PSFCH configuration, within one PSFCH period, each PSSCH resource corresponds to K PSFCH resources in one PSFCH resource subset. When K=1, one PSSCH resource corresponds to one PSFCH resource; and when K>1, one PSSCH resource corresponds to more than one PSFCH resources. The above PSFCH resource period is N slots in the time domain and M sub-channels in the frequency domain containing one PSFCH sub-channel. When M is greater than 1 or N is greater than 1, the M*N PSFCH resource subsets are time division multiplexed and/or frequency division multiplexed, and the occupied time domain resources and frequency domain resources do not overlap with each other. When K is greater than 1, the K PSFCH resources are code division multiplexed on the same time domain resources and frequency domain resources, and K is a positive integer.

FIG. 16 schematically illustrates a multiplexing method of PSFCH resource subset. As shown in FIG. 16, in an exemplary embodiment, the UE determines, according to the PSFCH configuration, that the M*N PSFCH resource subsets are time division multiplexed and/or frequency division multiplexed when M>1 or N>1, and the occupied time domain resources and frequency domain resources do not overlap with each other. Further, each PSFCH resource subset includes K PSFCH resources, and when K=1, each configured PSFCH sub-channel actually includes M*N PSFCH resources which are time division multiplexed and/or frequency division multiplexed, and when K>1, the K PSFCH resources included in each PSFCH resource subset use the same time domain resources and frequency domain resources and different code domain resources, that is, each PSFCH resource subset includes K PSFCH resources which are code division multiplexed. Therefore, within one PSFCH resource period, there are a total of M*N PSSCH resources and M*N*K PSFCH resources.

In another exemplary embodiment, the UE determines, according to the PSFCH configuration, that the M*N PSFCH resource subsets are Time division multiplexed and/or frequency division multiplexed when M>1 or N>1, and the occupied time domain resources and frequency domain resources do not overlap with each other; Further, each PSFCH resource subset includes K PSFCH resources, and when K>1, the K PSFCH resources are frequency division multiplexed and/or time division multiplexed and/or code division multiplexed. In a specific example, K is an even number, and the K PSFCH resources are composed of 2 groups of PSFCH resources, and each group of PSFCH resources owns K/2 PSFCH resources which are code division multiplexed, and the time domain resources and frequency domain resources used by the 2 groups of PSFCH resources do not overlap with each other and are mutually division multiplexed or time division multiplexed. A scenario in which the exemplary embodiment is applicable is that, for a HARQ-ACK of a groupcast, the reception UE of groupcasted data uses independent feedback resources for feedback. Specifically, all reception UEs that transmit the ACK feedback use at least one PSFCH resource in K/2 PSFCH resources which are code division multiplexed within one group of PSFCH resources, and all the reception UEs that transmit the NACK feedback use at least one PSFCH resource in K/2 PSFCH resources which are code division multiplexed within the other one group of PSFCH resources.

In another exemplary embodiment, the UE determines, according to the the PSFCH configuration, that the total of M*N*K resources in the M*N PSFCH resource subsets are time division multiplexed and/or frequency division multiplexed and/or code division multiplexed within the PSFCH sub-channel.

In an exemplary embodiment, PSFCH resources corresponding to physical sidelink channel resources on the M1th sidelink sub-channel in the N1th slot within a Y0th PSFCH resource period are first PSFCH resources on a PSFCH sub-channel configured in a Y1th resource period. A mapping between Y0 and Y1 is predefined, or configured or indicated by specific signalling, a mapping between M1 and at least one of time domain resources, frequency domain resources, and code domain resources of the first PSFCH resources is predefined, or configured or indicated by specific signalling, a mapping between N1 and at least one of time domain resources, frequency domain resources, and code domain resources of the first PSFCH resources is predefined, or configured or indicated by specific signaling, and Y0, Y1, M1, and N1 are all positive integers. The PSFCH resource periods are N slots in the time domain and M sidelink sub-channels in the frequency domain including one PSFCH sub-channel, and the predefined mappings are defined in or derived from the PSFCH configuration and the specific signaling is sidelink control information (SCI) or a sidelink grant message associated with the sidelink data.

In an exemplary embodiment, PSFCH resources corresponding to physical sidelink channel resources on the M1th sidelink sub-channel in the N1th slot within the Y0th PSFCH resource period are all resources in the PQth PSFCH resource subset on one PSFCH sub-channel configured in a Y1th resource period. The mapping between Y0 and Y1 is predefined, or configured or indicated by specific signalling; the mapping between M1 and PQ and the mapping between N1 and PQ are predefined, or configured or indicated by specific signalling; and Y0, Y1, M1, N1 and PQ are all positive integers, 1≤PQ≤M*N. The PSFCH resource period is N slots in the time domain and M sidelink sub-channels in the frequency domain including one PSFCH sub-channel, the predefined mappings are defined in or derived from the PSFCH configuration, and the specific signaling is sidelink control information (SCI) or a sidelink grant message associated with the sidelink data.

If the mapping between M1 and PQ and the mapping between N1 and PQ are configured or indicated by signaling and/or the mapping between Y0 and Y1 is configured or indicated by signaling, the signaling may be at least one of the following: a physical layer signalling such as a sidelink grant message and SCI; and high layer signaling such as RRC signaling indicating resource pool configuration or RRC signaling indicating UE-specific configuration. Further, if the signaling is physical layer signaling, the mapping configured or the indicated by the physical layer signaling is only applied to the sidelink transmission scheduled by or associated with the physical layer signaling.

In a specific example, the mapping between M1 and PQ and the mapping between N1 and PQ further include that the UE indexes the M*N PSSCH resources in each PSFCH resource period in a predefined manner (for example, firstly the frequency domain and then the time domain), and indexes M*N PSFCH resource subsets on the PSFCH sub-channel configured in each PSFCH period according to a predefined manner (for example, firstly the frequency domain, then the time domain and then the code domain). The UE assumes that the PSSCH resource whose index is X1 and the PSFCH resource subset whose index is X2 correspond to each other, wherein if the mapping between M1 and PQ and the mapping between N1 and PQ are predefined, then the mapping between X1 and X2 is predefined, for example, X2=X1+a, a is a predefined value; and if the mapping between M1 and PQ and the mapping between N1 and PQ are indicated or configured by signaling, then X2 is indicated or configured by signaling, for example, X2=X1+a, a is indicated or configured by signaling. FIG. 17 schematically shows indexes of PSSCH resources and PSFCH resources in a PSFCH resource period. FIG. 17 provides an indexing method for indexing M*N PSSCH resources in each PSFCH resource period and indexing M*N PSFCH resource subsets on PSFCH sub-channels configured in each PSFCH period in a manner of time domain first followed by frequency domain when M=2 and N=4. Similarly, an indexing method in the manner of firstly the frequency domain and then the time domain may be used. The method is equivalent to replacing the indexes of respective PSSCH sub-channels and respective PSFCH sub-channels in FIG. 17 from 0-1-2-3-4-5-6-7 to 0-2-4-6-1-3-5-7, and will not be shown in the form of another schematic diagram.

In the example provided in FIG. 17, the slot in which the PSFCH sub-channel is configured is the earliest slot in one PSFCH period, and the sub-channel is the sub-channel with the highest position in a frequency domain in one PSFCH period. Similarly, in another example, the slot in which the PSFCH sub-channel is configured may also be the latest slot or the Nnth slot in one PSFCH period, and/or the sub-channel may also be the sub-channel with the lowest position in a frequency domain or the sub-channel which is in the Mmth position among positions from low to high in a frequency domain in one PSFCH period. The specific time resources and frequency resources of the slot configured with a PSFCH sub-channel and the specific time resources and frequency resources of the V2X sub-channel in one PSFCH period do not affect the mechanism for respectively indexing the PSSCH/PSCCH and performing mapping base on the PSFCH in this example.

FIG. 18 is a schematic diagram showing a mapping between PSFCH resource periods. As shown in FIG. 18, in a specific example, the mapping between Y0 and Y1 further includes the following. If the mapping between Y0 and Y1 is predefined, then the last slot in the Y0 PSFCH resource period is slot n (equivalent to that the slot in which the PSSCH is located in the Y0 PSFCH resource period is slot n), and the system processing delay is P slots (which may be the minimum or the maximum processing delay of the system, or a predefined processing delay, P<1 indicates that the system processing delay is in a symbol level), and Y1 is the earliest PSFCH resource period corresponding to the slot configured with the PSFCH resource after the slot n+P. Otherwise, if the mapping between Y0 and Y1 is configured or indicated by signaling, then Y1 is indicated or configured by signalling. For example, Y1=Y0+b, b is indicated or configured by signaling.

In the above exemplary embodiment, since the PSFCH is periodically configured in the time domain and/or the frequency domain, one PSFCH period is correspondingly a concept in the time domain and/or the frequency domain. The UE may determine the sequence number of each PSFCH period according to a predetermined rule (the sequence number corresponds to Y0, and Y1 in the above exemplary embodiment). For example, in a resource pool, each PSFCH is indexed in a predefined order (for example, firstly the frequency domain, and then the time domain, or firstly the time domain and then the frequency domain).

In an exemplary embodiment, the PSFCH resources corresponding to the PSSCH resources on the M1th sub-channel in the N1th slot in the Y0th PSFCH resource period are all the K resources in the PQth PSFCH resource subset on the PSFCH sub-channel configured in the Y1th resource period, and K>1. Therefore, one PSSCH resource corresponds to more than one PSFCH resource.

If one PSSCH resource corresponds to more than one PSFCH resource, a typical application scenario is that when PSSCH resources are used for groupcast, if a subset of the members in the group is used as the reception UEs, different PSFCH resources are used to carry the HARQ-ACK feedback thereof. The different PSFCH resources may be K resources in a subset of PSFCH resources. For example, in a scenario where only groupcasted NACK messages are fed back, the UE determines, according to the PSFCH configuration, that one PSFCH resource subset is configured to include K PSFCH resources which are code division multiplexed, and each PSFCH resource can be used to carry NACK messages of one user or one set of users. The NACK messages of different users or different sets of users are code division multiplexed. For example, in a scenario in which the groupcasted ACK messages and NACK message are fed back, the UE determines, according to the PSFCH configuration, that one PSFCH resource subset is configured to include 2 groups of PSFCH resources which are frequency division multiplexed, and each group of PSFCH resources includes K/2 PSFCH resources which are code division multiplexed, the first group of PSFCH resources is used to carry ACK messages of K/2 users or K/2 sets of users, and the group of PSFCH resources is used to carry NACK message of K/2 users or K/2 sets of users. The set of users corresponds to a scenario in which more than one user selects the same PSFCH resource to transmit the PSFCH.

In the above example, the K resources are at least code division multiplexed. Similarly, the K resources may also be time division multiplexed and/or frequency division multiplexed, and are used to carry HARQ-ACK feedback information of multiple users or sets of user. If the K resources are at least time division multiplexed and/or frequency division multiplexed, the time domain size and/or the frequency domain size of each resource is at least one predefined fixed value, or is derived according to at least one of the following: the number of group members, the time domain size of and/or the frequency domain size of the PSFCH sub-channel, and the number of states of the feedback information carried by the PSFCH (for example, the PSFCH only carries 2 bits of information, corresponding to 4 states; or the PSFCH only carries 2 states of ACK/NACK).

In this exemplary embodiment, the reception UE determines the time domain resources and/or frequency domain resources and/or code domain resources for the PSFCH transmission, and/or the transmission UE determines the correspondence relationship between the time domain resources and/or frequency domain resources and/or code domain resources for the PSFCH transmission and at least one reception UE based on at least one of the following: a transmitter ID (for example, source identity source ID), a receiver ID (for example, destination ID), a group ID, and an ID of the receiver within the group (for example, an index within the group), the content of the feedback information (for example, the HARQ-ACK feedback information is ACK or NACK), the service type being unicast or groupcast, feedback option for groupcast (for example, a manner in which the reception UE transmits the PSFCH only when the HARQ feedback is NACK or a manner in which the reception UE transmits the PSFCH when the HARQ feedback is either ACK or NACK), cyclic redundancy check (CRC) of the PSCCH and/or the PSSCH associated with the PSFCH, geographical location information (for example, zone ID), link quality parameters of the PSSCH (for example, RSRP, RSRQ, RSSI, and pathloss between the transmitter and the receiver), and preconfigured mapping relationships.

In a specific example, the PSFCH configuration acquired by the UE indicates that PSFCH resources are configured in the frequency domain location where each PSSCH sub-channel is located (or in each V2X sub-channel), and that the resources include one PSFCH sub-channel. That is, each PSFCH resource period is N time slots in the time domain and one sidelink sub-channel in the frequency domain including one PSFCH sub-channel (or one PSFCH resource subset, which will not be repeatedly described below). The one PSFCH sub-channel includes P PSFCH resource groups which are frequency division multiplexed, and each PSFCH resource group includes K PSFCH resources which are code division multiplexed. Further, the numbers of PSFCH resources which are code division multiplexed included in different PSFCH resource groups are {K1, K2, K3, . . . , KP}, wherein values of K1, K2, . . . , KP may be different; and for example, they may be (pre)defined or (pre)configured separately.

The UE determining resources for transmitting or receiving the PSFCH according to the PSCCH resources and/or resources of the PSSCH associated with the PSCCH, and a correspondence relationship between the PSSCH resources and/or the PSCCH resources and the PSFCH resources comprises: determining, according to the correspondence relationship, that one PSSCH resource corresponds to P0 PSFCH resource groups, and that frequency domain locations of the P0 PSFCH resource groups or indexes of the P0 PSFCH resource groups in a total of P resource groups are determined by the UE according to time domain locations and frequency domain locations of the PSSCHs/PSCCHs and/or according to the indexes of time domain locations and frequency domain locations of the PSSCHs/PSCCHs within the PSFCH period.

For example, based on the frequency domain location of PSSCH (which may also be replaced by the PSCCH, which is not repeatedly described below) being the Mth sub-channel in the V2X resource pool, the UE determines that corresponding PSFCH resources are in (M+M1)th PSFCH sub-channel in the V2X resource pool or in a PSFCH sub-channel corresponding to the frequency domain location of the (M+M1)th PSSCH sub-channel; based on the time domain location of the PSSCH being the N0th time slot in one PSFCH period (i.e., using the above method to index all PSSCH resources in one PSFCH period, and obtaining the index of the PSSCH as N0), the UE determines that corresponding PSFCH resources are the PSFCH resource groups whose frequency domain locations ranked from ((N0−1)*P0+1)th to (N0*P0)th in a total of P PSFCH resource groups in the PSFCH sub-channel.

Further, if the UE is a UE that receives PSSCH, according to the service type being unicast or groupcast and/or feedback option for groupcast, resource groups specifically used for transmitting the PSFCH are selected in the P0 PSFCH resource groups corresponding to the PSSCH. For example, according to the (pre)defined or (pre)configured criteria, unicast and feedback option 2 for groupcast (feedback option 2 is the manner in which the reception UE transmits the PSFCH when the HARQ feedback is ACK or NACK) correspond to the first to the P1th PSFCH resource groups among P0 PSFCH resource groups, and feedback option 1 for groupcast (feedback option 1 is the manner in which the reception UE transmits the PSFCH only when the HARQ feedback is NACK) corresponds to the (P1+1)th to P2th among the P0 PSFCH resource groups. Further, the UE selects the PSFCH resources for actually transmitting the PSFCH among K PSFCH resources which are code division multiplexed in the PSFCH resource groups based on at least one of the following: a transmitter ID (for example, source ID), a receiver ID (for example, destination ID), a group ID, and an ID of the receiver within the group (for example, an index within the group). For example, when the service uses groupcast with feedback option 1, the UE selects PSFCH resources for actually transmitting the PSFCH according to the transmitter ID; and when the service uses unicast, the UE selects PSFCH resources for actually transmitting the PSFCH according to the receiver ID; and when the service uses groupcast with feedback option 2, the UE selects PSFCH resources for actually transmitting the PSFCH according to the ID of the receiver within the group (for example, an index within the group).

For example, when unicast and the feedback option 2 for groupcast (the manner in which the reception UE transmits the PSFCH when the HARQ feedback is ACK or NACK) corresponds to the first to P1th PSFCH resource groups in the P0 PSFCH resource groups, the UE indexes all the PSFCH resources in the first to the P1th PSFCH resource groups sequentially according to the frequency domain and the code domain locations, and then determines indexes of the PSFCH resources used for the actual transmission of the PSFCH by calculating remainders for the IDs.

In an exemplary embodiment, the UE determines, according to the PSFCH configuration, that in one PSFCH period, each PSSCH resource corresponds to K PSFCH resources in one PSFCH resource subset. The UE is configured to use transport block bundling, and one transport block bundling window (TB bundle or TB bundling window) includes more than one transport block (TB), and each TB is transmitted on at least one PSSCH resource, and all TBs in one TB bundling window correspond to the same PSFCH. Therefore, one PSFCH corresponding to one TB bundling window will correspond to more than one PSFCH resource subset, and the UE needs to further determine which PSFCH resource subsets are actually used for the PSFCH transmission. In an exemplary embodiment, the UE determines the PSFCH resource subset actually used for transmission of the PSFCH based on at least one of the following:

time domain resources and/or frequency domain resources for PSSCHs of at least one particular transport block in a TB bundling window; for example, a PSSCH resource of a first TB, and/or a PSSCH resource of a last TBs;

time domain resources and/or frequency domain resources for PSSCHs used by all transport blocks in a TB bundling window; for example, the latest slot among time domain resources and/or the highest or lowest sub-channel among frequency domain resources for PSSCHs used by all TBs;

transport blocks indicated/configured in signaling or time domain resources and/or frequency domain resources for PSSCHs corresponding to the transport blocks; and the resource information of the PSFCH indicated/configured in signaling; for example, the time domain location of and/or the frequency domain location of and/or the code domain location of the PSFCH resource subset indicated in the SCI corresponding to the at least one transport block in the TB bundling window.

In an exemplary embodiment, the UE determines, according to the PSFCH configuration, a correspondence relationship between the physical sidelink channel resources and the PSFCH resources are that R physical sidelink channel resources correspond to S PSFCH resources, and the UE determines PSFCH transmission modes according to at least one of the PSFCH configuration, the information transmitted on the received physical sidelink channel and the predefined rule. The determined PSFCH transmission modes includes at least one of the following in which:

One transmitted PSFCH is used for indicating feedback information corresponding to physical sidelink channels carried on the multiple physical sidelink channel resources, and physical sidelink channels carried on at least two physical sidelink channel resources of the multiple physical sidelink channel resources correspond to the same or bundled sidelink data or transport blocks (TBs);

One transmitted PSFCH is used for indicating feedback information corresponding to physical sidelink channels carried on the multiple physical sidelink channel resources, and physical sidelink channels carried on at least two physical sidelink channel resources of the multiple physical sidelink channel resources correspond to independent sidelink data or TBs;

One transmitted PSFCH is used for indicating feedback information corresponding to physical sidelink channels carried on one or more than one physical sidelink channel resource of the multiple physical sidelink channel resources, and physical sidelink channels carried on at least two physical sidelink channel resources in the more than one physical sidelink channel resource correspond to the same or bundled sidelink data or TBs;

One transmitted PSFCH is used for indicating feedback information corresponding to physical sidelink channels carried on one or more than one physical sidelink channel resource of the multiple physical sidelink channel resources, and physical sidelink channels carried on at least two physical sidelink channel resources in the more than one physical sidelink channel resource correspond to independent sidelink data or TB.

In a specific example, one transmitted PSFCH includes at least one of the following in which:

The same information field is used to indicate feedback information corresponding to more than one physical sidelink channel or feedback information corresponding to physical sidelink channels carried on more than one physical sidelink channel resource; and Independent information fields are used to indicate feedback information corresponding to each physical sidelink channel or feedback information corresponding to physical sidelink channels carried on each physical sidelink channel resource.

In a specific example, the same information field is used to indicate feedback information corresponding to more than one physical sidelink channel or feedback information corresponding to physical sidelink channels carried on more than one physical sidelink channel resource in one transmitted PSFCH, and the more than one physical sidelink channel or the physical sidelink channels carried on more than one physical sidelink channel resource are transmitted by the same terminal.

In a specific example, the UE determines, according to the PSFCH configuration, the correspondence relationship between the physical sidelink channel resources and the PSFCH resources to be that the four PSSCH resources correspond to one PSFCH sub-channel, and the PSFCH sub-channel includes K PSFCH resources. The UE transmitting the PSFCH on the K PSFCH resources includes at least one of the following:

if K=1 and/or K'=1, transmitting one PSFCH on each PSFCH resource; four bits being used to indicate the HARQ-ACK feedback of the PSSCHs carried on the four PSSCH resources in the PSFCH;

if K=1 and/or K'=1, transmitting one PSFCH on each PSFCH resource; two bits being used to indicate the HARQ-ACK feedback of the PSSCHs carried on the first, second, third and fourth PSSCH resources in the PSFCH, the first and second PSFCH resources carrying bundled TBs, the third and the fourth PSFCH resources carrying bundled TBs;

if K=1 and/or K'=1, transmitting one PSFCH on each PSFCH resource; one bit being used to indicate the HARQ-ACK feedback of the PSSCHs carried on the all four PSSCH resources in the PSFCH, all the four PSSCH resources carrying bundled TBs;

if K=K'=2, transmitting one PSFCH on each PSFCH resource; two bits being used in each PSFCH to respectively indicate HARQ-ACK feedback of PSSCHs carried on two PSSCH resources, specifically, the first PSFCH indicating HARQ-ACK feedback of the PSSCHs carried on the first and the second PSSCH resources, the second PSFCH indicating HARQ-ACK feedback of the PSSCHs carried on the third and the fourth PSSCH resources;

if K=K'=2, transmitting one PSFCH on each PSFCH resource; one bit being used in each PSFCH to indicate HARQ-ACK feedback of the PSSCHs carried on two PSSCH resources, two PSSCH resources carrying bundled TBs, specifically, the first PSFCH indicating HARQ-ACK feedback of the PSSCHs carried on the first and the second PSSCH resources, and the second PSFCH indicating HARQ-ACK feedback of the PSSCHs carried on the third and the fourth PSSCH resources;

if K'=3 and K>K', on K' resources in the K PSFCH resources, transmitting one PSFCH on each PSFCH resource; the first PSFCH using two bits to indicate HARQ-ACK feedback of the PSSCHs carried on two PSSCH resources respectively, or using one bit to indicate HARQ-ACK feedback of the PSSCHs carried on two PSSCH resources (the 2 PSSCH resources carry bundled TBs), specifically, it indicating HARQ-ACK feedback of the PSSCHs carried on the first and the second PSSCH resources. The other two PSFCHs use one bit to indicate HARQ-ACK feedback of the PSSCHs carried on one PSSCH resource, specifically, the other two PSFCHs respectively indicate HARQ-ACK feedback of the PSSCHs carried on the third and fourth PSSCH resources. PSCCHs and/or PSSCHs are not transmitted or transmitted on the remaining K−K' resources in the K PSFCH resources, specifically, if K=4, and PSCCHs and/or PSSCHs are not transmitted or transmitted on the second resource (because the corresponding second PSSCH resource have been indicated in the first PSFCH), the first PSFCH is transmitted on the first resource, and the other two PSFCHs are transmitted on the third and the fourth resources, respectively.

if K'=4 and K>=K', on K' resources in the K PSFCH resources, transmitting one PSFCH on each PSFCH resource; one bit being used in each PSFCH to indicate HARQ-ACK feedback of the PSSCHs carried on one PSSCH resource, K'=4 PSFCHs respectively indicating HARQ-ACK feedback of PSSCHs carried on all four PSSCH resources; if K>K', not transmitting or transmitting PSCCHs and/or PSSCHs on the remaining K−K' resources in K PSFCH resources. Specifically, PSCCHs and/or PSSCHs are not transmitted or transmitted on the Xth resource in the K resources, X>K'.

In an exemplary embodiment, the UE determines a PSFCH transmission mode according to at least information transmitted on the received physical sidelink channel, and the information transmitted on the received physical sidelink channel further includes at least one of the following:
whether more than one physical sidelink channel resource of the multiple physical sidelink channel resources carries the same transport blocks (TBs);
whether more than one physical sidelink channel resource of the multiple physical sidelink channel resources carries bundled TBs; and
whether sidelink data carried by more than one physical sidelink channel resource of the multiple physical sidelink channel resources is transmitted by the same terminal.

In a specific example, each PSSCH is transmitted on one PSSCH, and the UE determines a PSFCH transmission mode according to the information transmitted on the received P PSSCHs (corresponding to P PSSCH resources), and specifically, the information transmitted on the received P PSSCHs (corresponding to P PSSCH resources includes at least one of the following in which:
Among the P PSSCHs, there are p1 PSSCHs carrying the same TBs; specifically, the p1 PSSCHs are transmitted on consecutive p1 sub-channels in the same slot and carry the same TB, or the p1 PSSCHs are transmitted in different slots and carry the same TBs (for example, one TB is transmitted on at least one sub-channel in the N slots, also referred to as slot aggregation);
Among the P PSSCHs, p1 PSSCHs carry bundled TBs;
Among the P PSSCHs, at least one PSSCH carries a independent TBs;
At least one of the above may occur more than once. For example, in four PSSCHs, the first two PSSCHs carry TB1, and the last two PSSCHs carry TB2; or the first two PSSCHs carry bundled TB1 and TB2, and the last two PSSCHs carry bundled TB3 and TB4; or the first two PSSCHs carry bundled TB1 and TB2, the third PSSCH carries TB3, and the fourth PSSCH carries TB4.

In an exemplary embodiment, determining a PSFCH transmission manner includes at least one of the following:
using multiplexing of feedback information, specifically, using different fields in one PSFCH to indicate feedback information corresponding to different TBs or different TB bundles; and
using bundling of feedback information, specifically, the same field in one PSFCH is used to indicate feedback information corresponding to different TBs or different TB bundles.

It should be noted that the TB bundling in the above example is only used to indicate the mapping relationship between PSSCH resources and PSFCH resources. Specifically, the TB bundling represents that multiple bundled PSSCH resources correspond to the same PSFCH resources. However, the feedback information corresponding to the bundled TB may be either fed back independently (for example, by using multiplexing of feedback information) or fed back combinedly (for example, by using bundling of feedback information). When the feedback information includes only HARQ-ACK, the former (independent feedback) may also be referred to as HARQ-ACK multiplexing, and the latter (combined feedback) may also be referred to as HARQ-ACK bundling (HARQ-ACK bundling). In this specification, TB bundling and multiplexing/bundling of feedback information (for example, HARQ-ACK multiplexing/bundling) are different concepts and should not be confused in use.

With respect to using multiplexing and/or bundling of feedback information, in one exemplary embodiment, it is determined based on the bundling of the TBs corresponding to the feedback information and/or by the corresponding transmitter. Specifically, the more than one TB corresponding to the feedback information is within the same TB bundle and is transmitted by the same UE, the bundling of feedback information is used in the PSFCH, and the feedback information of the more than one TB is indicated using the same field; the more than one TB corresponding to the feedback information is not in the same TB bundle (including the case where more than one TB is an independent TB) and is transmitted by the same UE, the multiplexing of feedback information is used in the PSFCH, and the feedback information of the more than one TB is indicated using the different fields; and the more than one TB corresponding to the feedback information is transmitted by different UEs, and different PSFCHs are used to carry feedback information corresponding to different UEs.

In a specific example, four PSSCHs correspond to one PSFCH sub-channel, and the one PSFCH sub-channel consist of four PSFCH resources and can carry transmissions of four PSFCHs at most. In the four PSSCHs, the first two PSSCHs carry bundled TB1 and TB2, and the last two PSSCHs carry bundled TB3 and TB4. In one scenario, the transmitter of TB1 and TB2 are UE1, and the transmitter of TB3 and TB4 is UE2, the PSFCH transmission mode uses the bundling of feedback information, one field in one PSFCH is used to indicate feedback information of TB1 and TB2, another field in the same PSFCH is used to indicate feedback information of TB3 and TB4, or one field in another PSFCH is used to indicate feedback information of TB3 and TB4. In another scenario, the transmitter of TB1, TB2, TB3, and TB4 is UE1, and the PSFCH transmission mode uses the bundling of feedback information, two fields in one PSFCH are used to indicate feedback information of TB1 and TB2, and feedback information of TB3 and TB4, respectively.

In another specific example, the multiplexing of the feedback information is used in the PSFCH, and the feedback information of more than one TB transmitted by the same UE is indicated using different fields, but in the PSFCH there are up to M fields used for the indication, and N TBs are transmitted by the same UE, N>M. In this scenario, one PSFCH is used to indicate feedback information corresponding to M TBs in the N TBs, and at least one of the other PSFCHs is used to indicate feedback information corresponding to the remaining N−M TBs. The selection of the M TBs is indicated by signalling (for example, SCI and/or sidelink grant), and/or determined based on predefined rule. For example, the first M of the N TBs can be selected. For example, no more than the first M counting from the slot Nn among the N TBs are selected, and Nn mod M=0.

In an exemplary embodiment, determining the PSFCH transmission mode includes using multiplexing of feedback information and/or bundling of feedback information, the resources for the transmission of the PSFCH are a subset of the PSFCH resources corresponding to the resources used by the PSSCH and/or the PSCCH associated with the multiplexed and/or bundled feedback information. The PSFCH is not transmitted on the other PSFCH resources that are not in the subset in the corresponding PSFCH resources, and/or the PSSCH and/or the PSCCH are transmitted on the other PSFCH resources that are not in the subset in the corresponding PSFCH resources.

In a specific example, from the slot N to the slot N+3, one PSSCH resource in each slot carries one PSSCH (referred to as PSSCH1~4), and the four PSSCHs correspond to four PSFCH resources in one PSFCH sub-channel which are frequency division multiplexed (referred to as PSFCH1~4). UE1 transmits a TB1 on the PSSCH1, UE2 transmits a TB 2a on the PSSCH2 and a TB 2b on the PSSCH3, and UE4 transmits a TB4 on the PSSCH4. The UE0 receiving the above four PSSCHs and correspondingly transmitting feedback information associated with the four PSSCHs, includes transmitting feedback of TB1 on the PSFCH1, and transmitting feedback of a TB 2a and a TB 2b on the PSFCH2 (by indicating bundling of feedback information using 1 bit, or by indicating multiplexing of feedback information using 2 bits). The PSFCH is not transmitted on the PSFCH3, and/or the PSSCH and/or the PSSCH are transmitted on the PSFCH3, and the feedback of TB4 is transmitted on the PSFCH4.

In an exemplary embodiment, the UE determines that, according to the PSFCH configuration, within the V2X resource pool, in each slot associated with the resource pool, the PSFCH resources are periodically configured in the time domain and/or in the frequency domain, and the periods are N slots and/or M sub-channels. The specific PSFCH configuration is that the PSFCH sub-channels are periodically configured in the time domain and/or in the frequency domain, and the periods are N slots and M sub-channels, respectively. Each configured PSFCH sub-channel includes a unique PSFCH resource subset (i.e., M=N=1), and the PSFCH resource subset includes K PSFCH resources which are code division multiplexed. Therefore, one PSFCH period includes M*N PSSCH resources and K PSFCH resources, K is a positive integer, and when K>1, the K PSFCH resources are code division multiplexed in the same time domain resources and frequency domain resources.

In this scenario, the UE determines a mapping between the PSSCH resources and the PSFCH resources according to the PSFCH configuration, and the mapping includes at least one of the following in which:

One given PSSCH resource of the M*N PSSCH resources corresponds to the K PSFCH resources, and the remaining M*N−1 PSSCH resources of the M*N PSSCH resources do not have corresponding PSFCH resources; and K0 given PSSCH resources of the M*N PSSCH resources correspond to the K PSFCH resources; further, each K0/K PSSCH resources of the K0 given PSSCH resources correspond to one of the K PSFCH resources, and the remaining M*N−K0 PSSCH resources of the M*N PSSCH resources do not have corresponding PSFCH resources.

In this exemplary embodiment, the PSSCH resources with the corresponding PSFCH resources may be used in sidelink transmissions requiring feedback message or sidelink transmissions not requiring feedback message; and conversely, the PSSCH resources without the corresponding PSFCH resources can only be used to carry sidelink transmissions that do not require feedback messages, such as broadcast transmissions and groupcast or unicast transmissions in which the feedback has been disabled.

In a specific example, the UE determining the mapping between the PSSCH resources and the PSFCH resources according to the PSFCH configuration includes determining, according to a predefined rule, that the PSSCH resources corresponding to the slot in which the PSFCH is configured have corresponding PSFCH resources, and the other PSSCH resources do not have corresponding PSFCH resources. Further, when Nn mod N=0, the PSFCH resources are configured in the slot Nn, otherwise the PSFCH resources are not configured in the slot Nn. If the time domain gap between the PSSCH and the PSFCH is predefined or configured as n slots, then if the slot (Nn1+n) mod N=0, the PSSCH resources in the slot Nn1 have a corresponding PSFCH resources, the PSSCH resources in the slot Nn1 have a corresponding PSFCH and cannot be used for transmitting a service which requires feedback.

In a specific example, the UE determining the mapping between the PSSCH resources and the PSFCH resources according to the PSFCH configuration includes determining, according to a predefined rule, that the PSSCH resources in the sub-channels in which the PSFCH is configured have corresponding PSFCH resources, and the PSSCH resources in other sub-channels do not have corresponding PSFCH resources. Further, if the sub-channel in which the PSFCH is configured in the slot N0 is sub-channel, then the PSFCH resources corresponding to the PSSCH resources in the sub-channel M0 in the slot N0 are the PSFCH resources configured in the sub-channel M0 in the slot N1, N1=N0+n, and n is predefined or indicated/configured by signaling.

In a specific example, one given PSSCH resource of the M*N PSSCH resources corresponds to K PSFCH resources, and the K PSFCH resources are used to carry unicasted HARQ-ACK feedback, or used to carry groupcasted HARQ-ACK feedback; and specifically, the K PSFCH resources respectively correspond to K reception UEs a set of K reception UEs for the groupcast.

In a specific example, P*K0 given PSSCH resources in the M*N PSSCH resources correspond to K PSFCH resources, and every P PSSCH resources in the P*K0 given PSSCH resources carry TBs within the same TB bundling, and/or every P PSSCH resources use multiplexing of feedback information and it is indicated by P fields in one PSFCH. Every P PSSCH resources correspond to K0/K PSFCH resources, the K0/K PSFCH resources are code division multiplexed, and are used so that different UEs can transmit feedback information on independent PSFCH resources in groupcast transmission.

An example of a technique that combines PSSCH-PSFCH resource mapping, TB bundling, and multiplexing/bundling of feedback information is provided below.

In an exemplary embodiment, the UE determines from the PSFCH configuration that the PSFCH resources are periodically configured every N slots in the time domain and every M sub-channels in the frequency domain. In one slot and one sub-channel including PSFCH resources, a total of M*N*P/Q PSFCH resources are included. Every P PSFCH resources constitute one resource subset, and P PSFCH resources in each resource subset are code division multiplexed. Different resource subsets are frequency division multiplexed and/or code division multiplexed, and the P PSFCH resources have the same time domain resources and frequency domain resources. Therefore, a total of M*N/Q PSFCH resource subsets which are frequency division multiplexed and/or code division multiplexed are included in one slot and one sub-channel containing PSFCH resources. Q is a parameter determined based on TB bundling. Specifically, when TB bundling is not enabled (or when multiplexing/bundling of feedback information is not enabled), Q=1.

Further, the mapping relationship between the M*N*P/Q PSFCH resources and the PSSCH resources includes the following in which:

Every M*P/Q resources (that is, every M/Q resource subsets) correspond to PSSCH resources in one slot;

Every N*P/Q resources (that is, every N/Q resource subsets) correspond to PSSCH resources in one sub-channel in one PSFCH period; and Every P/Q resources (that is, every 1/Q resource subsets) correspond to PSSCH resources in one sub-channel in one slot.

The UE determines a mapping relationship between the PSSCH resources and the PSFCH resources according to the PSFCH configuration, which includes at least one of the following in which:

The UE determines that PSSCH resources in a slot N0 correspond to PSFCH resources in a slot N0+a; wherein, N0+a is the earliest slot including the PSFCH resources after a slot N0+N1, and N1 is determined based on the PSFCH configuration or is predefined;

The UE determines that PSSCH resources on a sub-channel M0 corresponds to PSFCH resources on sub-channel M0+b; wherein, M0+b is a sub-channel with the lowest frequency domain position among sub-channels with the frequency domain positions higher than that of a sub-channel M0+M1 (or can be replaced with: a sub-channel with the highest frequency domain location among sub-channels with frequency domain locations lower than that of the sub-channel M0+M1), M1 is determined based on the PSFCH configuration or predefined;

If a slot N0 is the nth slot in a PSFCH period (for example, n=N0 mod N+a', a' is a fixed parameter representing the offset in time domain in the PSSCH-PSFCH mapping process, and the typical value of a' is 1), and the sub-channel M0 is the mth sub-channel in a PSFCH period (for example, m=M0 mod M+b', b' is a fixed parameter representing the offset in frequency domain in the PSSCH-PSFCH mapping process, and the typical value of b' is 1), then the UE determines that the PSSCH resources on the sub-channel M0 in the slot N0 correspond to the $(((n-1)*M+m)/Q)$th resource subset (or can be replaced by the $(((m-1)*N+n)/Q)$th resource subset) in the total of the M*N/Q resource subsets in one slot; and the typical values of a and b are to avoid the occurrence of the 0th slot/sub-channel after the mod operation;

The UE uses the pth resource in the PSFCH resource subsets corresponding to the PSSCH, and p is determined by the intra-group identity of the UE, for example, p=intra-group ID of the UE mod P; and optionally, if the sidelink transmission carried on the PSSCH resources is groupcast, then this method is used;

The UE uses the pth resource in the PSFCH resource subsets corresponding to the PSSCH, and p is determined by the identity of the UE, for example, p=UE ID (the UE ID may be the destination ID indicated in the PSCCH associated with the PSSCH) mod P; and if the sidelink transmission carried on the PSSCH resources is unicast, then this method is used;

The UE determines the respective time domain resource location and frequency domain resource location of the M*N/Q resource subsets in one sub-channel in one slot according to the PSFCH configuration; and specifically, the UE determines that the M*N/Q resource subsets are frequency domain multiplexed. The starting position of the first resource subset in the frequency domain is the same as the starting position of the PSSCH sub-channels (denoted as RB#k0), and the starting position of the xth resource subset in the frequency domain is RB# $((k0)-1*K)$, K is the frequency domain size of one PSFCH resource (or the starting position of the xth resource subset in the frequency domain is RB#$((k0)-1*K)$~RB#$(k0*K-1))$.

The position of the offset in the time domain/frequency domain in this example can also be moved to other positions in the formula/parameter, and the effects are similar. Here are a few examples (only taking a' as an example, while the same applies for b'):

$$n=(N0+a')\bmod N;$$

The PSSCH resources on the sub-channel M0 in the slot N0 corresponds to the $(((n-1+a')*M+m)/Q)$th resource subset of a total of M*N/Q resource subsets in one slot;

The PSSCH resources on the sub-channel M0 in the slot N0 corresponds to the $(((n+a'-1)*M+m)/Q)$th resource subset of a total of M*N/Q resource subsets in one slot.

A specific example is provided below in conjunction with specific physical parameters. The UE determines that in the sidelink communication system, the PSFCH resources are periodically configured every four slots in the time domain and on each sub-channel in the frequency domain according to the PSFCH configuration and other sidelink configurations. The frequency domain size of PSSCH sub-channels is 10 PRBs, and each PSSCH sub-channel corresponds to 4 PSFCH resources. The size of the PSFCH resource is 2 PRBs, and the starting positions of the PSFCH resources are the same as those of PSSCH sub-channels (for example, frequency domain resources of one PSSCH sub-channel are RB#0~RB#9, then the positions in the frequency domain of corresponding PSFCH resources are RB#0~RB#1, RB#2~RB#3, RB#4~RB#5, and RB#6~RB#7 respectively. RB#8~RB#9 are vacant resources or can be used to transmit PSSCH). PSSCH resources in the Nth slot on one sub-channel within one PSFCH period correspond to the Nth of the PSFCH resources corresponding to the sub-channel. Specifically, the PSSCH resources on the sub-channel M0 in the slot N0 correspond to the xth PSFCH resource on sub-channel M0 in the slot N0+a, N0+a is the earliest slot including PSFCH resources after the slot N0+N1, N1 is determined based on the PSFCH configuration or predefined, and x=(N0 mod 4)+1.

Further, the UE assumes that the PSFCH resources determined in the above example are actually a set including P PSFCH resources which are code division multiplexed. For unicast, P equals to 1 or a value determined according to the PSFCH configuration, for groupcast, P is a value determined according to the PSFCH configuration. If the UE needs to transmit/receive the PSFCH, a specific resource for transmitting/receiving the PSFCH is selected among the P PSFCH resources which are code division multiplexed according to ID or intra-group identity of the UE.

In this example, Q=1, that is, TB bundling is not enabled. However, if the UE receives PSSCHs from the same transmission UE on multiple PSSCH resources, the UE can still transmit the multiplexed and/or bundled feedback information on the corresponding multiple PSFCH resources; and specifically, the UE transmits the multiplexed and/or bundled feedback information on the first PSFCH resource (one of the PSFCH resource with the highest frequency domain location) among the corresponding multiple PSFCH resources.

In another specific example, the UE determines that in the sidelink communication system, the PSFCH resources are periodically configured every four slots in the time domain and on each sub-channel in the frequency domain according to the PSFCH configuration and other sidelink configurations. The frequency domain size of PSSCH sub-channels is 10 PRBs, and each PSSCH sub-channel corresponds to 2 PSFCH resources. The size of the PSFCH resource is 5 PRBs, and the starting position of the PSFCH resources is the same as that of PSSCH sub-channels (for example, frequency domain resources of one PSSCH sub-channel are RB#0~RB#9, then the positions in the frequency domain of corresponding PSFCH resources are RB#0~RB#4 and RB#5~RB#9 respectively). PSSCH resources in the first two slots on one sub-channel within one PSFCH period correspond to the first one of the PSFCH resources corresponding to the sub-channel, and PSSCH resources in the last two slots correspond to the second one of the PSFCH resources corresponding to the sub-channel. The rest of the method is similar to the previous example. In this example, it can be deemed that Q=2, that is, the UE determines that TB bundling is enabled and each TB bundling includes 2 TBs. When the UE transmits the PSFCH on one PSFCH, the PSFCH may indicate the result of the PSSCH transmission on a maximum of 2 PSSCH resources. Specifically, when different PSSCHs are transmitted on the 2 PSSCH resources, the UE uses 1 bit to indicate the feedback information of the bundling, or uses 2 bits to indicate multiple feedback information.

As described above, the present application provides a method for sidelink communication, which can determine the structure and resources of a physical sidelink feedback channel for carrying HARQ-ACK feedback information, and correspondence relationship and mapping between the physical sidelink feedback channel resources and corresponding data channel resources and/or control channel resources. It is possible for a data reception UE to transmit corresponding ACK/NACK feedback information to a data transmission UE, so that data transmission UE can determine where to receive the feedback information, and determine whether data retransmission is necessary.

As described above, the present application provides that a method performed by reception UE for sidelink communication, the method comprising:

receiving a physical sidelink channel, to obtain sidelink data corresponding to the physical sidelink channel;

obtaining physical sidelink feedback channel (PSFCH) configuration, wherein a PSFCH is used to carry feedback information for the sidelink data;

determining at least one PSFCH resource for transmitting the PSFCH based on the PSFCH configuration; and transmitting the PSFCH on the determined PSFCH resources.

According to various embodiments, wherein the PSFCH configuration is indicated in at least one of a predefined configuration, broadcasted or groupcasted configuration, sidelink resource pool configuration, User-Equipment (UE)-specific configuration or UE-group-specific configuration, sidelink control information (SCI), and a sidelink grant message.

According to various embodiments, wherein the received physical sidelink channel is transmitted on multiple physical sidelink channel resources, and the transmitting the PSFCH includes determining a PSFCH transmission method based on at least one of the following: the PSFCH configuration, information transmitted on the received physical sidelink channel and a predefined rule.

According to various embodiments, wherein the information transmitted on the received physical sidelink channel further includes at least one of the following information about:

whether more than one physical sidelink channel resource of the multiple physical sidelink channel resources carries the same transport block (TB);

whether more than one physical sidelink channel resource of the multiple physical sidelink channel resources carries bundled transport blocks (TBs); and whether sidelink data carried by more than one physical sidelink channel resource of the multiple physical sidelink channel resources is transmitted by the same terminal.

According to various embodiments, wherein the received physical sidelink channel is transmitted on multiple physical sidelink channel resources, and the transmitting the PSFCH includes transmitting at least one PSFCH based on at least one of the following PSFCH transmission methods in which:

one transmitted PSFCH is used for indicating feedback information corresponding to physical sidelink channels carried on the multiple physical sidelink channel resources, and physical sidelink channels carried on at least two physical sidelink channel resources of the multiple physical sidelink channel resources correspond to the same or bundled sidelink data or transport blocks (TBs);

one transmitted PSFCH is used for indicating feedback information corresponding to physical sidelink channels carried on the multiple physical sidelink channel resources, and physical sidelink channels carried on at least two physical sidelink channel resources of the multiple physical sidelink channel resources correspond to independent sidelink data or TBs;

one transmitted PSFCH is used for indicating feedback information corresponding to physical sidelink channels carried on one or more than one physical sidelink channel resource of the multiple physical sidelink channel resources, and physical sidelink channels carried on at least two physical sidelink channel resources of the more than one physical sidelink channel resource correspond to the same or bundled sidelink data or TBs; and one transmitted PSFCH is used for indicating feedback information corresponding to physical sidelink channels carried on one or more than one physical sidelink channel resource of the multiple physical sidelink channel resources, and physical sidelink channels carried on at least two physical sidelink channel resources of the more than one physical sidelink channel resource correspond to independent sidelink data or TBs.

According to various embodiments, wherein the determining at least one PSFCH resource for transmitting the PSFCH based on the PSFCH configuration includes:
determining a PSFCH resource pool for transmitting the PSFCH based on the PSFCH configuration; and
determining at least one PSFCH resource for transmitting the PSFCH from the PSFCH resource pool.

According to various embodiments, wherein the PSFCH resource pool includes multiple PSFCH sub-channels, and each PSFCH sub-channel includes one PSFCH resource, or includes multiple PSFCH resources multiplexed in at least one of the following multiplexing methods: time division multiplexing (TDM), frequency division multiplexing (FDM) and code division multiplexing (CDM).

According to various embodiments, wherein the at least one PSFCH sub-channel or the at least one PSFCH resource is periodically configured in the frequency domain or periodically configured in the time domain and the frequency domain in a sidelink resource pool associated with the PSFCH resource pool, the period for the time domain is N slots, and the period for the frequency domain is M sidelink sub-channels, wherein
one PSFCH sub-channel includes one PSFCH resource or multiple PSFCH resources multiplexed in at least one of the following multiplexing methods: time division multiplexing (TDM), frequency division multiplexing (FDM) and code division multiplexing (CDM), and wherein
N and M are positive integers that can be configured, and $1 \leq N \leq +\infty$, $1 \leq M \leq +\infty$.

According to various embodiments, wherein each configured PSFCH sub-channel includes M*N PSFCH resource subsets, and each PSFCH resource subset may include K PSFCH resources, and wherein
if M is greater than 1 or N is greater than 1, the M*N PSFCH resource subsets may be time division multiplexed and/or frequency division multiplexed, and the occupied time domain resources and frequency domain resources do not overlap with each other, and if K is greater than 1, the K PSFCH resources are code division multiplexed on the same time domain resources and frequency domain resources, and K is a positive integer.

According to various embodiments, wherein
PSFCH resources corresponding to physical sidelink channel resources on the M1th sidelink sub-channel in the N1th slot within the Y0th PSFCH resource period are all resources in a PQth PSFCH resource subset on one PSFCH sub-channel configured in the Y1 resource period,
wherein a mapping between Y0 and Y1 is predefined, or configured or indicated by specific signaling,
wherein a mapping between M1 and PQ and a mapping between N1 and PQ are predefined, or configured or indicated by specific signaling,
wherein Y0, Y1, M1, N1 and PQ are all positive integers, $1 \leq PQ \leq M*N$, and
wherein a PSFCH resource period is N slots in the time domain and M sidelink sub-channels in the frequency domain, and includes one PSFCH sub-channel, wherein the predefined mappings are defined in or derived from the PSFCH configuration, and
wherein the specific signaling is sidelink control information (SCI) or a sidelink grant message associated with the sidelink data.

According to various embodiments, wherein the transmitting the PSFCH includes:
one transmitted PSFCH carrying feedback information corresponding to multiple physical sidelink channels, the multiple physical sidelink channels being transmitted by multiple terminals;
determining transmitting power of the one PSFCH based on the power control information of the multiple physical sidelink channels obtained from the multiple terminals;
transmitting the one PSFCH associated with the multiple physical sidelink channels on the determined PSFCH resources based on the transmitting power of the PSFCH, wherein
the power control information includes at least one of the following:
a lowest and/or highest pathloss of the multiple terminals;
an average of pathlosses of the multiple terminals;
a sum of pathlosses of the multiple terminals;
a pathloss of a terminal of the multiple terminals corresponding to a latest one physical sidelink channel in the time domain;
a pathloss of a predefined or configured one terminal of the multiple terminals; and
a pathloss corresponding to a terminal of the multiple terminals with a farthest geographical distance.

According to various embodiments, the present application provide that a method performed by transmission UE 7 for sidelink communication, comprising:
transmitting a physical sidelink channel, to transmit sidelink data corresponding to the physical sidelink channel;
obtaining physical sidelink feedback channel (PSFCH) configuration, wherein a PSFCH is used to carry feedback information for the sidelink data;
determining at least one PSFCH resource for receiving the PSFCH based on the PSFCH configuration; and
receiving the PSFCH on the determined PSFCH resources.

Those skilled in the art will appreciate that the present application can include devices for performing one or more of the operations described herein.

FIG. 19 is a block diagram that schematically illustrating a reception device 1900 in accordance with an embodiment of the present application. The reception device 1900 can include: a sidelink receiver 1910, configured to receive a physical sidelink channel such as PSSCH and/or PSCCH to obtain sidelink data corresponding to the physical sidelink channel; a processor 1920, configured to obtain physical sidelink feedback channel (PSFCH) configuration, wherein a PSFCH is used to carry feedback information for the sidelink data and determine at least one PSFCH resource for transmitting the PSFCH based on the PSFCH configuration; and a feedback transmitter 1930, configured to transmit the PSFCH on the determined PSFCH resources. The reception device 1900 is any reception device in the communication network as shown in FIG. 1 capable of communicating with another device, such as a terminal in a D2D communication system or many types of terminals or user equipments in a V2X communication system such as a vehicle, infrastructure and pedestrian. The type of device 1900 does not constitute a limitation of the present application. The device 1900 can also be used to perform other details in the operations described above, and for the sake of brevity, no further details are provided herein.

FIG. 20 is a block diagram schematically illustrating a transmission device 2000 in accordance with an embodiment of the present application. The transmission device 2000 can include: a sidelink transmitter 2010, configured to transmit a physical sidelink channel such as PSSCH and/or PSCCH to transmit sidelink data corresponding to the physical sidelink channel; a processor 2020, configured to obtain physical sidelink feedback channel (PSFCH) configuration, wherein a PSFCH is used to carry feedback information for the sidelink data and determine at least one PSFCH resource for receiving the PSFCH based on the PSFCH configuration; and a feedback receiver 2030, configured to receive the PSFCH on the determined PSFCH resources. The transmission device 2000 is any transmission device in the communication network as shown in FIG. 1 capable of communicating with another device, such as a terminal in a D2D communication system or many types of terminals or user equipments in a V2X communication system such as a vehicle, infrastructure and pedestrian. The type of device 2000 does not constitute a limitation of the present application. The device 2000 can also be used to perform other details in the operations described above, and for the sake of brevity, no further details are provided herein.

According to various embodiments, this present application provides that a reception device for sidelink communication, comprising:
  a sidelink receiver, configured to receive a physical sidelink channel to obtain sidelink data corresponding to the physical sidelink channel; and
  a processor, configured to obtain physical sidelink feedback channel (PSFCH) configuration, wherein a PSFCH is used to carry feedback information for the sidelink data, and determine at least one PSFCH resource for transmitting the PSFCH based on the PSFCH configuration; and
  a feedback transmitter, configured to transmit the PSFCH on the determined PSFCH resources.

According to various embodiments, this present application provides that a transmission device for sidelink communication, comprising:
  a sidelink transmitter, configured to transmit a physical sidelink channel to transmit sidelink data corresponding to the physical sidelink channel;
  a processor, configured to obtain physical sidelink feedback channel (PSFCH) configuration, wherein a PSFCH is used to carry feedback information for the sidelink data and determine at least one PSFCH resource for receiving the PSFCH based on the PSFCH configuration; and
  a feedback receiver, configured to receive the PSFCH on the determined PSFCH resources.

Those of ordinary skill in the art will appreciate that the units and algorithm steps of the various examples described in connection with the embodiments disclosed herein can be implemented in electronic hardware or a combination of computer software and electronic hardware. Whether these functions are performed in hardware or software depends on the specific application and design constraints of the solution. A person skilled in the art can use different methods to implement the described functions for each particular application, but such implementation should not be considered to be beyond the scope of the present application.

A person skilled in the art can clearly understand that, for the convenience and brevity of the description, the specific working process of the devices and the units described above may mean the corresponding process in the foregoing method embodiments, and details are not described herein.

In several embodiments provided by the present application, it should be understood that the disclosed devices and methods may be implemented in other manners. For example, the device embodiments described above are merely illustrative. For example, the division of the unit is only a division of logical functions, and in actual implementation, there may be another division manner, for example, multiple units or components may be combined or integrated into another device, or some features can be ignored or not executed.

The units described as separate components may or may not be physically separate, and the components displayed as units may or may not be physical units. Some or all of the units may be selected according to actual needs to achieve the purpose of the solution of the embodiment.

The functions may be stored in a computer readable storage medium if implemented in the form of software functional units and sold or used as a standalone product. Based on such understanding, the technical solution of the present application in essence or the portion of the technical solution that contributes to the prior art or a portion of the technical solution may be embodied in the form of a software product stored in a storage medium, including instructions used to cause a computer device (which may be a personal computer, server, or network device, etc.) to perform all or part of the steps of the methods described in various embodiments of the present application. The foregoing storage medium includes various media that can store program codes, such as a USB flash drive, a mobile hard disk, a read only memory, a random access memory, a magnetic disk, or an optical disk.

Those skilled in the art will appreciate that the present invention includes devices related to performing one or more of the operations described herein. These devices may be specially designed and manufactured for required purposes, or may also include known devices in a general purpose computer. These devices have computer programs stored therein that are selectively activated or reconfigured. Such computer programs may be stored in a device (such as a computer) readable medium or in any type of medium suitable for storing electronic instructions and coupled to a bus, respectively, including but not limited to any types of disks (including floppy disks, hard disks, optical disks, CD-ROMs, and magneto-optical disks), ROM (Read-Only Memory), RAM (Random Access Memory), and EPROM (Erasable Programmable Read-Only Memory), EEPROM (Electrically Erasable Programmable Read-Only Memory), flash memory, magnetic card or light card. That is, a readable medium includes any medium that is stored or transmitted by a device (such as a computer) in a readable form.

Those skilled in the art will appreciate that each block of the structure diagrams and/or block diagrams and/or flowcharts and combinations of blocks in the structure diagrams and/or block diagrams and/or flowcharts can be implemented by computer program instructions. Those skilled in the art will appreciate that these computer program instructions can be implemented by a general purpose computer, a professional computer, or a processor of other programmable data processing methods, such that the solution specified in the various blocks in the structure diagrams and/or block diagrams and/or flowcharts in accordance with the present application can be executed by the computer or the processor of other programmable data processing method.

Those skilled in the art will appreciate that the steps, measures, and solutions in the various operations, methods, and processes that have been discussed in the present application may be alternated, changed, combined, or deleted. Further, other steps, measures, and solutions of the various operations, methods, and processes that have been discussed in the present application may be alternated, modified, rearranged, decomposed, combined, or deleted. Further, the steps, measures, and solutions in the prior art having various operations, methods, and processes disclosed in the present application may also be alternated, changed, rearranged, decomposed, combined, or deleted.

The above is only the specific embodiment of the present application, but the scope of the present application is not limited thereto. Changes or substitutions that are readily conceivable by anyone skilled in the art within the technical scope of the present application are intended to be included within the scope of the present application. Therefore, the scope of the present application should be determined by the scope of the claims.

The invention claimed is:

1. A method performed by a terminal in a wireless communication system, the method comprising:
    receiving a radio resource control (RRC) message including information for a sidelink resource pool, wherein the information for the sidelink resource pool includes configuration information for a physical sidelink feedback channel (PSFCH) and information on a number of a subchannel, and wherein the configuration information includes:
        information on a time gap,
        information on a set of resource blocks (RBs) for the PSFCH, and
        information on a period for the PSFCH; and
    transmitting hybrid automatic repeat request acknowledgement (HARQ-ACK) information in a first slot including PSFCH resources,
    wherein the first slot is at least one slot after the time gap from a slot of a physical sidelink shared channel (PSSCH),
    wherein a number of the PSFCH resources for multiplexing the HARQ-ACK information is identified based on the set of the RBs for the PSFCH, the period for the PSFCH, and the number of the subchannel, and
    wherein at least one RB for the PSFCH is allocated to a PSSCH slot associated with the first slot based on the period for the PSFCH and the number of the subchannel.

2. The method of claim 1,
    wherein the configuration information further includes information on a number of a sequence, and
    wherein the number of the PSFCH resources is further identified based on the number of the sequence.

3. The method of claim 1,
    wherein the PSFCH resources are indexed based on the period for the PSFCH and the number of subchannel.

4. The method of claim 1, further comprising:
    identifying a PSFCH resource corresponding to the PSSCH based on a source identity (ID) and an ID of the terminal.

5. The method of claim 1,
    wherein the HARQ-ACK information is transmitted on the PSFCH resources in a form of a sequence.

6. A terminal in a wireless communication system, the terminal comprising:
    transceiver; and
    processor coupled with the transceiver and configured to:
        receive a radio resource control (RRC) message including information for a sidelink resource pool, wherein the information for the sidelink resource pool includes configuration information for a physical sidelink feedback channel (PSFCH) and information on a number of a subchannel, and wherein the configuration information includes:
            information on a time gap,
            information on a set of resource blocks (RBs) for the PSFCH, and
            information on a period for the PSFCH, and
        transmit hybrid automatic repeat request acknowledgement (HARQ-ACK) information in a first slot including PSFCH resources,
    wherein the first slot is at least one slot after the time gap from a slot of a physical sidelink shared channel (PSSCH),
    wherein a number of the PSFCH resources for multiplexing the HARQ-ACK information is identified based on the set of the RBs for the PSFCH, the period for the PSFCH, and the number of the subchannel, and
    wherein at least one RB for the PSFCH is allocated to a PSSCH slot associated with the first slot based on the period for the PSFCH and the number of the subchannel.

7. The terminal of claim 6,
    wherein the configuration information further includes information on a number of a sequence, and
    wherein the number of the PSFCH resources is further identified based on the number of the sequence.

8. The terminal of claim 6,
    wherein the PSFCH resources are indexed based on the period for the PSFCH, and the number of subchannel.

9. The terminal of claim 6, wherein the processor is configured to:
    identify a PSFCH resource corresponding to the PSSCH based on a source identity (ID) and an ID of the terminal.

10. The terminal of claim 6,
    wherein the HARQ-ACK information is transmitted on the PSFCH resources in a form of a sequence.

* * * * *

UNITED STATES PATENT AND TRADEMARK OFFICE
CERTIFICATE OF CORRECTION

| | | |
|---|---|---|
| PATENT NO. | : 12,058,649 B2 | Page 1 of 1 |
| APPLICATION NO. | : 17/607349 | |
| DATED | : August 6, 2024 | |
| INVENTOR(S) | : Zhou et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 344 days.

Signed and Sealed this
Thirty-first Day of December, 2024

Derrick Brent
*Acting Director of the United States Patent and Trademark Office*